Sept. 8, 1942. L. M. POTTS Re. 22,175
SELECTIVE CONTROL SYSTEM AND APPARATUS
Original Filed Sept. 19. 1929 15 Sheets-Sheet 1
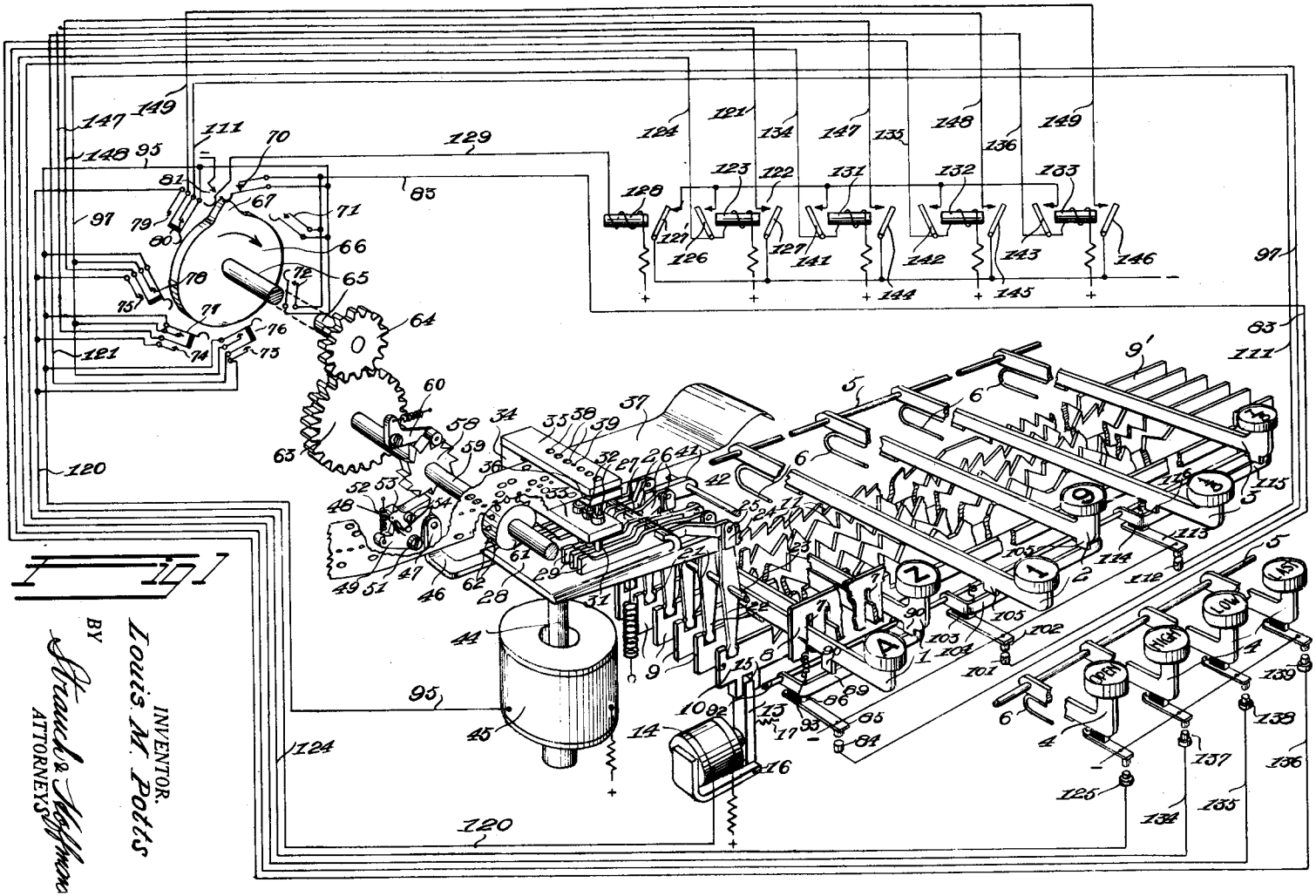
INVENTOR.
Louis M. Potts
BY
Strauch & Hoffman
ATTORNEYS Sept. 8, 1942. L. M. POTTS Re. 22,175
SELECTIVE CONTROL SYSTEM AND APPARATUS
Original Filed Sept. 19, 1929 15 Sheets-Sheet 2
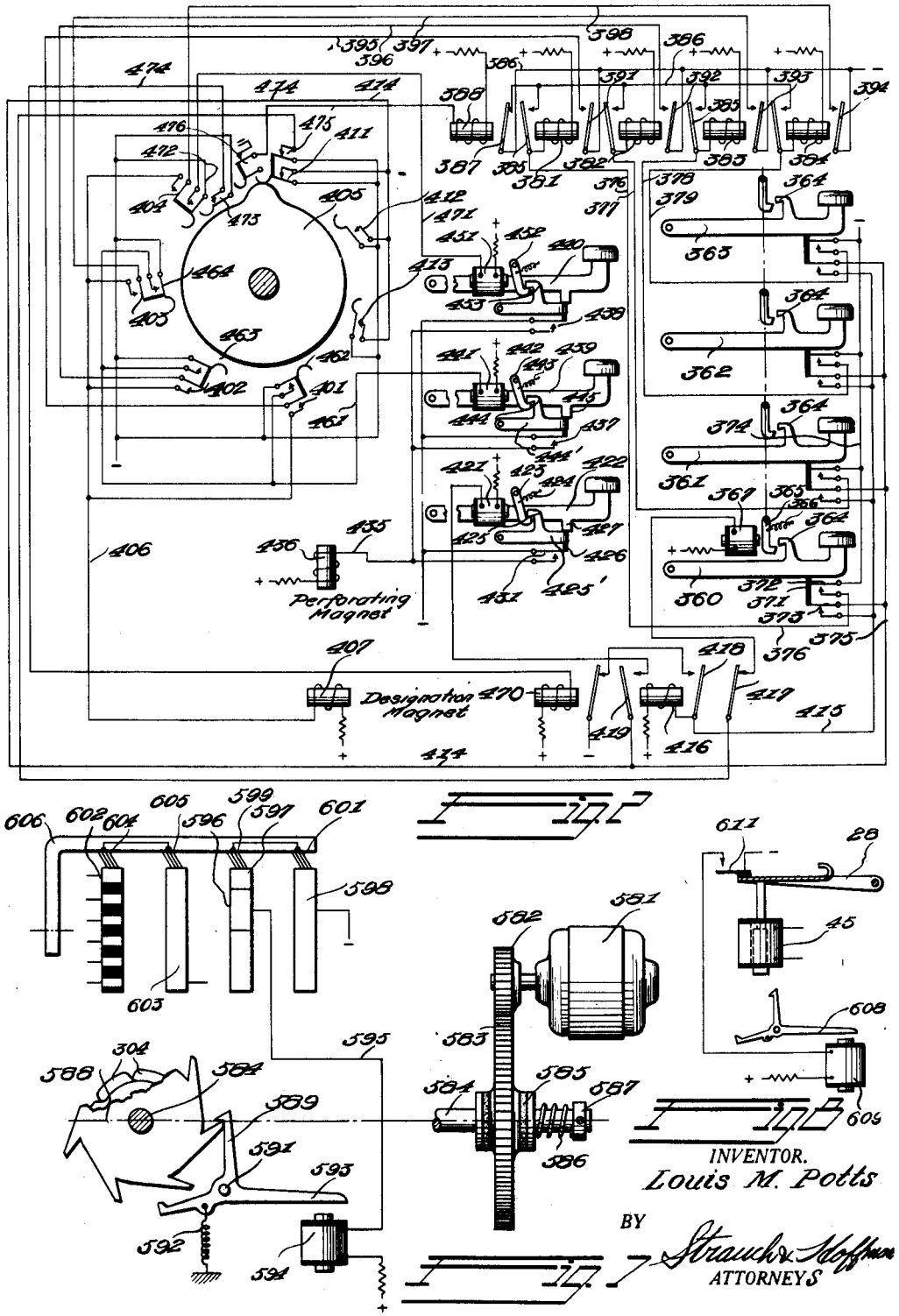

Sept. 8, 1942. L. M. POTTS Re. 22,175
SELECTIVE CONTROL SYSTEM AND APPARATUS
Original Filed Sept. 19, 1929 15 Sheets-Sheet 3
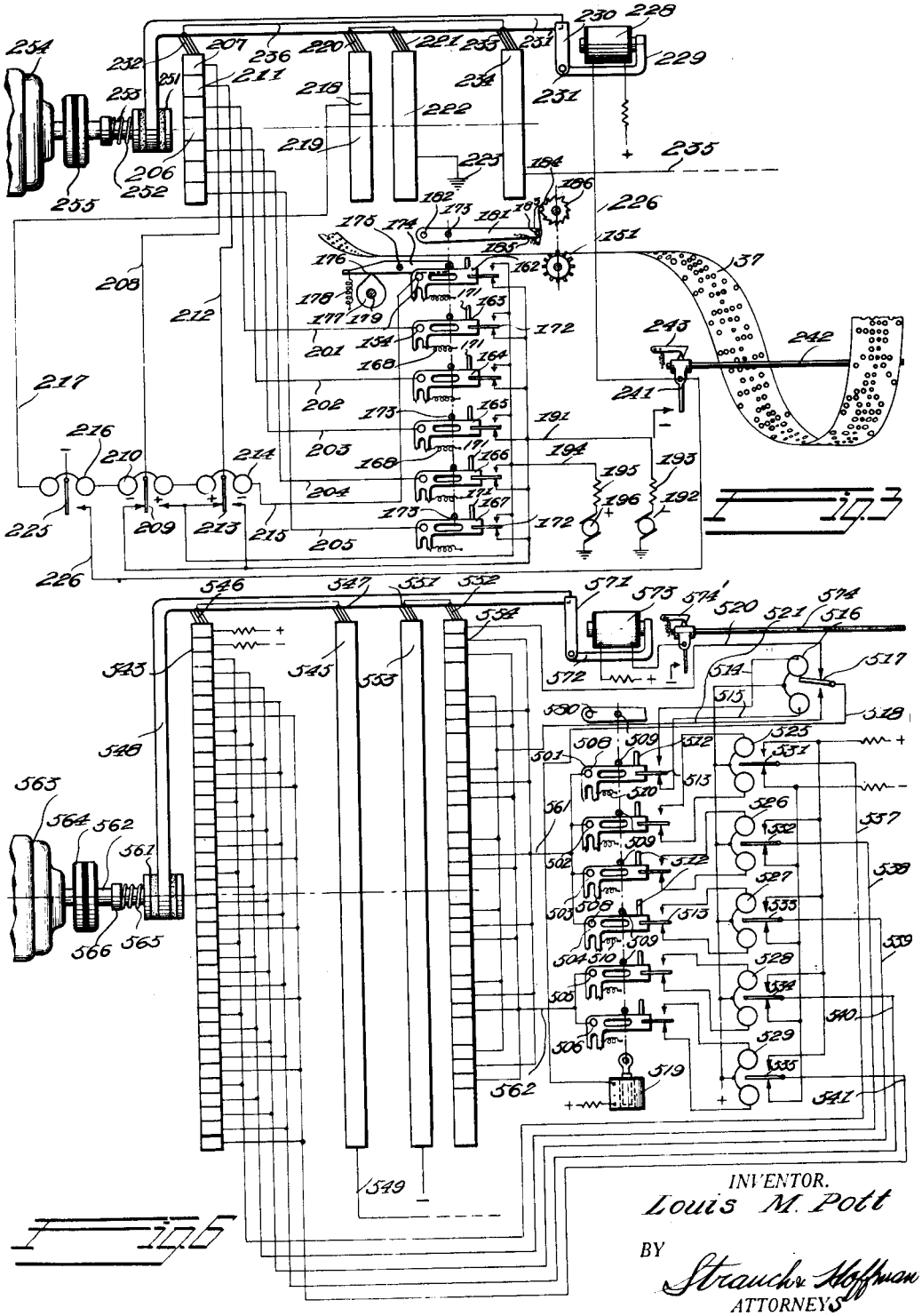
INVENTOR.
Louis M. Potts
BY
Strauch & Hoffman
ATTORNEYS SELECTIVE CONTROL SYSTEM AND APPARATUS
Original Filed Sept. 19, 1929 15 Sheets-Sheet 4
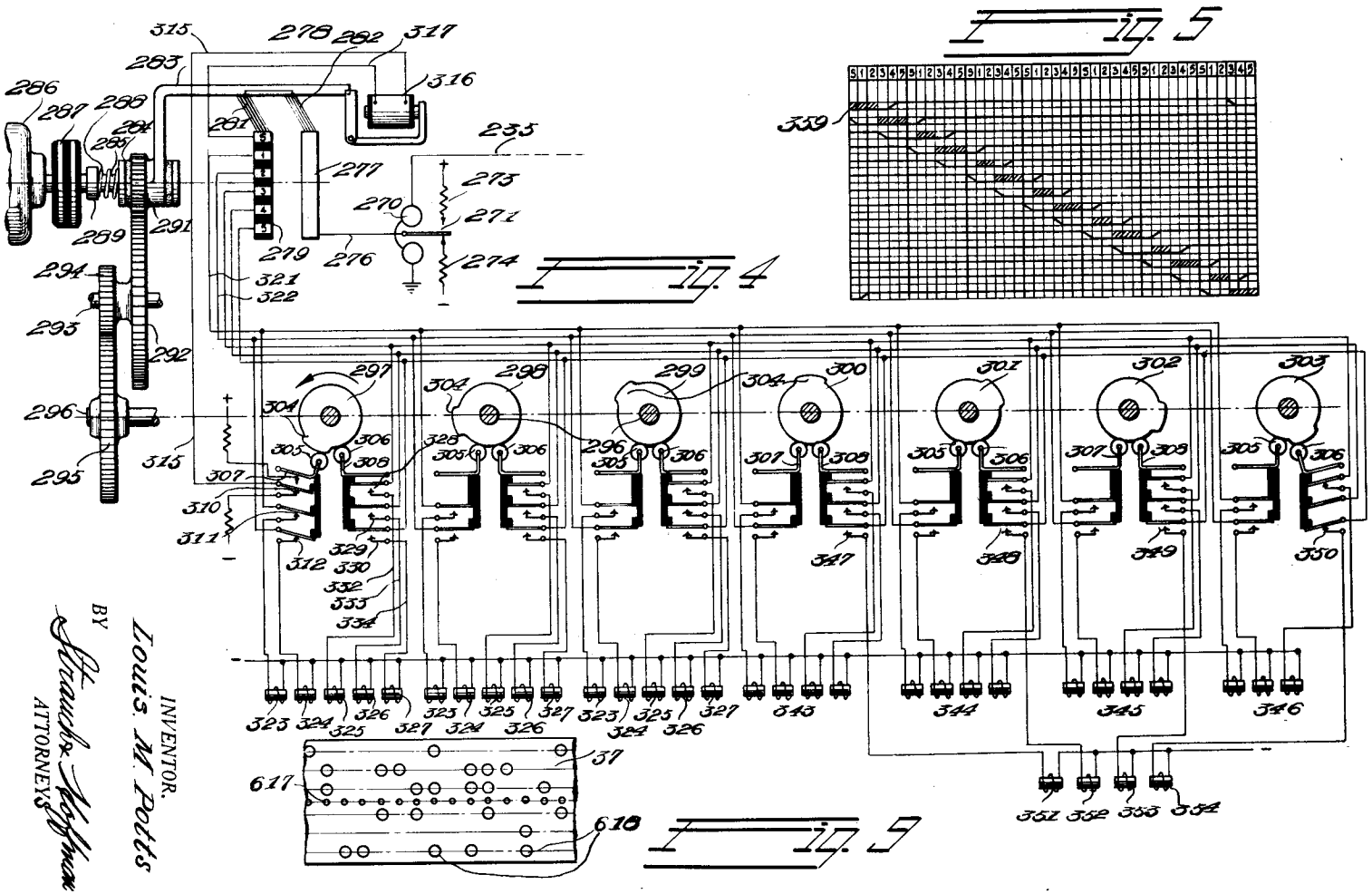
INVENTOR.
Louis M. Potts
BY
Strauch & Hoffman
ATTORNEYS

SELECTIVE CONTROL SYSTEM AND APPARATUS

Original Filed Sept. 19, 1929 15 Sheets-Sheet 5

INVENTOR
Louis M. Potts
BY
Strauch & Hoffman
ATTORNEYS

SELECTIVE CONTROL SYSTEM AND APPARATUS
Original Filed Sept. 19, 1929 15 Sheets-Sheet 6
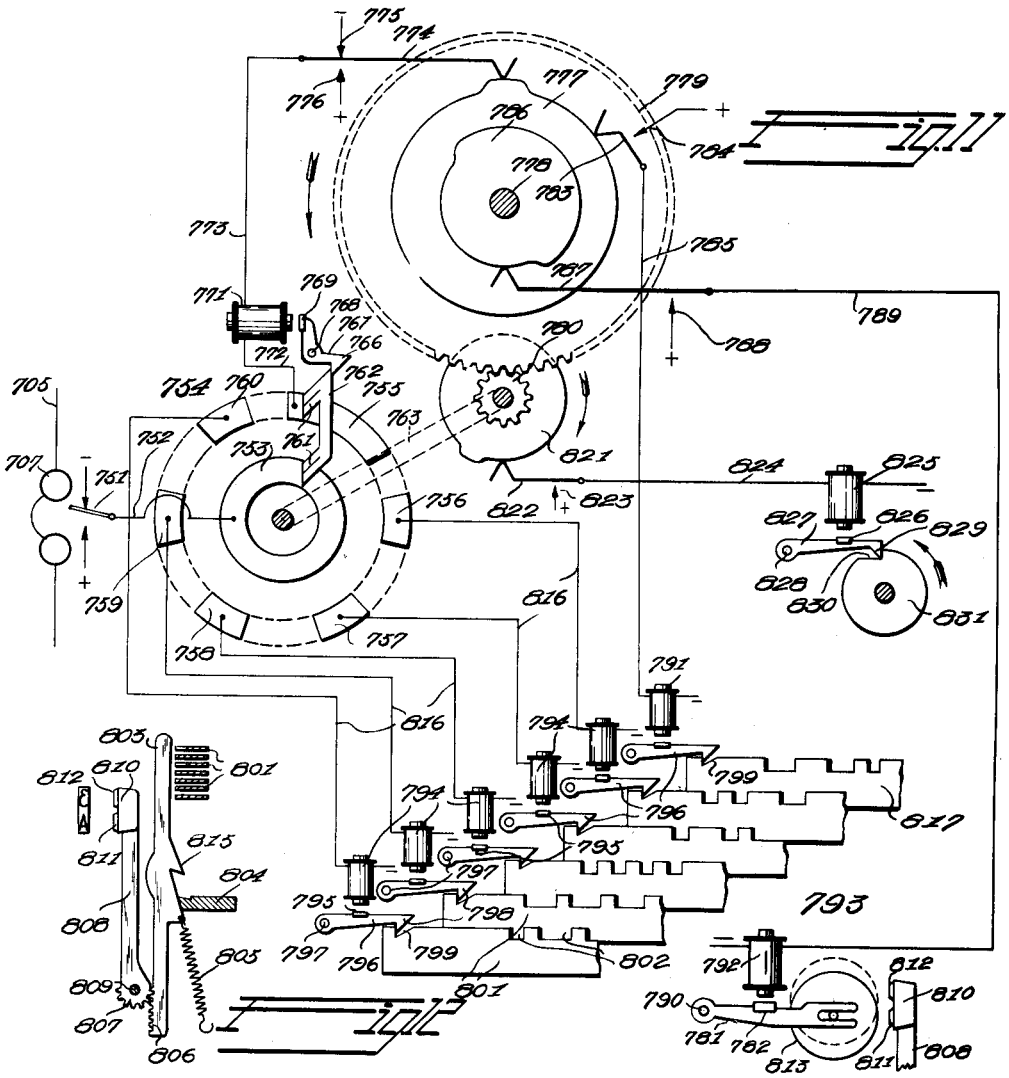
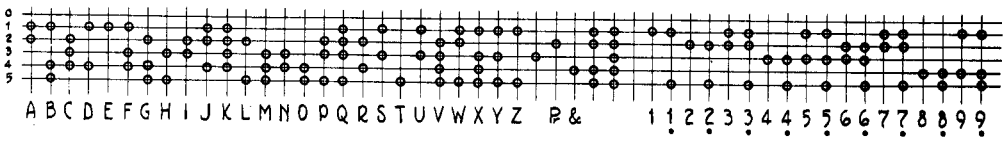
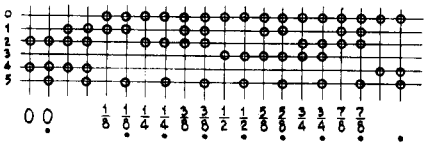
INVENTOR.
Louis M. Potts
BY
Strauch & Hoffman
ATTORNEYS

SELECTIVE CONTROL SYSTEM AND APPARATUS

Original Filed Sept. 19, 1929 15 Sheets-Sheet 7

INVENTOR.
Louis M. Potts
BY Strauch & Hoffman
ATTORNEYS

SELECTIVE CONTROL SYSTEM AND APPARATUS

Original Filed Sept. 19, 1929 15 Sheets-Sheet 8

INVENTOR.
Louis M. Potts
BY Strauch & Hoffman
ATTORNEYS

SELECTIVE CONTROL SYSTEM AND APPARATUS

Original Filed Sept. 19, 1929 15 Sheets-Sheet 9

INVENTOR.
Louis M. Potts
BY
Strauch & Hoffman
ATTORNEYS

SELECTIVE CONTROL SYSTEM AND APPARATUS

Original Filed Sept. 19, 1929 15 Sheets-Sheet 10

INVENTOR.
Louis M. Potts
BY Strauch & Hoffman
ATTORNEYS

SELECTIVE CONTROL SYSTEM AND APPARATUS

Original Filed Sept. 19, 1929 15 Sheets-Sheet 11

INVENTOR.
Louis M. Potts
BY Strauch & Hoffman
ATTORNEYS

SELECTIVE CONTROL SYSTEM AND APPARATUS

Original Filed Sept. 19, 1929 15 Sheets-Sheet 12

INVENTOR.
Louis M. Potts
BY Strauch & Hoffman
ATTORNEYS

SELECTIVE CONTROL SYSTEM AND APPARATUS

Original Filed Sept. 19, 1929 15 Sheets-Sheet 13

INVENTOR.
Louis M. Potts

BY
Strauch Hoffman
ATTORNEYS

Sept. 8, 1942. L. M. POTTS Re. 22,175

SELECTIVE CONTROL SYSTEM AND APPARATUS

Original Filed Sept. 19, 1929 15 Sheets-Sheet 14

INVENTOR.
Louis M. Potts

BY Strauch & Hoffman
ATTORNEYS

SELECTIVE CONTROL SYSTEM AND APPARATUS

Original Filed Sept. 19, 1929 15 Sheets-Sheet 15

INVENTOR.
Louis M. Potts

BY Strauch & Hoffman
ATTORNEYS

Reissued Sept. 8, 1942

Re. 22,175

UNITED STATES PATENT OFFICE 22,175

SELECTIVE CONTROL SYSTEM AND APPARATUS

Louis M. Potts, Evanston, Ill., assignor to Teletype Corporation, Chicago, Ill., a corporation of Delaware Original No. 2,134,005, dated October 25, 1938, Serial No. 393,761, September 19, 1929. Application for reissue December 20, 1940, Serial No. 371,030

89 Claims. (Cl. 178—4)

The present invention relates to selective control systems and apparatus, and more particularly the invention relates to remote control systems and apparatus especially applicable to automatic stock quotation indication, but useful in other relations.

An object of the present invention is to provide novel signalling systems adapted for operation over and in conjunction with existing printing telegraph lines so that efficient methods of transmission may be used without substantial change in or interference with commercial message traffic and also so that a new method especially adapted to new demands can also be used and applied to existing systems so that on each circuit the most suitable method of operation can be used.

The specific embodiments of my invention hereinafter set forth are developed in connection with and as improvements on quotation distribution systems of the general type disclosed in my co-pending application Serial Number 333,161 filed January 17, 1929, in which complete cycles of operations each includes the selection of a register, setting up of a quotation on the register, and identification of the type of the quotation and in which each cycle includes successive code combinations all of which may or may not be made up of an equal number of selecting conditions. However, as existing permutation code telegraph channels are designed for equal interval code combination transmission, the systems and apparatus as disclosed in my application Serial No. 333,161 cannot be directly applied to operation over existing telegraph channels without some modification thereof, unless certain of the impulse periods are not used, and line time is lost.

Since the existing main telegraph printer circuits comprise many multiplex channel transmission lines, another object of my invention is to provide methods and means for operating a quotation indicating system of the general type disclosed in said co-pending application over one or more of the channels of a multiplex telegraph system between geographically remote points.

Still another object of my invention is to provide methods and means for operating a remote indicating system of the character mentioned in which each cycle of operation comprises a predetermined number of code combinations of impulses for operation over standard start-stop telegraph systems without loss of any impulsing time.

A further object of my invention is to provide methods and means for utilizing idle impulse intervals in a system of the character described operating over telegraph channels where the number of impulse intervals available in the telegraph channel is greater than the number of signalling conditions comprising the code combinations utilized.

Still a further object of my invention is to provide signalling methods and apparatus for transmitting a plurality of code combinations over a single telegraph channel during a single channel period.

Another object of my invention is to provide means for adapting a single channel in a multiplex telegraph system for successively selecting code combinations from a plurality of channels of a different type of selective remote control system.

Another object of my invention is to provide methods and means for re-transmitting a plurality of selective code combinations of impulses each received from a different transmission channel over a single telegraph channel.

Still a further object of my invention is to provide methods and means for invariably and automatically controlling the sequence of transmission of successive code combinations of impulses of a complete cycle in a stock quotation remote indicating system.

Still a further object of my invention is to provide flexible means to adapt a system for transmission of any one of a plurality of different types of code combinations thereover and for readily translating any one type of coding to another type of coding.

Still a further object of my invention is to provide methods and means for synchronizing each revolution of transmitting and receiving distributors and for synchronizing the distributors for each successive cycle comprising a plurality of code combinations of impulses in selective control systems.

Still a further object of my invention is to provide methods and means in a control system of the character mentioned, for distinguishing the beginning of each cycle of code combinations of impulses and the beginning of each of the code combinations constituting a cycle.

Still a further object of my invention is to provide novel code combination storing apparatus, transmitting and receiving arrangements for a system of the character mentioned.

A further object of my invention is to provide means for preparing a perforated tape at the receiving end of a system of one type of transmission system and to use this tape to control another type of transmitting circuit.

Still further objects of the present invention will appear hereinafter in the description of the details of the preferred embodiments thereof and are such as may be attained by utilizing the various combinations and sub-combinations hereinafter set forth and as defined by the terms of the appended claims.

Referring to the drawings:

Fig. 1 is a diagrammatic view of the preferred embodiment of my invention showing the circuit and apparatus employed for perforating a tape in accordance with my special code combination arrangement.

Fig. 2 is a similar view disclosing an alternative arrangement of keyboard perforator.

Fig. 3 is a diagrammatic view of the circuits and apparatus of the transmitter arrangement employing the tape prepared by the perforator shown in Fig. 1.

Fig. 4 is a diagrammatic view of a preferred embodiment of the receiver circuits and apparatus associated with the transmitter shown in Fig. 3.

Fig. 5 is a diagrammatic view indicating the timing of the various cams for the form of invention shown in Fig. 4 during the signal intervals for a complete group or cycle of signals.

Fig. 6 is a diagrammatic view of the circuits and apparatus for a modified transmitting distributing arrangement having a single stop segment and a large number of code combination segments used in connection with a transmitter having a lesser number of transmitting contacts.

Fig. 7 shows a modified form of sequence switch for controlling the order in which code combinations are sent in the preferred embodiment of my invention.

Fig. 8 shows a modified circuit arrangement for the sequence switch shown in Fig. 7.

Fig. 9 shows a small section of the tape prepared on the perforator.

Fig. 11 is a diagrammatic view of the multistart printer connected in one of the systems of Fig. 10 with line relay distributors controlling cams both fast and slow and the permutation code bars of a printer suitable for printing in tape form the stock quotation messages.

Fig. 12 is a sectional detail view of a typical type bar and its selector bar associated with the apparatus shown in Fig. 11.

Fig. 13 is a chart of alphabetical characters, numerical figures and fractions codes.

Figure 15:
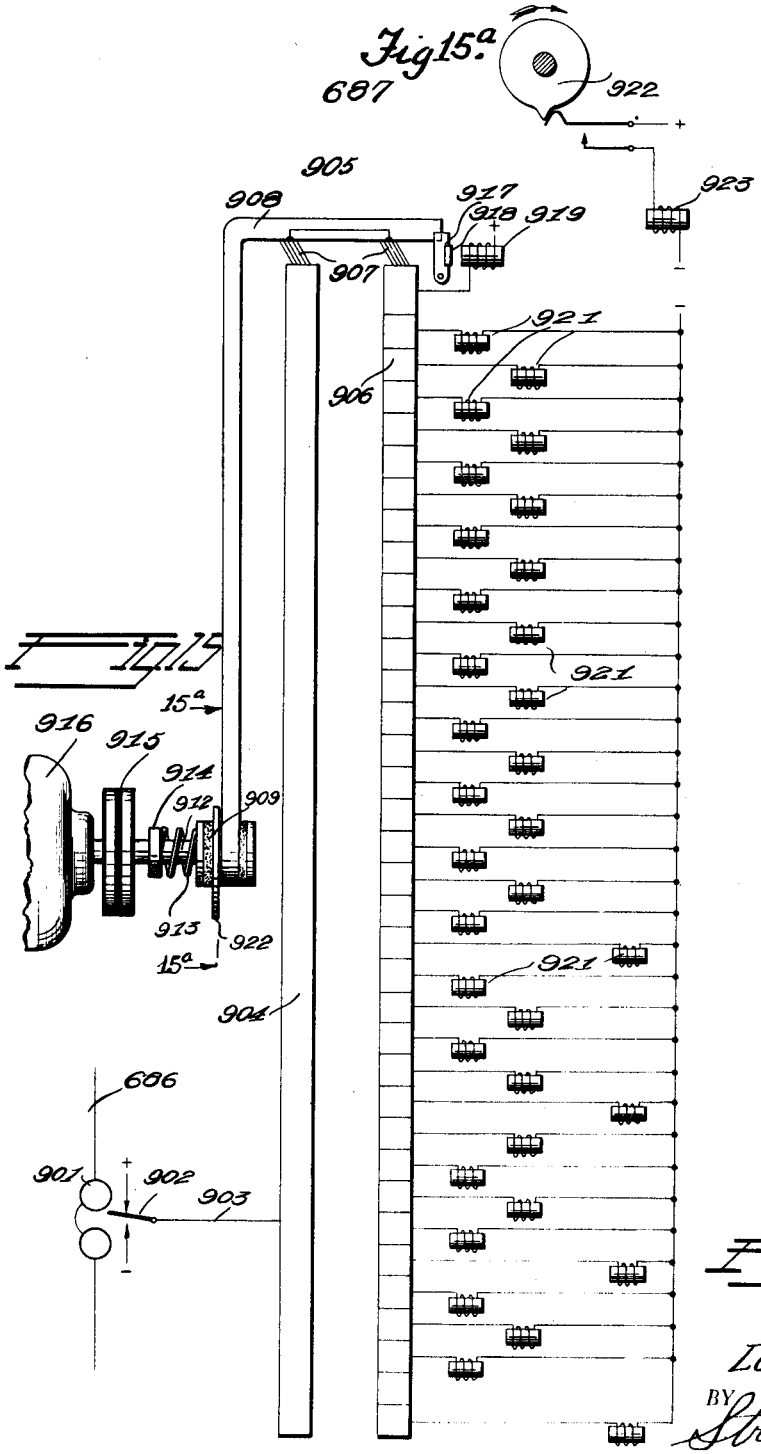
Fig. 15 is a diagrammatic view of a giant receiving distributor connected in another of the systems of Fig. 10 arranged to distribute the signal pulses transmitted by the transmitting distributor of Fig. 6 to thirty-four operating magnets.

Fig. 15*a* is a diagrammatic detail view of a cam and switch assembly which functions in connection with the distributor of Fig. 15.

Figure 16:
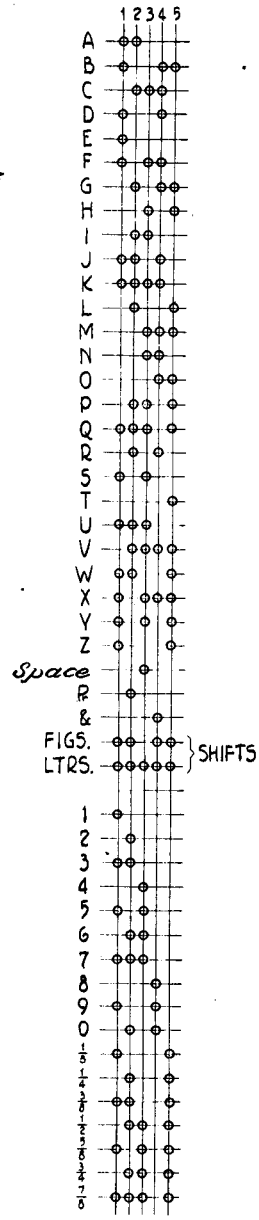
Figure 17:
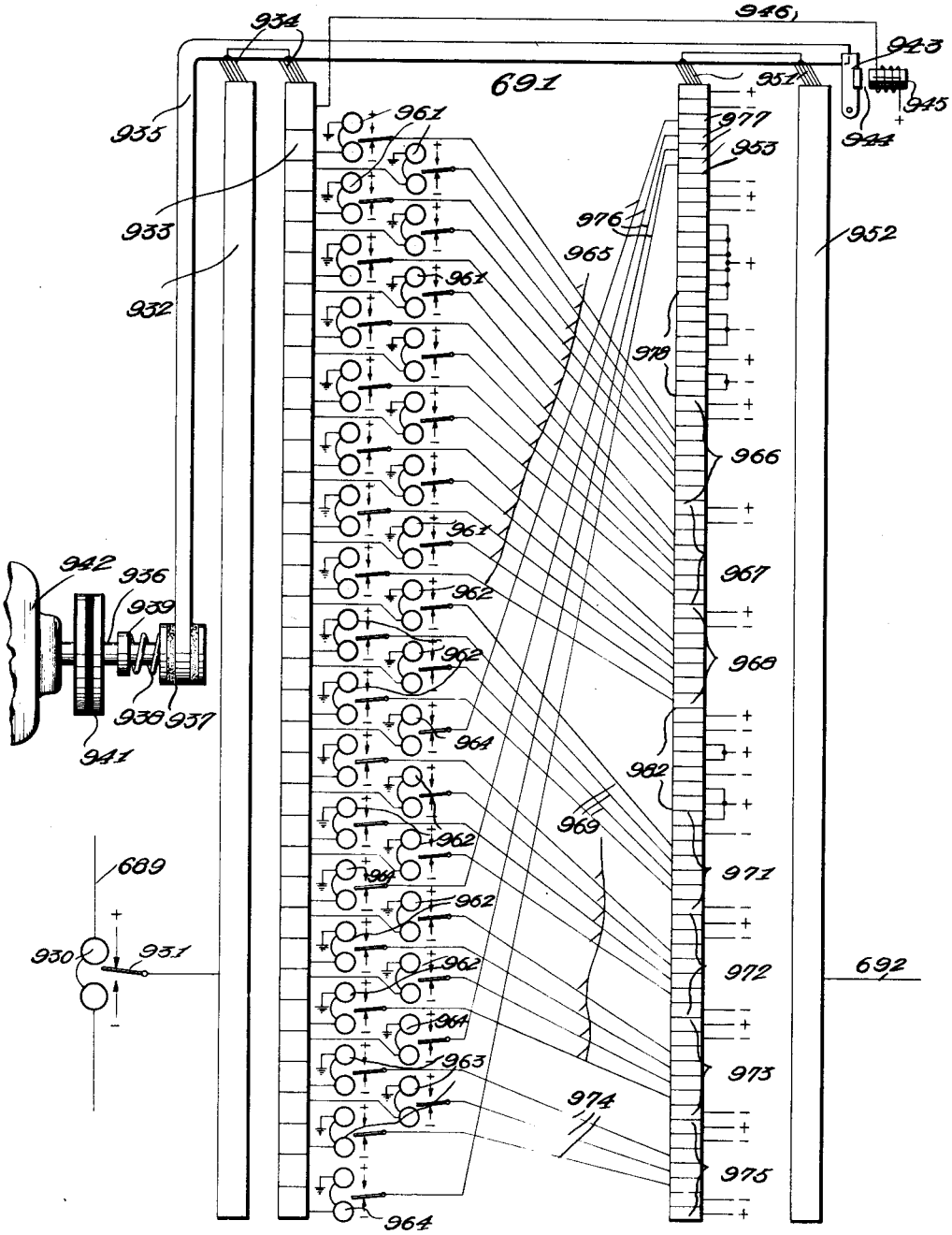

Fig. 16 shows the code of Fig. 17.

Fig. 17 shows a receiving distributor arranged to translate from the code of the transmitter in Fig. 6 into the code of Fig. 16.

Figure 14:
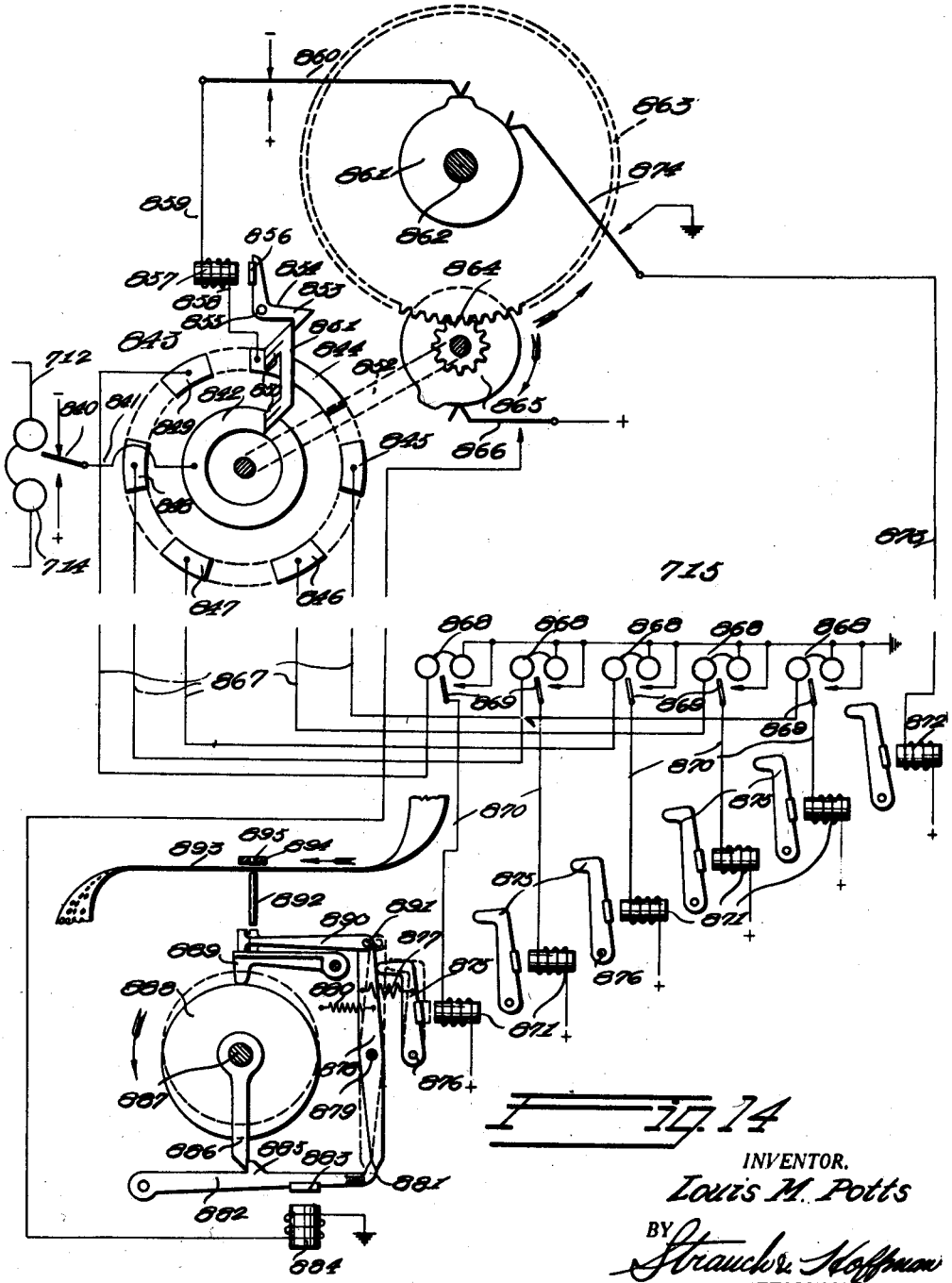
Fig. 14 is a diagrammatic view of a receiving distributor and a perforator for preparing a six unit tape.
Figure 18:
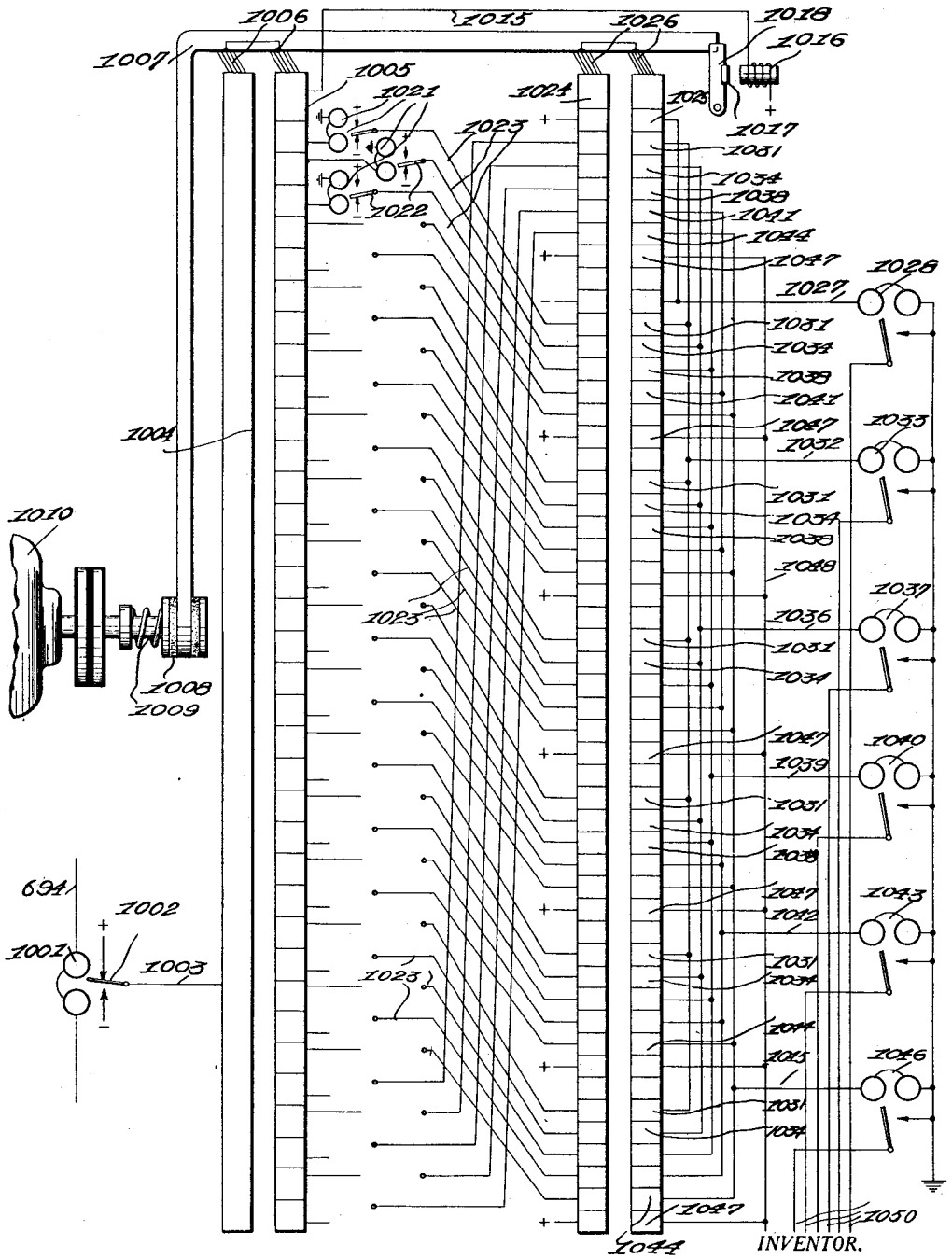

Fig. 18 is a diagrammatic view of a receiving distributor or translator which translates from the code of the transmitter of Fig. 6 into the code of the perforator of Fig. 14.

Figure 19:
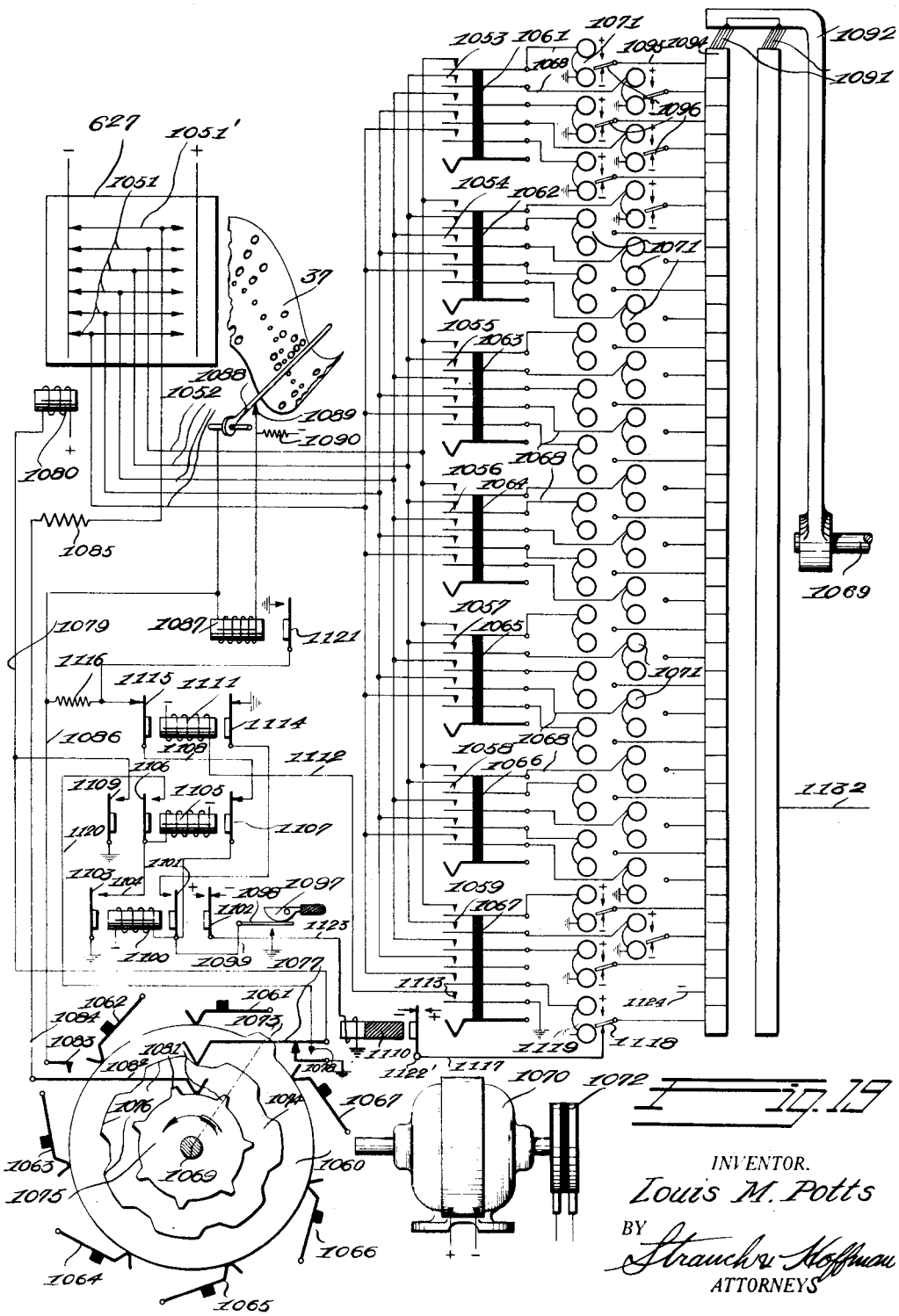

Fig. 19 shows a conventional transmitter combined with a cam and relay system for a multiplex sending distributor of 35 segments.

Figure 10:
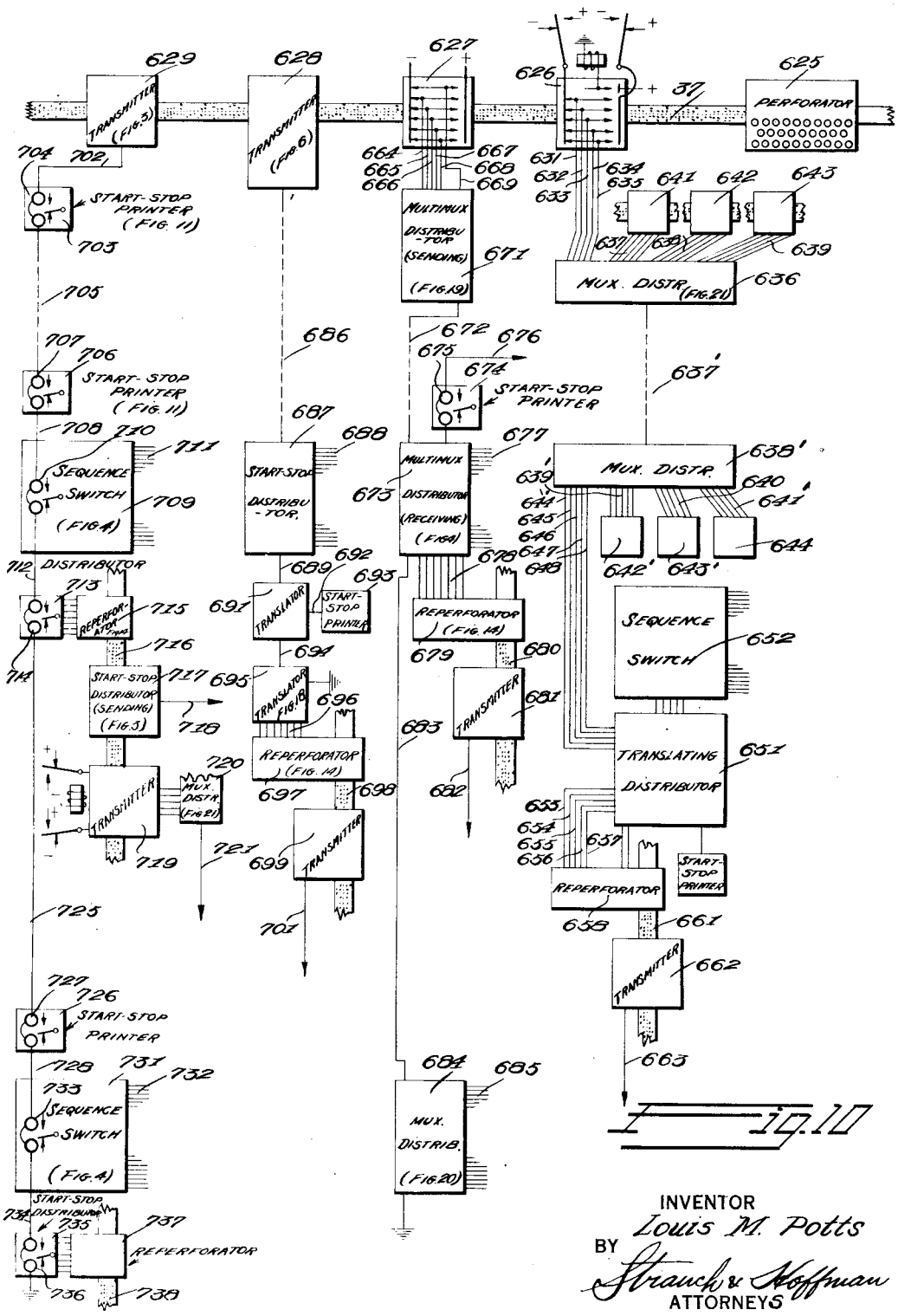
Fig. 10 is a schematic circuit diagram of a plurality of different types of transmission systems in all of which the phasing is controlled by the index perforations in the tape of Fig. 9 as punched by the perforator in Fig. 1.
Figure 20:
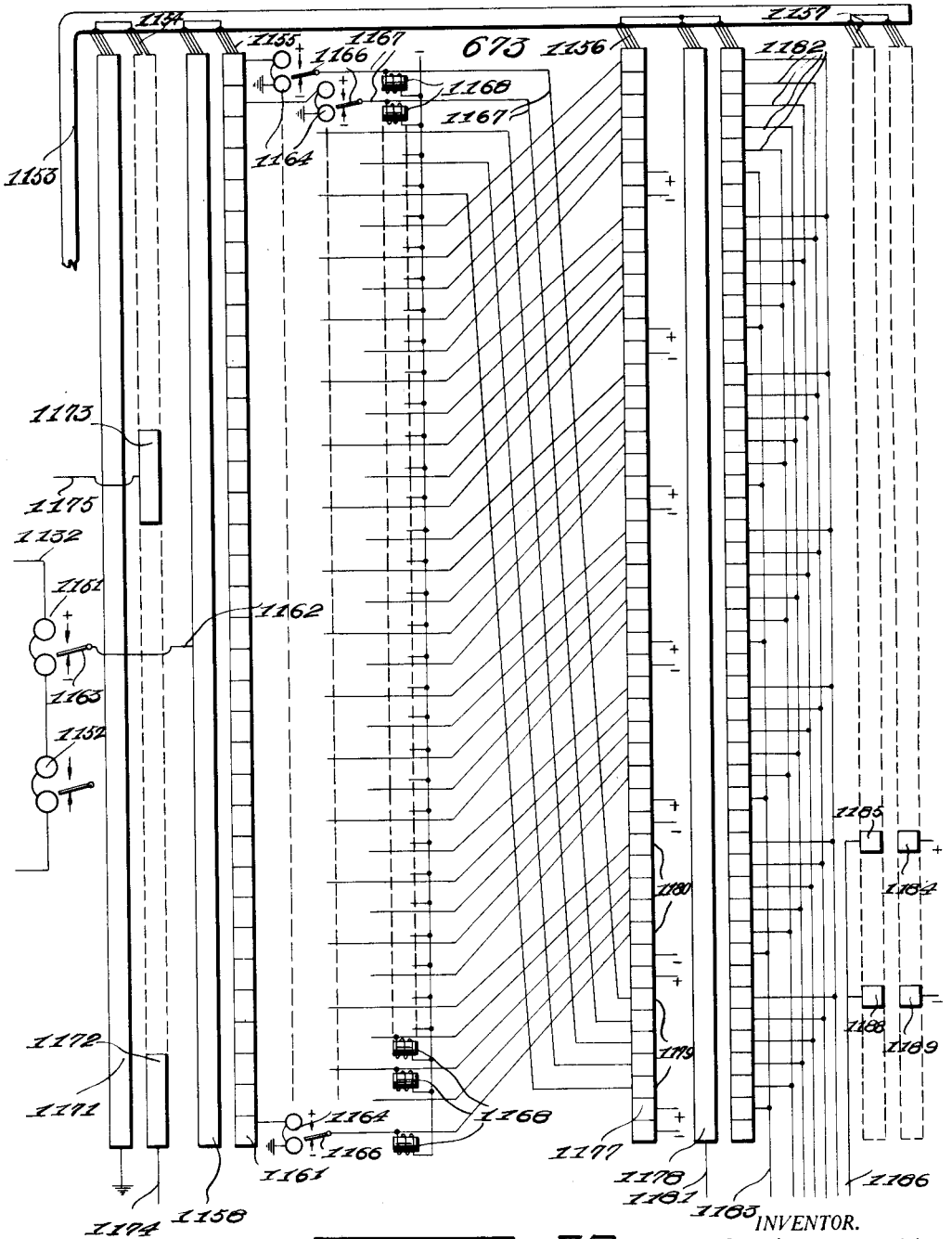

Fig. 20 shows a modified receiving distributor for another of the systems of Fig. 10.

Figure 21:
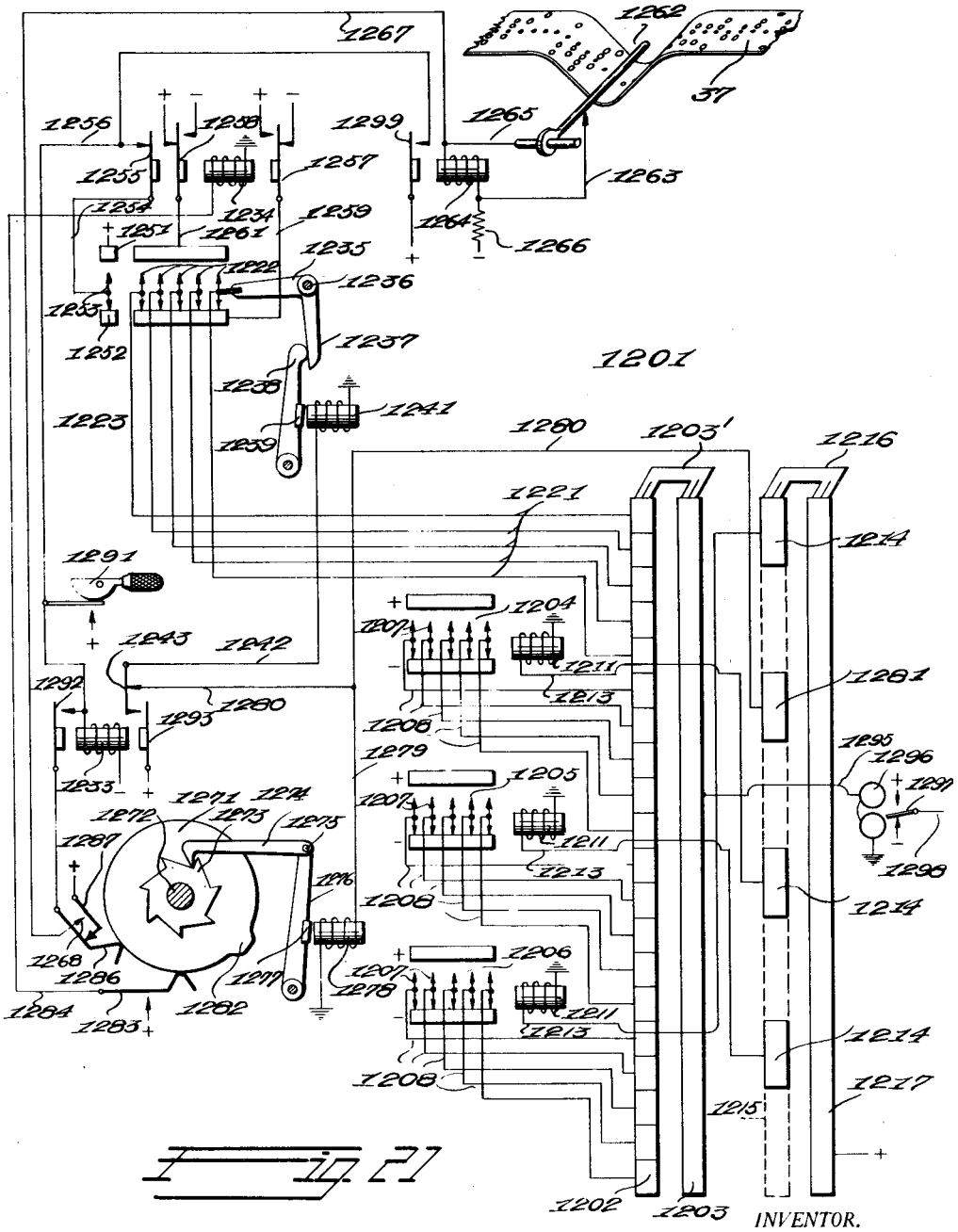

Fig. 21 shows a conventional multiplex distributor operating in conjunction with three conventional multiplex transmitters and one specialized multiplex sender.

Figure 22:
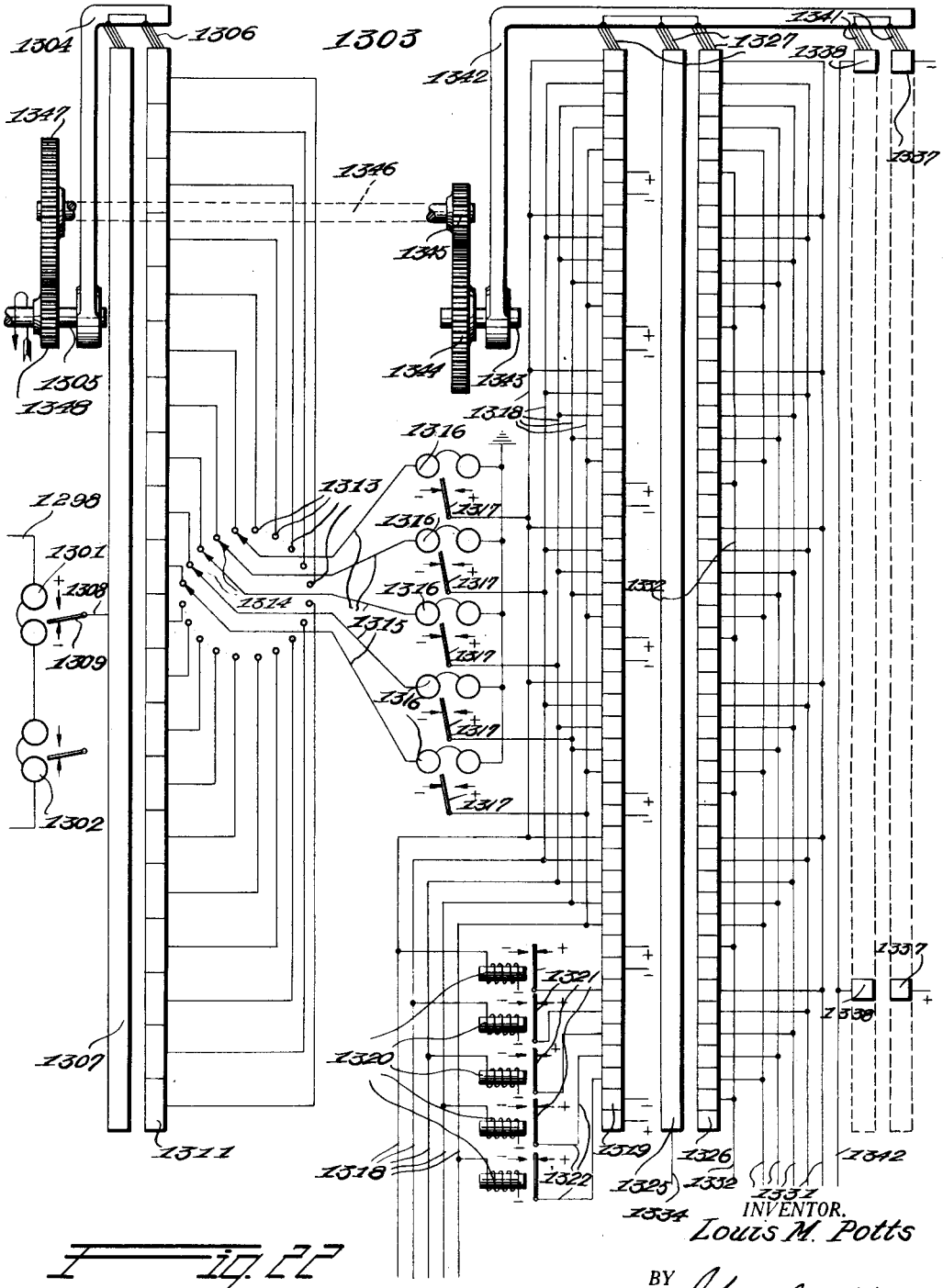

Fig. 22 is a diagrammatic view of a receiving distributor for a commercial multiplex system in which one channel of five segments is translated into a code suitable for operating a printer.

Figures 23, 24:
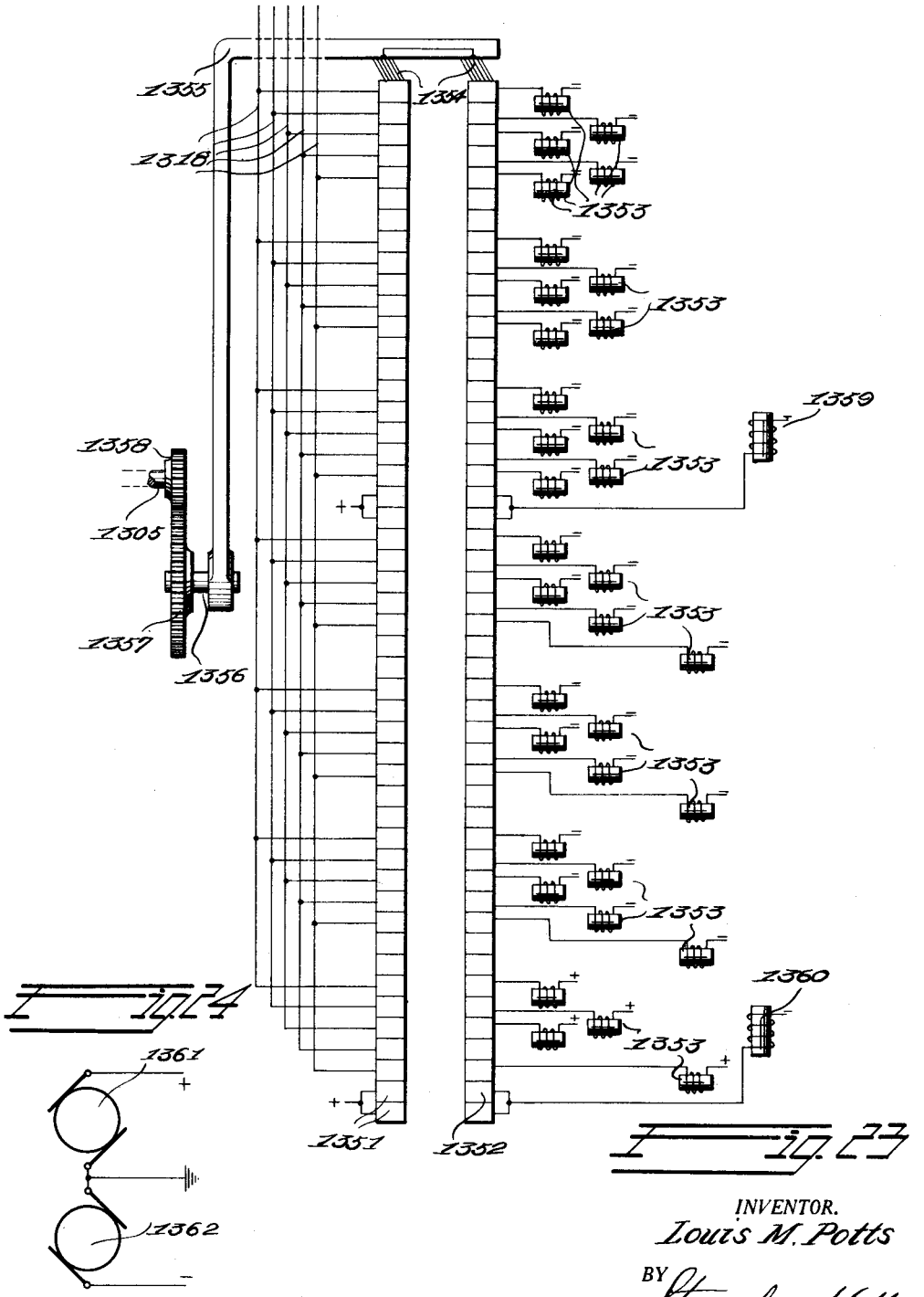

Fig. 23 is a diagrammatic view of a distributor auxiliary to the multiplex distributor, which distributes the code signals to the 34 operating magnets of the stock quotation board.

Fig. 24 illustrates a manner of connecting generators of opposite potentials.

For purposes of illustration, the invention has been described as applied specifically to a stock quotation system although it will be understood that the invention is equally applicable to any remote control system.

*Tape perforator*

In Fig. 1 are shown a plurality of letter levers 1, one for each of the letters of the alphabet, a plurality of numeral levers 2, one for each of the numerals 0 to 9, a plurality of fraction levers 3, one for each of the fractions ⅛ to ⅞ and a plurality of designation levers 4 each shown pivotally mounted on a shaft 5 secured to the frame work. Each of the levers 1 to 4 is provided with a spring 6 one end of which is secured to the rear end of the lever and the other end to the frame work. These spring members 6 normally maintain the levers 1 to 4 in their upper or non-operated position. The forward end of each of the levers 1 to 4 extends through an individual slot 7 in a guiding comb 8 which extends transversely so that a lever 1 to 4 rocked about shaft 5 moves in a vertical plane within a guide slot 7.

Extending underneath the levers 1 to 4 at right angles thereto are a set of permutation bars 9, 9′ and 10. The upper edges of these bars are provided with angular notches 11, as shown, arranged in various combinations, and are disposed in operative relation to the lower edges of the levers 1 to 3 so that upon depression of any one of the key levers 1 to 3, certain ones of these permutation bars 9, 9′ and 10 are moved to the left or right as the lower edges of the levers engage them.

The five bars 9 and 9′ are normally free to move in either direction and are moved to the right or left depending upon the inclination of the surfaces adjacent the notches 11 which are engaged by a depressed key. The bars 9 are operated to the right or left by the letter, numeral or fraction key levers, 1, 2, and 3. Bar 9′ is moved to the right by all letter and number keys and to the left by the fraction keys only.

The permutation bar 10, which corresponds to the 5th code element is normally held to the right by the spring 17, acting through the armature 13 and notch 15 in bar 10. It may be moved to its left hand position only by letter levers 1 and also may be operated to the left by armature 13, of an electromagnet 14, which extends into a notch 15 in the lower edge of the permutation bar 10. The bar 10 is cut away under the number and fraction keys so that the latter may not operate it. The armature 13 is pivoted on the pin 16 and is normally held in non-operated position by action of spring 17, one end of which is secured to the armature and the other end of which is secured to the frame work. When the magnet 14 is energized as a result of the operation of any one of the index keys 4 as will appear more fully hereinafter, armature 13 rocks to the left about pivot 16 and moves the bar 10 to the left. The sixth bar 9′ functions to periodically perforate the tape for phase indication as will be explained. The notches 11 in this bar are so cut that it is shifted to the left for perforating the tape only upon operation of a fraction key lever 3.

As will appear hereinafter, the permutation bars 9, 9′ and 10 when in their left position condition the perforator to perforate a tape. Each bar is provided with a notch 21 at its left hand end in which is carried the end of a connecting lever 22. Connecting levers 22 are pivotally mounted on the pin 23 and at their upper ends are provided with ears 24 in which are pivoted at 25, the perforator pin interponents 26. The interponents 26 are guided in a comb 27 carried on the perforator table 28 and are provided with lug projections 29 at their extreme left hand ends.

In operative relation with each of the interponents 26 is an individual perforating pin 31 provided with a movement limiting shoulder 32 and slidably supported in shelf 33 of the perforator block 34. The perforator block 34 comprises in addition to the shelf 33 a die plate 35 and a guide plate 36 between which a tape 37 to be perforated is fed. The die plate and the guide plate are provided with perforator pin holes 38 and a central feed hole 39 through which the perforating pins 31 protrude when operated in a manner to be described. Normally the pins 31 are in their lower position (as shown) projecting through the lower plate 36 only.

The perforator table 28 is provided with projecting arms 41 pivotally mounted on the shaft 42 about which it is rocked by the solenoid plunger 44 of the solenoid 45 carried on the frame work in any well known manner. As will appear hereinafter, the solenoid 45 is periodically energized to operate the plunger 44 upwardly which in turn rocks the table 28 clockwise about its pivot 42. As the table is rocked the pins 31 which are above the lugs 29 of those levers 26 which have been selectively interposed, will be pushed through the tape making perforations therein. When solenoid 45 is deenergized, a return spring acting upon table 28 restores the latter as well as the solenoid plunger 44 to its normal position.

A bracket 46 is secured to the table 28 and its projection 47 engages one arm of a lever 49 pivotally secured at 51 so that as the bracket 46 reciprocates vertically together with the table 28, the former is oscillated concordantly. Upon its clockwise movement, the lever 49 carrying a spring loaded pawl 53 thrusts the latter rightwardly, causing it to engage the next succeeding tooth of a ratchet wheel 58 mounted on shaft 59. Upon deenergization of magnet 45, table 28 is returned by its spring to its normal position which allows bracket 46 to assume a position whereby the spring loaded pawl moves ratchet wheel 53 to cause, through pin wheel 61 carried by shaft 59, the advancement of tape 37. Since the downward or return movement of bracket 46 through its articulation 47, causes the clockwise motion of lever 49 and through it the feeding movement of pawl lever 53, it will be seen that the tape 37 is advanced after the punches 31 have been withdrawn.

The ratchet wheel 58 is secured to shaft 59 which carries the feed wheel 61 rotatable therewith. The wheels 58 and 61 have the same number of teeth. The feed wheel 61 is provided with feed teeth 62 which engage with the central feed perforations on the tape. On each step in the rotation of the shaft 59, the tape 37 is moved one step to present a fresh surface for perforation.

At the other end of the shaft 59 is a gear 63 which meshes with the pinion 64 carried on and rotating the sequence switch shaft 65 which carries at its remote end the sequence switch 66 comprising a cam 67 which moves into operative relation with the contacts 70 to 81 successively for the purpose of controlling the sequence of code transmission.

The contacts 70, 71 and 72 are connected in multiple over the conductor 83 to a contact 84 in operative relation with contacting member 85. The contact member 85 it will be noted, is carried by an insulating block 86 on the universal bail 89 in operative relation with the lugs 90 on the letter keys 1. The universal bail 89 is pivotally mounted on shaft 92 and held against lugs 90 by action of a spring 93. As will be clear, upon the operation of any one of the letter keys 1, the lug 90 thereof operates the universal bail 89 about shaft 92 causing the contact 85 to engage contact 84 and extending the negative side of battery over the conductor 83 to contacts 70 to 72.

The opposite terminals of the contacts 70 to 72 are connected in multiple and over the conductor 95 to the perforator solenoid 45 so that when any of the contact pairs 70 to 72 is closed, a circuit is prepared contemplating the operation of a key lever 1 to energize the solenoid 45.

The conductor 95 is also connected in multiple with the contact pairs 76 to 78, the opposite terminals of which are multipled over the conductor 97 which extends to the contact 101 which in turn is in operative relation with the contacting member 102 carried through the insulating block 103 on the universal bail 104. The universal bail 104 is in operative relation with lugs 105 on the numeral key levers 2. Upon operation of any one of these numeral key levers, the contact member 102 closes with contact 101 and extends negative potential to the conductor 97. A circuit is prepared upon the closure of any of the contact pairs 76 to 78 and is then subject to completion upon the operation of a key lever 2. It will be clear, however, that this circuit cannot be completed except when the cam portion 67 is in position to close one of the contacts 76 to 78 and accordingly the solenoid 45 cannot be operated by the numeral key levers except at a predetermined position in the cycle of operation.

Conductor 95 is also connected to the contact 80, the opposite terminal of which is connected over the conductor 111 to the contact 112 which is in operative relation with the contacting member 113 carried through an insulating member 114 as in the previous cases by the universal bail 115 which is operated through the lugs 116 on the fraction key levers 3. Solenoid 45 however cannot be operated upon depression of any of the fraction keys 3 except when contact 80 is closed by the sequence switch cam 65.

It will be noted further that the contacts 73 to 75 and 79 are connected in multiple over the conductor 120 which extends from the operating magnet 14 of the code bar 10 as described above. The opposite terminal of the contact 73 extends over the conductor 121, to the front contact 122 of the relay 123.

The circuit for relay 123 extends over the conductor 124 to the contact 125 of the key lever 4 designating Open quotation. When therefore the Open quotation key lever is closed, negative potential is impressed upon the conductor 124 to energize relay 123. Relay 123 is provided with armatures 126 and 127, armature 126 when in engagement with its front contact providing a locking circuit for the relay 123 through the back contact and armature 127′ of the relay 128. Relay 128 is connected over conductor 129 to contact 81. When the cam 67 between the end of one cycle and beginning of the next cycle closes contact 81, the circuit for relay 128 is closed. Relay 128 is energized and opens the locking circuit of any relay such as relay 123, the locking circuit of which is completed over armature 127′. When however, the relay 128 is deenergized the locking circuit for relay 123 may be completed over armature 126 and its front contact and the back contact of armature 127′ to the negative side of battery.

Similar relays 131, 132 and 133 are connected over conductors 134, 135 and 136 respectively to the contacts 137, 138 and 139 respectively the High, Low and Last designation keys 4. Relays 131 to 133 are energized selectively in accordance with which of these particular designation key levers is operated. These relays 131 to 133 are provided with locking armatures 141 to 143 connected in multiple with the locking armature 126 to the back contact of the armature 127′, and are also provided with armatures 144 to 146, the front contacts of which extend over conductors 147 to 149 to contacts 74, 75 and 79 respectively.

At the beginning of a cycle the sequence switch 66 will be in the position shown with cam portion 67 closing the contact 70, the remaining contacts on the sequence switch 66 being open. The circuit for the perforator solenoid 45 including conductor 95 it will be noted, is at this time open at all its multiple contacts on the sequence switch except contact 70 and accordingly the solenoid can be energized only upon the closing of contact 84 connected to conductor 83. Accordingly at this point only the operation of a letter lever 1 will complete an energizing circuit for the solenoid 45.

In order to transmit a quotation, the operator will successively depress three letter levers 1, three numeral levers 2, and a fraction lever 3. If it is necessary to depress any designation or range key lever, it may be done either before or after depressing the letter levers, but must be done before depressing the numeral or fraction levers. Upon the operation of a range designation key lever 4, such as High, a circuit is completed for relay 131 from the negative side of battery through contact 137, conductor 134, relay 131 and positive side of battery. Relay 131 is energized and locks over armature 141 and 127′ as described above. Its operation however has no effect at this time. Upon the depression of the first letter lever 1, the five permutation bars 9 and 10 will be selectively operated to the right or left depending upon the particular letter lever operated in a manner well known in the art. As a result, the individual connecting levers 22 will be selectively rocked about pivot 23 and selectively move pin operating levers 26 to the right or left until their lug portions 29 are under or not under the perforating pins 31.

The depression of this letter lever 1 also closes the contacts 85 and 84 completing an energizing circuit for the perforator solenoid 45 from the negative side of battery to the contacts 85 and 84 over conductor 83, contact 70, conductor 95 through the solenoid 45 to the positive side of battery. As a result, the solenoid 45 is energized and operates its plunger 44 upwardly rocking the perforating table 28 about shaft 42 and moving those pins 31 which are in operative engagement with the lugs 29 through the tape 37. As the table is moved upward, the extension portion 47 moves the pawl 53 to engage the succeeding tooth on the feed ratchet wheel 58.

When now the letter lever 1 is released and the contacts 84 and 85 disengage, the solenoid 45 is deenergized and the operated perforating pins 31 are removed from the tape 37. As the table 28 moves downwardly about its pivot the feed pawl 53 operates the ratchet wheel 58 one step which in turn rotates the shaft 59. The feed wheel accordingly moves the tape 37 one step and a fresh portion of the tape is presented for the next group of code combination characters.

At the same time, the gear 63 rotating the distance of one tooth of the ratchet wheel 58 rotates the pinion 64 in a clockwise direction which in turn rotates the shaft 65, and the sequence switch 66 is rotated so that the cam portion 67 disengages the contact 70 and engages contact 71, contact 70 is opened and contact 71 is closed. This however, has no effect at this time inasmuch as no letter lever 1 is closed. When, however, another letter lever is operated a second energizing circuit will be completed for the perforator solenoid 45 similar to that described in the first case, except that in this instance the circuit will be completed through closed contact 71. It will be noted that this circuit for the solenoid 45 will not be energized unless the second key lever to be operated is of the class of key levers 1.

The operations will be similar to that described in the above cycle of operation, the perforations being in accordance with the particular key lever operated and the tape being fed to a succeeding position immediately after a perforating operation as in the above case. The sequence switch 66 will thereupon be rotated to close contact 72. At this position a circuit for the solenoid 45 can only be completed upon the operation of a letter lever 1.

The sequence switch 66 following the release of the third letter key lever 1 and the deenergization of solenoid 45 is rotated one step opening the contact pair 72 and closing contact pairs 73 and 76. The circuit for solenoid 45 then extends through the contact 76 over conductor 97 to the contact 101 which engages contact 102 under control of the numeral key levers 2. This circuit, it will be noted, is multipled over the succeeding two contacts 77 and 78 on the sequence switch 66 and accordingly unless the next three levers to be operated are numeral levers, no code perforations can take place.

Assuming however that one of the key levers 2 is closed, four of the permutation bars 9 which are in operative relation therewith are operated to in turn move the levers 26 carrying lugs 29 in operative relation with the perforating pins 31.

Simultaneously the solenoid 45 is energized perforating the tape in accordance with the setting of the code bars. Upon the release of the operated lever 2, the solenoid 45 is deenergized stepping the tape as described above and stepping the sequence switch to the next succeeding position. This cycle of operation is thereupon repeated while the cam portion 67 of the sequence switch 66 successively closes the contacts 77 and 78.

After the perforation of the three code combinations for each of the three numeral levers 2 which are successively operated, the sequence switch 66 is in a position at which contact pair 80 is closed and the circuit for the perforating solenoid 45 is completed over the conductor 111 extending to the contact 112 controlled by the fraction key levers 3 and accordingly unless one of the fraction key levers 3 is operated at this time, no circuit can be completed for the solenoid 45. As now apparent from the above, the perforating mechanism can not function unless the levers are operated in a predetermined sequence.

During the period while the sequence switch cam portion 67 is moving over the last four contacts mentioned, it will be noted that in addition to the contacts 76 to 78 and 80 which are operated for closing circuits for the perforator solenoid 45, contacts 73 to 75 and 79 are also operated, one contact of each of these being connected in multiple over conductor 120 to the magnet 14 and the opposite contacts being individually connected over conductors 121, 147, 148 and 149 to the front contact of armatures 127, 144, 145 and 146 of the relays 123, 131, 132 and 133 respectively.

Depending therefore upon which if any of these relays 123, 131 to 133 has been energized in accordance with the particular designation key which has been closed, as described above, a circuit will be completed for the magnet 14 with the sequence switch closing one of the contact pairs 73 to 75 and 79. In the above case, it has been assumed that the High designating key 4 was operated and accordingly that relay 131 was energized. Relay 131 it will be noted extends negative battery over the armature 144 at its front contact to conductor 147 which extends to the contact pair 74. When the sequence switch reaches the contact pair 74, an energizing circuit is completed for the magnet 14 which upon energization rocks its armature 13 and through engagement with notch 15 moves the permutation bar 10 to the left and a perforation on the tape in accordance with this code bar will accordingly be made. As will be described in connection with the transmitter and receiver, this particular perforation will vary the code combination of transverse row of holes containing a numeral code to indicate the index of quotations, it being recalled that normally only the four code bars 9 are operated by the numeral key levers and three by the fraction key levers. Thus for example had the fifth perforation occurred during the perforation of the first numeral code combination the designation would be for an Open quotation. In the present case the fifth perforation occurs simultaneously with the perforation of the second numeral and the index designation is High.

It will also be noted that upon the operation of a fraction key lever 3, the code bars are operated as in the case of the numeral levers 2 and in addition, a sixth bar 9' is operated to the left to make a sixth perforation for the purpose to be described hereinafter. This completes a cycle of operation and the sequence switch cam 67 moves from contact 80 to contact 70. In making this last step, contact 81 is momentarily closed to energize relay 128 cover conductor 129. Relay 128 energizes and opens the locking circuit of any one relay 123 to 133 which has been energized and locked in the previous cycle and the apparatus is now in condition to repeat the above cycle of operations.

In the event that this order is not maintained the perforating solenoid 45 which controls the operations which produce the perforations in tape 37 is not energized and accordingly no further operations can occur, the apparatus merely remaining in a non-operated condition until the proper key levers are depressed.

In the above, a perforator arrangement has been described which requires that key lever operation be executed in a predetermined sequence, the levers controlling the perforations being arranged in groups. It will be clear that the same principle may be applied to the operation by these perforating controller levers of contactors directly connected to a signalling line so that code combinations of signals are transmitted over a line in predetermined sequence just as in the present case perforations on a tape are made in predetermined sequence.

Although the designation or range key levers are shown to energize the individual relays 123, 131 to 133, it will be evident that they can also be arranged to energize various combinations of these in the event that a greater number of code combinations is desired to be transmitted.

Although a sequence switch 66 with a cam 67 is here shown and described, it will be clear that this is merely by way of illustration and that any other form of switch which successively closes contacts such as the standard telephone switch may if desired be substituted therefor.

The tape 37 perforated in the above manner comprises groups of perforations, the first three successive cross perforations representing letter codes, the next three representing numbers and the last one representing fractions. There will also be included in the group of perforations corresponding to figures and fractions, the designation code combination which is represented by the presence of a fifth perforation in addition to the regular figures combination.

Associated with the fraction perforations there is perforated in every case, a sixth hole which is not perforated in any other position. This perforation does not control the transmission of a code combination signal as do the other perforations, but it may control the polarity of the start and stop signal pulse and so may establish and maintain the correct phase relation between the transmitting and the receiving apparatus.

By comparing the code bar 9' with the general class of code bars 9, it will be noted that whereas the general class of code bars is provided with an apparent irregular distribution of inclined cam projections to cooperate with the key levers 1, 2, and 3, the code bar 9' has instead two groups of projections with the projections of each group similarly inclined and differing from those of the other group. The projections lying beneath the fractions key levers 3 are inclined so that the depression of one of these key levers moves the code bar 9' to the left, Fig. 1, while the projections occurring beneath the key lever classes 1 and 2 are inclined so that upon the depression of any of these key levers, code bar 9' is moved to the right. Accordingly, upon the actuation of a fraction key lever 3, code bar 9′ being moved to the right, there results a shifting in its corresponding interponent 29, causing the so-called sixth hole or phasing perforation to be made in the tape, but thereafter when a key lever 1 is depressed in accordance with a subsequent quotation message, code bar 9′ is removed to its normal position whereat the interponent 29 thereof is ineffective, preventing the operation of the sixth hole punch 31.

*Tape transmitter*

The perforated tape 37 is fed to the automatic transmitter, Fig. 3, by means of the feed wheel 151, the teeth of which engage the central row of perforations on the tape. Feed wheel 151 is rotated in a step by step manner to be described in detail hereinafter. In operative relation with the perforations positioned across the tape 37 are individual feeler levers 162 to 167 all pivotally mounted on a rod 154 about which they tend to rock in a counter-clockwise direction by action of individual springs 168. Although these levers are shown diagrammatically as positioned beneath each other, it will be understood that this is merely for purpose of clarity and that in practice the levers are in a horizontal row on a common pivot 154 and in operative relation with the tape. Each of the feeler levers is provided with a feeler pin 171 which when the associated lever is moved in a counter-clockwise direction about its pivot 154 enters a perforation when there be one in the tape 37. Each of the levers 162 to 167 is also provided with a contact extension member 172 which is arranged to move between lower and upper contacts in accordance with the movement of the feeler levers.

Extending across the top of the levers 162 to 167 is a rod 173 carried on a cam operated lever member 174 which is pivoted at 175 and is in operative engagement at 176 with a rotating cam member 177 and held in operative relation therewith by a spring 178 one end of which is secured to the end of the lever 174 and the other end to the frame work. As the cam member 177 rotates on its shaft 179 the lever 174 is rocked about its pivot 175 as it follows the cam member 177 by action of its spring 178. The rod 173 is accordingly rocked in a to and fro motion periodically holding the feeler levers 162 to 167 out of engagement with the perforated tape and thereafter permitting the feelers to move upwardly under action of their individual springs. Those feeler pins 171 which are beneath a perforation in the tape will then continue to move into the perforation until the associated contact 172 engages its upper contact.

Operated by the rod 173 is a lever 181 which is pivoted at 182 and at 183 has pivoted thereto a feed pawl 184 which by action of spring 185 is in operative engagement with the teeth of a ratchet wheel 186 on the same shaft with the feed wheel 151. As the rod 173 moves upwardly the lever 181 is rocked about its pivot 182 raising the feed pawl 184 to engage the next tooth on the ratchet wheel 186. During the downward movement of the rod 173 the ratchet wheel 186 and accordingly the feed wheel 151 is moved one step to present a succeeding row of perforations to the feeders 162 to 167. It will be noted that this movement of the tape occurs after the feelers are out of engagement with the tape, the rotation of the feed ratchet 186 occurring during the downward movement of rod 173.

The lower terminals with which each of the contactors 172 engage are connected in multiple and over the conductor 191 to the negative side of a source of energy 192 through a resistance 193. Similarly the upper contacts with which contactors 172 engage are connected in multiple and over conductor 194 through resistance 195 to the positive side of a source of energy 196. These sources of energy are shown grounded in the usual manner. Although in the present case two such sources are shown, it will be understood that in practice, a single source with a mid terminal connection may be employed instead.

The five feeler levers 163 to 167 are connected over the conductors 201 to 205 to the last five segments respectively of the segmented distributor 206. Segmented distributor 206 comprises in addition to the last five segments the stop segment 207 which is connected over conductor 208 to the armature 209 of a polar relay 210 and a start segment 211 which is connected over conductor 212 to the armature 213 of a polar relay 214. The pair of relays 214 and 210 connected over the conductor 215 to the sixth feeler lever 162 are responsive to the sixth perforation for transmitting start and stop impulses in a manner to be described.

Connected in series with relays 210 and 214 is a polar relay 216, the opposite terminal of which extends over the conductor 217 to a segment 218 of a distributor ring 219 bridged by brushes 220 and 221 with a solid distributor ring 222 which is grounded at 223. Relays 216, 210 and 214 accordingly are operated during a code period when the sixth perforator lever 162 is received within the sixth perforation in the tape 37 for controlling the transmission of a stop impulse in a manner to be described.

The relay 216 is provided with an armature 225 which engages a contact connected to conductor 226, extending to the distributor controlling magnet 228 mounted on a frame 229 to which is pivoted an armature 230 at pin 231.

In operative relation with the armature 230 is a distributor arm 231′ which carries the brushes 220 and 221, as well as brushes 232 and 233, brush 232 wiping over the distributor 206 and brush 233 wiping over a solid ring 234 which is connected to the signalling line 235 extending to a remote receiving station. The brushes 232 and 233 are connected to each other by a connecting wire 236.

As shown, the magnet 228 is provided with a control circuit which extends over wire 226 to the armature 225 of the relay 216 and thereafter to negative current supply controlled by the tape-follower contactor 241, carried on the arm 242 which extends over a slack loop in the perforated tape 37 and has a latch device 243. The arm 242 is shown in its upper position where it may be permanently held by latch 243, so that the negative supply contact will remain open and the start magnet 228 remains deenergized. When it is desired to start transmission the latch 243 is released manually thus allowing the contact to close. If it is desired to have the arm continually controlled by the slack in the tape, the latch 243 could be thrown permanently out of engagement, or this may also be accomplished by making the contactors 241 engage its contact point at a suitable distance in advance of the latching position of detent 243 so that when the tape is operating automatically, it never lifts the rod 242 high enough to engage the latch, but by pushing the arm up further manually the latch 243 will lock the contact open.

When the tape is looped and away from arm 242 as shown and latch 243 has been released, contactor 241 engages and connects negative side of battery to the magnet 228. When, however, the tape becomes taut, the arm 242 is shifted in a counterclockwise direction causing contactor 241 to disengage. The tape loop may shorten after contact 241 has opened due to the fact that the circuit of starting magnet 228 may be closed at contact 225 and the tape may make six more steps but the relation of the parts is such that this additional motion will not cause arm 242 to be locked up by latch 243. If, however, it is desired to stop the transmitter arbitrarily, the arm 242 may be lifted higher to engage latch 243 as otherwise the contact 241 and the operation of the transmitter will be automatically controlled by the loop in the tape.

The distributor arm 231' is carried on a friction clutch mechanism 251 spring pressed by means of spring 252 on the motor shaft 253 of the motor 254. Interposed between the motor 254 and the clutch mechanism 251 is a speed regulating mechanism 255 of any well known construction. The motor 254 and clutch 251 also drive cam 177 on shaft 179 and in this manner maintain a predetermined relation between the cam rotation and the distributor.

The operation of the apparatus will now be described. Normally the motor 254 and shaft 253 are rotating but the arm 231' connected through the friction clutch 251 is held from rotation as shown, by engagement with the armature 230 of the deenergized magnet 228. This deenergized condition of magnet 228 prevails when the relay 216 has operated in response to a sixth perforation in the tape as will be described hereinafter subsequent to the tape becoming taut and contact 241 disengaged, or the latching of lever 241 by pawl 243, as shown in the figures. During the period in which the arm 231' is stopped, a negative stop-signal current flows to the line wire 235 over the circuit from negative source 192, resistance 193, wire 191, left point of relay 210, armature 209, conductor 208, segment 207, brush 232, conductor 236, brush 233, ring 234 to line wire 235.

Assuming now, that the tape is not taut and that the pawl 243 has been released, the contactor 241 is in engagement with its contact and negative battery is supplied over the conductor 226 to the magnet 228, thence to positive side of battery. Magnet 228 becomes energized and operates its armature 230 to move out of the path of the arm 231' which thereupon starts rotating carrying its brushes 220, 221, 232 and 233, and imparting motion to cam 177.

First, the cam 177 moves from the position shown and the lever 174 rotates about its pivot 175 in a counterclockwise direction permitting the feeler pins 171 to enter the perforations of the tape 37. The movement of levers 162 to 167 and accordingly the engagement of contactors 172 with either their upper or lower contacts depends upon the presence or absence of perforations in the particular positions with which the feeler pins 171 are in operative alignment. Positive or negative energy will be impressed upon the conductors 201 to 205 from the sources of energy 192 and 196 over the lower or upper contacts in engagement with the contactors 172.

With no sixth perforation in position, the feeler pin 171 of the sixth feeler lever 162 will be held from moving into the tape and the contactor 172 will remain in engagement with its lower contact. Current from the negative side of source 192 accordingly is extended over the lower contact and contactor 172 of the feeler lever 162 and over the conductor 215 through the polar relays 214, 210 and 216 in series etc. This however has no effect at this time as the circuit is open at segment 218. The armatures 213, 209 and 225 are in engagement now with their left hand contacts due to a previous operation as will be described. At this time negative stop-signal current from the source 192 flows to the line conductor 235, as described.

When the brush 232 reaches the second segment 211 on the distributor 206, current from the positive source 196 flows over the left hand contact and armature 213 of the relay 214 over conductor 212, the second segment 211 of the distributor 206 and then over the circuit as described above over conductor 235. Positive current is at this time the start condition to which, as will be described hereinafter, the receiving apparatus at the remote end of the conductor 235 is responsive for starting the distributor thereat into operation for the first code of a seven-code cycle.

As the brush 232 now rotates over the third to seventh segments, current flows from either the positive or negative side of battery depending on the position of levers 163 to 167 and over the conductors 201 to 205 successively to conductor 235 as described above. A code combination of impulses is accordingly transmitted depending upon the perforations in the tape. At the end of the cycle of operation for the first code combination, the cam 177 will have rotated to the position shown at which point the shaft 173 moves the feeler levers 162 to 167 out of the tape perforations and simultaneously rotates the feed wheel 151 to move the tape to present a new row of perforations to the feelers.

It will be noted that during the above described cycle, the brush 220 moved over the segment 218 and completed a circuit for the polar relays 214, 210 and 216. In the case described with the feeler lever 162 held in its lower position because of no sixth perforation, negative current from the energy source 192 flowed over the lower contact and contactor 172, conductor 215 and through these relays 214, 210 and 216 as a result of which the armatures thereof are reversed from the positions shown.

In the event however that the last or fraction code combination of a group is being transmitted, the sixth or phasing perforation in the tape will permit the feeler lever 162 to move upwardly and contactor 172 will move to its upper contact, at which point a circuit from the positive side of the energy source will be completed through the relays 214, 210 and 216. Accordingly during the period in which the last of the group of code combinations is being transmitted as described above, relays 210 and 214 will move to engage their left hand contact and relay 216 will open. When the brush 232 engages the first segment for the next cycle, an impulse from negative side of source 192 will flow over the left hand contact of armature 209 to conductor 235 and when the brush 232 engages the second contact, a positive impulse will flow from the source 196 over the left hand contact of armature 213 and conductor 212 to line 235.

It will be noted from the above description that the stop and start impulses corresponding to the initial letter of a group of code combinations of singles are minus and plus, respectively, and that the stop and start impulses corresponding to all the other signals in a group are plus and minus respectively. If, during the transmission of the code combinations in a group the tape 37 becomes taut and opens the contactor 241, nothing will happen immediately as the magnet 228 will continue to receive its energizing current by way of armature 225. However, for the transmission of the last code combination in the group, the feeler pin 171 of the sixth feeler lever 162 will move into the sixth perforation as described above and during this code combination period the polar relay 216 operates its armature 225 to disengage its contact as already described and the circuit for magnet 228 will be opened.

It will now be clear that if the transmitter is in operation and the tape, because of sufficient slack therein, is clear of arm 242, contact 241 will remain closed and the magnet 228 will be energized permitting continued rotation of the transmitting arm. If however, the slack of the tape is taken up, the arm 242 is rocked and the contact 241 opens. However, the circuit for the magnet 228 will continue to remain closed over the contact of the relay 216 and will so remain until such relay is operated during the transmission of the last code combination as described above. It will be clear from the above that the extra or sixth perforation on the tape locally controls the distributor so that it will stop automatically at the end of a group of signals representing a complete quotation or message.

The operation of the polar relays 210 and 214 from the right hand position in the manner described above in turn reverses the polarity of the current flowing over the conductor 235 over the stop and start segments of the distributor. As will be recalled, preceding the transmission of the first code combination of the group, the stop impulse is of a negative polarity and the start impulse of positive polarity. Thereafter during the transmission of the remaining code combinations, the relays 210 and 214 being so energized as to hold their armatures 209 and 213 respectively in engagement with their right hand contacts, the polarity of current flowing over the conductor 235, over the stop segment is positive and over the start segment is negative. As will appear more fully hereinafter, the receiver is arranged to start into operation in response to a positive start impulse for the first code combination and a negative impulse for the code combinations thereafter.

*Receiving station*

The conductor 235 extends from the transmitting station through a polar relay 270 at a remote receiving station, Fig. 4. The armature 271 of the receiving relay 270 operates between two contacts which are connected through resistances 273 and 274 to the negative and positive side of battery respectively. The armature 271 is connected over a conductor 276 to a ring 277 of a distributor 278. The distributor 278 comprises in addition to the ring 277 a segmented ring 279 having a set of receiving elements or segments, the first segment of which is a stop segment on which the brush 281 normally rests. Rings 277 and 279 are bridged by the brushes 281 and 282 on the arm 283 which is normally driven through friction disk plate 284 by the motor shaft 285 of the motor 286. A speed governor 287 connected on the motor shaft controls the speed of rotation of the motor within predetermined limits. A spring 288 carried on shaft 285 and engaging the shoulder 289 presses the disk 284 against the arm 283 for rotating the same.

Carried with the arm 283 in a pinion 291 which meshes with the gear 292 on the shaft 293. Integral with the gear 292 is a second gear or pinion 294 which meshes with gear 295 on the shaft 296 and which controls a distributor mechanism comprising a group of cam disk members 297 to 303 each having a cam portion 304.

In operative relation with each of these cam disks 297 to 303 is a pair of cam followers 305 and 306 carried on lever members 307 and 308.

As shown, the lever 307 controlled by the cam follower 305 of the first disk 297 controls three contactors 310, 311 and 312. The first contactor 310 controls the polarity of current on the line 315 which extends to the start magnet 316 of the distributor 278. The opposite side of this start magnet extends over the conductor 317 to the start segment on the distributor ring 279. Energization of start magnet 316 is controlled jointly by the start impulse over the line 235 and the operation of the lever 307 as will be described hereinafter.

Contactors 311 and 312 in turn control circuits from conductors 321 and 322 respectively to the magnets 323 and 324, the circuits extending over the conductors 321 and 322 respectively and through the first and second segments on the distributor ring 279. As will appear hereinafter, impulses received over the line passing through the distributor operate jointly with the sequence switch cam disk member 297 to control the energization of magnets 323 and 324. Magnets 323 to 327 are storage elements and may control devices for selecting items to be quoted as shown in application Serial No. 378,463, filed July 15, 1929, or any other well known form of selector such as a telegraph printer.

The follower 306 on disk 297 controls three spring contacting members 328 to 330 each of which controls individual circuits of magnets 325 to 327 connected respectively over the conductors 332 to 334 to the third, fourth and fifth segments on the distributor ring 279 and these are successively energized as the impulses are received.

It will be noted that the sequence cam disks 297 to 299 each control five contacts to five individual magnets similar to magnets 323 to 327. The disks 297 to 299 as will appear hereinafter are responsive to the first three received code combinations which as already stated are for letters of the alphabet for designating the stock which is to be quoted.

The sequence switch cam disks 300 to 302 each control four magnets 343 to 345 of register or indicating devices, such, for example as shown in application Serial No. 378,463, filed July 15, 1929. Magnets 343 to 345 are operated by the next three succeeding code combinations which comprise the numeral code combinations as described above to indicate the quotation. The last cam 303 controls the magnets 346 of the register or indicating device for indicating the fraction value of the quotation.

In addition to the operation of these magnets, these cam disks also control over contacts 347 to 350 respectively, the four magnets 351 to 354 which are the designation magnets and which as described above receive impulses simultaneously with the transmission of one of the numeral or fraction code combinations.

These cams are arranged so that each one is one seventh of a circumference behind the one ahead of it and each cam is arranged to operate two groups of contacts, one after the other. In the position shown, the first and the last cams close individual circuits and the apparatus thereof is ready to receive the signals.

Having described the details of the apparatus, the operation thereof will now be described. It will be recalled that the first transmitter contact 207 in Fig. 3 at the beginning of a cycle of operation is connected to negative side of energy source 192 over conductor 208, armature 209 and conductor 191. Accordingly current of negative polarity flows over the line 235 and through the polar receiving relay 270 in Fig. 4 to ground return and as a result the armature 271 is held in engagement with its lower contact connected to the negative side of battery. At this time (the beginning of the cycle) cam 297 is in the position shown and is holding contactor 310 in engagement with its lower contact. Control magnet 316 is therefore connected to the negative side of battery over conductor 315 and to the same side of battery over conductor 317, segment S, ring 277, conductor 276 and armature 271. The armature of magnet 316 is accordingly in its deenergized position holding the distributor arm 283 from rotation.

When the transmitting distributor brush 232, Fig. 3, moves to the second or start segment, current of positive polarity from source 196 flows over line 235 from the source 196, conductor 194, armature 213, conductor 212, the second segment 211, brushes 232 and 233 and conductor 235 to relay 270. The armature 271 of relay 270 is thrown to engage its upper contact and current from the positive side of battery flows through the armature 271 over conductor 276, ring 277, brushes 282 and 281, segment S, magnet 316, conductor 315 and contactor 310 to the negative side of battery. The magnet 316 is energized and moves its armature out of the path of the arm 283 which is thereupon released for rotation.

Gear 295 and shaft 296 driven by gear 291 are also started into rotation, the relative speeds being such that as the distributor brush 281 is rotating over the first two code combination segments, the cam 297 is holding contactors 311 and 312 in engagement with their respective contacts preparing circuits for the magnets 323 and 324. It will also be understood that the receiving distributor 278 rotates at a speed in synchronism with the transmitter distributor of Fig. 3 so that as the successive impulses are sent by the brush 232, the distributor brush 281 wipes over the corresponding contacts. When the brush 281 therefore wipes over the first code combination segment and the first code combination impulse is received, a circuit is completed from the armature 271 over conductor 276, brushes 282 and 281, the first code combination segment of the distributor 278 over conductor 321 and contact 311 to the first magnet 323 connected to the negative side of battery. If the first received code combination impulse is a marking impulse or of positive polarity, the armature 271 will be in engagement with its upper contact and the magnet 323 will be energized. In the event, however, that the first received impulse is a spacing impulse or of negative polarity, the armature 271 will be in engagement with its lower negative contact and magnet 323 will not be energized. Similarly when the distributor brush 281 is in engagement with the second code combination segment, a circuit will be completed for the magnet 324 depending upon the particular character of the second code combination impulse received.

While the distributor brush 281 is moving over the segments S, 1 and 2, the cam 303 moves out from under the follower 306, the cam 297 moves a sufficient distance to close contacts 328 to 330 associated with receiving magnets 325 to 327 respectively yet retaining closed the contacts 310 to 312, the magnets 325 to 327 will be each energized or not depending upon the character of the code combination impulses received by the receiving relay 270 while the distributor brush 281 moves over the third to fifth segments.

At the end of the first revolution of distributor brush 281, the cam 297 will have completed one seventh of its revolution and the contacts 310 and 311 will be open. At the same time the cam 298 has rotated to a position at which it closes its two left hand contacts for the first two magnets 323 and 324. It will be noted, during this code combination period, cam 297 having rotated beyond the follower 305, the contactor 310 engages its upper contact and connects the positive side of battery to the start magnet 316. Accordingly for the second code combination, the start impulse must be of negative polarity inasmuch as only when the armature 271 is in engagement with its lower contact will the magnet 316 be energized for releasing the distributor a second time. The last code combination of a cycle perforated on the tape is, it will be recalled, also perforated at the sixth pulse so that during the transmission of the last code combination, relays 210 and 214 are moved to the position shown. Accordingly the start impulse for the first code combination is of positive polarity. During the transmission of this code combination however, the lever 162 remains in its lower position due to the fact that there is no sixth pulse perforation with the first code combination. Accordingly during the transmission of the first code combination while brush 220 wipes over segment 218, relays 216, 210 and 214 are energized by current from the negative battery 192 and move their armatures to the opposite position from that shown. The start impulse therefore is of negative polarity for the second to seventh code combinations in the cycle.

By providing a start impulse for the first code combination different from those for the remainder, the normal synchronous start stop principle is applied not only to each code combination so that the transmitter and receiver distributors keep in synchronism for each code combination but also to each cycle of code combinations so that the receiver distributor will be in proper position to receive the corresponding code combinations from the transmitter distributor.

If, for example, the tape 37 becomes taut and opens a branch of the circuit of magnet 228 at contact 241, this circuit still remains closed at the contact of armature 225 until the last code combination of the cycle is sent when the sixth pulse perforation operates relay 216, to move its armature 225 to the position shown. Magnet 228 is then deenergized and stops the transmitter. The transmitter cannot be again started until the tape disengages arm 242 and contact 241 engages the negative battery terminal.

By reversing the start and stop impulses for each cycle of code combination a further synchronizing check is provided against the apparatus falling one code combination behind the other.

The first three code combinations received will in this manner operate the first three groups of magnets 323 to 327, the code combinations comprising, as already described, combinations of five impulses. The next four code combinations of impulses operate selectively the next group of magnets 343 to 346. In each of these cycles, however, the fifth contactors 347 to 350 are connected to the magnets 351 to 354. Only four impulses are received during these code combination periods, but during one of these an extra fifth impulse is transmitted in the manner described above. If this impulse is transmitted during the transmission of the first of these code combinations, magnet 351 is energized, if during the second magnet 352 is energized, etc. These magnets 351, 352, etc. control the designation of the quotations and they also control the operation of associated indicators.

With the arrangement, as shown, an overlap is provided between the closing of the contacts by successive cams. Thus, for example, when the cam 297 and follower 305 are holding closed the contacts 311 and 312 to prepare circuits for the magnets 323 and 324, the cam 303 and follower 306 are opening the contacts which prepared circuits for the last two printer magnets of printer 346 and the cam 297 and the folower 306 are closing the contacts to prepare circuits for the magnets 325 to 327. This overlap is shown in Fig. 5 by the shaded portion 359, which identify the magnets being operated by the brush 281. By this arrangement, the printer magnets are conditioned for operation a sufficiently long period in advance of and after actual operation to insure proper operation thereof. At the same time, operation of the incorrect magnets by the received code combination is prevented. Summarizing the description of the system shown in Figs. 3 and 4, a tape is perforated in accordance with code combinations of impulses, the code combination perforations being arranged in groups. Each complete group of perforations comprises a complete message and in the illustration in connection with the transmission of stock quotations, a group of code combinations comprise three letter code combinations to select the items to be quoted followed by three numeral and fraction code combination for the quotation.

These code combinations are transmitted over a standard start-stop distributor having provision for five impulses in each code combination. The letter code combinations each comprise five impulses, but the numerals and fraction code combinations, having a smaller number of selections to make, comprise only four impulses each. Advantage is taken of the extra impulses available during the transmission of the numeral and fraction code combinations to transmit a designation impulse which will indicate whether the quotation being transmitted is "Open", "High", "Low", or "Last". Accordingly, although only seven code combination chanels are provided in each group, eight code combinations are transmitted.

The receiver is provided with seven groups of magnets and designation means and each is conditioned for operation only during the period when the code combination therefor is being received. Thus, the first group of magnets which invariably presents the first letter of the item to be quoted, is operated by the first received code combination of the group, the next group of magnets for the next letter of the item is operated by the second code combinations, etc. The operated magnets will set up their designations or indicators in any well known manner.

Two independent synchronizing provisions are made. For each code combination transmitted, i. e., for each rotation of the transmitter and receiver distributors, a start and stop impulse is transmitted for maintaining the distributors in synchronism. For each complete group of code combinations, a start and stop impulse differing from the first mentioned start and stop impulse, is transmitted so that the transmitter and receiver start off in the same group of code combinations simultaneously.

*Keyboard perforator—Modification*

In Fig. 2, an alternative arrangement of keyboard perforator to that shown in Fig. 1 is disclosed. In this arrangement the sequence switch for controlling the order in which the key levers are operated for perforating the tape operates individual locks which are provided for each group of keys which prevent the operation of these keys except in a predetermined group sequence. As in the previous modification, a set of designation keys 360 to 363 for "Open", "High", "Low" and "Last" respectively are pivoted on the frame work (not shown) and each is provided with an upwardly and horizontally extending lug portion 364 co-operating with a latching pivoted arm 365 held in engagement with the lug 364 by action of a spring 366 all carried on the frame work in any well known manner. The pivoted latch member 365 constitutes the armature of an electromagnet 367. It will be understood that although for purposes of convenient illustration, the designation keys are shown positioned one above the other, in practice they are arranged adjacent each other in a horizontal line and that the magnet 367 is common to them all and controls universal latching armature 365 adapted to lock all of the designation keys. When the magnet 367 is energized, the designation keys are released and any one of these may thereupon be operated. When the magnet 367 is deenergized these designation keys 360 to 363 are all locked against operation.

Each of the designation keys controls an insulated contact carrying member 371 individual thereto and operating individual contactors 372 and 373. It will be noted that the contactors 372 of these designation keys are multipled to each other over the conductors 374 and extend to the negative side of battery. The contactors 373 are similarly multipled to each other over the conductor 375 for a purpose to be described hereinafter. The contactors 372 of each of these designation keys control individual circuits over conductors 376 to 379 respectively to the storing designation relays 381 to 384.

The designation storing relays 381 to 384 are each provided with a locking armature 385 so that when any one of these relays is energized, a locking circuit is completed therefor over armature 385 and the conductor 386 and armature 387 of the unlocking relay 388 to the negative side of battery. The unlocking relay 388 is controlled by the last contact 476 on the sequence switch as will be disclosed hereinafter for opening the locking circuit for any one of the storing relays which was operated during the setting up of the previous stock designation and quotation. Relays 381 to 384 are also provided with individual armatures 391 to 394 which extend from the negative side of battery over the conductors 395 to 398 to contacts 401, 402, 403 and 404 respectively of the sequence switch 405. The opposite terminals of these contactors are connected in multiple over the conductor 405 to the designation magnet 407 which controls the fifth code combination bar in a manner similar to that described in connection with the magnet 14 in Fig. 1. It will be understood that in the present figure although no perforated tape is shown, the magnet 436 corresponds to magnet 45 shown in Fig. 1, and has associated with it a perforating mechanism and sequence switch gears as shown in Fig. 1. As will now be clear, depending upon which of the designation keys 360 to 363 is operated, a relay 381 to 384 is energized and locked to later operate the designation magnet 407 when the sequence switch has reached the correct position.

The sequence switch 405 is similar in construction to sequence switch 66 shown in Fig. 1 and comprises in addition to the contactors 401 to 404 described above, the first three or letter contactors 411, 412, and 413 which are connected in multiple over the conductor 414 to the conductor 375 which as described above is connected in multiple to the contactors 373 of the designation keys 360 to 363. When any one of these designation keys is operated, the sequence switch at that time holding closed the contactors 411 and 475, negative battery extends over the contact 411, the conductors 414 and 375 as described above through the contactor 373 of the particular designation key which is closed, and over a conductor 415 to a relay 416.

The relay 416 is provided with three armatures 417, 418 and 419. The armature 418 provides a locking circuit for the relay 416, the armature 417 opens the circuit of the locking magnet 367 so that this magnet is deenergized. The armature 419 extends the negative battery obtained over the conductor 414 as described above to the locking magnet 421 of a set of letter keys 422.

The letter keys 422 are all similar in construction to the designation keys 360 to 363, and are provided with a common locking lever 423 controlled by the common locking magnet 421 and by a spring 424 and adapted to engage a lug 425 on universal bar 425′ which extends under all of the letter keys and is adapted to be operated by lug 427 on each of the letter keys 422.

Although one such key lever is shown it will be understood that a similar key lever is provided for each letter of the alphabet and each has a downwardly extending lug 427, adapted to engage universal bar 425′. It will also be understood that the letter keys 422 are arranged to operate a series of code bars 9 and 10 as in Fig. 1, and that there is also provided a perforating mechanism controlled by these bars and a tape feed mechanism controlled by these bars and gears for operating the sequence switch.

Universal bar 425′ has an insulated lug 426 adapted to close a pair of contacts 431 when any of the letter keys 422 is depressed. The closure of contacts 431 extends negative battery over the conductor 435 to the perforating solenoid 436 which is similar to the solenoid 45 described in Fig. 1.

It will be noted that the conductor 435 is multipled to contacts 437 and 438 of key levers 439 and 440 respectively. The key lever 439 is one of the numeral key levers and as can be seen is of similar construction to the letter key 422 and has associated therewith a lug 444, magnet 441 and armature 442 controlled by spring 433 and adapted to engage lug 444. The key lever 439 through lug 445 controls the contactor 437. In addition to the key lever 439, nine other such key levers for designating all of the numerals are provided, each provided with a lug 445 to operate contactor 437 through universal bar 444′. All of the parts operate as described in connection with the letter keys. It will also be understood that the key levers 439 control code bars as in Fig. 1.

Similarly the fraction key levers 440 are provided with magnet 451, armature 452 and lug 453 which controls the contacts 438. These contactors, as above, are connected in multiple and control the solenoid 436.

When any one of the key levers 440 is depressed a combination of the four code bars is operated as described in connection with Fig. 1. When the solenoid 436 is energized, the tape is perforated in accordance with the setting of the code bars.

Locking magnet 441 is connected over conductor 461 and in multiple with the contacts 462, 463 and 464. These are the fourth, fifth and sixth contacts closed by the cam mechanism of the sequence switch 405 and permit three successive operations of numeral key levers 439.

The magnet 451 of the fraction key bar 440 has a circuit which extends over the conductor 471 to the contact 472 closed before the seventh step in the movement of the sequence switch 405. During the last step the sequence switch closes contact 473 and extends negative battery over the conductor 474 to the relay 470 and later also closes a contact 476 which closes a circuit for the unlocking relay 388 as will appear from the detailed description of the operation of this apparatus.

The perforating apparatus is normally in the condition shown with the contacts 475 and 411 closed. A circuit is at this time completed for the unlocking magnet 367 of the designation key levers 360 to 363. This circuit extends from the positive side of battery through the winding of the unlocking magnet 367 over the back contact and armature 417 of relay 416 and the closed contact 475 to the negative side of battery. Magnet 367 is energized holding armature 365 out of engagement with lug 364 and the designation key levers are in condition for operation. At this time the magnet 421 of the letter key levers 422, magnet 441 of the numeral keys 439 and magnet 451 of the fraction key levers 440 are all deenergized and their respective armatures 423, 442, and 452 are in engagement with lugs 425, 444, and 453 preventing the operation or depression of any one of the letter, numeral or fraction key levers.

The operator must now depress one of the designation key levers 360 to 363. Assuming for purposes of illustration that he depresses designation key 360, contacts 372 and 373 are closed and a circuit is completed for the designation storing magnet 381 from positive side of battery through the winding of the relay 381 over the conductor 376, contact 372 to the negative side of battery. The relay 381 is energized and locks itself over its own armature 385 and its front contact and the back contact and armature 387 of relay 388 to negative side of battery. Accordingly the designation relay thus energized is locked up for later operation. As a result of the energization of relay 381, a circuit is prepared over conductor 386 which extends from the negative side of battery and over armature 391 to a conductor 395 and contact 401, the circuit however being not completed at this time.

A further result of the depression of key 360 is to complete an energizing circuit for the relay 416 from positive side of battery through the relay 416, conductor 415, contacts 373, conductors 375 and 414 and through the first contact 411 to the negative side of battery. Relay 416 upon energization locks itself over armature 418 and the armature of relay 470 and at armature 417 opens the previously traced energizing circuit for the unlocking magnet 367 which upon deenergization locks the keys 361 to 363. When the key 360 returns to non-operated condition it too will be locked. The lugs 364 are so made that they are not latched by the lever locks when the key levers 360 to 363 are in the depressed position. At armature 419, an energizing circuit is completed for the magnet 421 of the letter key levers 422, the circuit extending from the positive side of battery to the winding of the unlocking magnet 421 and over the armature 419 and wire 414 through the first contact 411 to the negative side of battery. The magnet 421 upon energization, releases the letter key levers 422 which may thereupon be operated. Any one of the letter key levers is now depressed in accordance with the item to be quoted and operates the code bars in the manner described in connection with Fig. 1. Simultaneously a circuit is also completed for the perforating solenoid 436 from the positive side of battery through the solenoid 436 and contact 431 to the negative side of battery.

The sequence switch is now rotated one step opening the contacts 475 and 411 and closing the contact 412. No change occurs as a result of the opening of contact 411, due to the fact that the circuit closed by this contact is also closed by contact 412, nor of the opening of contact 475 since the energizing circuit for the magnet 367 was opened at armature 417. The relay 416 remains energized over its locking circuit including its armature 418 and the armature of relay 470. There follows the depression of the second letter lever and the operation of the perforator in accordance therewith and the third letter lever while the sequence switch 405 closes the contacts 412 and 413 successively.

The sequence switch 405 now moves to close contacts 401 and 462. The magnet 421 which was energized over the conductor 414 in multiple with each of the three contacts 411, 412 and 413 now deenergizes as these three contacts are now all open and accordingly the letter key levers are again locked in non-operated condition.

During the next three intervals, while the numeral key levers 439 operate, the sequence switch 405 closes the contacts 462, 401, 463, 402, and 464 and 403 successively. During the first period, while contacts 462 and 401 are closed, an energizing circuit is completed for the unlatching magnet 441 from the positive side of battery through the winding of this magnet, conductor 461 and contact 462 to the negative side of battery. Energization of the magnet 441 releases the numeral key levers 439 for operation and three of these may now be depressed in succession. Upon the operation of the first of these, an obvious energizing circuit is completed for the perforating solenoid 436 over the contact 437 and four code bars are selectively operated as described in connection with Fig. 1. A circuit is also prepared for the magnet 407 for operating the fifth code bar. This circuit extends over the conductor 406, contact 401 and conductor 395 to the front contact and armature 391 of relay 381 and magnet 407 will now energize.

As the sequence switch now successively closes contacts 463 and 464, multiple circuits are completed for the magnet 441 which remains energized permitting the operation of the next two numeral key levers. During this period, the sequence switch also closes contacts 402 and 403 for the magnet 407 and these circuits extend over conductors 396 and 397 respectively to the armatures 392 and 393 of relays 382 and 383, but these relays have not been energized in this particular group of signals and accordingly the closing of contacts 402 and 403 has no effect at this time. The sequence switch 405 now closes contacts 472 and 404 completing a circuit for the unlocking magnet 451 over conductor 471, contact 472 and to the negative side of battery. The magnet 451 unlocks the fraction keys 440 and the operation of any one of those keys will energize the perforating magnet 436 and will cause the tape to be perforated and stepped and will cause the sequence switch to make its final step of the cycle from contact 472 to contact 411, its original or normal position. In moving to its original position, sequence switch 405 closes a first circuit over contact 473 to the relay 470 and a second circuit over contact 476 to the relay 388. The relay 470 upon energization opens the locking circuit for the relay 416 which in turn upon deenergization prepares a circuit for the magnet 367 of the designation key levers at armature 417 and opens the circuit for the letter lever unlatching magnet 421. Relay 388 upon energization opens the locking circuit of designation relay 381. These contacts are closed momentarily while the sequence switch moves from contact 472 to the first contact 411 in the position shown. In this position, the contact 475 energizes the unlocking magnet 367 and the cycle of operations described above is now repeated.

As will be clear from the above description, in the position shown only a designation key may be operated. Upon operation of a designation key, a circuit is closed for the magnet 421 of the letter key levers which thereupon permits operation of three letter key levers. The designation key upon being released is again locked in non-operative position, the circuit for the unlocking magnet 367 being now opened by the same means which closed the circuit for the unlocking magnet of the letter keys. The sequence switch 405 now steps over three of the contacts permitting the perforation of code combinations for three successive letters. Thereafter the magnet 421 for the letter key lever is deenergized and the letter key levers upon being released are again latched in non-operated position while at the same time, the sequence switch having moved to the fourth position, the numeral lever unlocking magnet 441 is energized releasing the numeral key levers for operation. Three of these key levers may now be operated while the sequence switch moves over the fourth to sixth contacts. At the same time circuits are prepared from the storing designation relays 381 to 284 so that code combinations for the numerals and for one of the designation characters may be recorded on the tape at this time. After the sequence switch has moved to the seventh position, the numeral lever unlatching magnet 441 is deenergized and these key levers upon being released are locked in non-operated position while the fraction lever magnet 451 is energized over the sequence switch permitting one of the fraction key levers to be operated after which the circuit for the designation key lever magnet is again energized. Of the contacts surrounding switch 405, it will be understood that contacts 411, 412, 413, 462, 463, 464 and 472 are equally spaced, as shown.

*Tape transmitter—Modification*

In Fig. 6, a modified form of transmitting arrangement is shown differing from that shown in Fig. 3 in that it comprises a transmitting distributor having a large number of code combination segments used in connection with an automatic transmitter having a lesser number of contacts than the number of code combination segments on the distributor.

In this arrangement, tape feeler levers 501 to 506 similar to the feeler levers 162 to 167 in Fig. 3 are utilized. Levers 501 to 506 are pivoted on pins 508 in a manner similar to that described in connection with Fig. 3 and are normally held against a pin stop 509 by action of springs 510 individual to each of these levers. Each of these feeler levers is provided with a feeler pin 512 which is arranged to move into the perforations of the tape in a transverse row as they are brought against the tape in the manner described. These levers control contactors 513 which move between the upper and lower contacts.

The contactor 513 of the first feeler lever 501 controls a circuit over conductors 514 and 515 to the upper and lower windings respectively of a polar relay 516. The polar relay 516 comprises an armature 517 which moves between its upper and lower contacts and extends a circuit from conductor 518 for the magnet 519 over the conductors 520 and 521 to segments on the distributor as will be described hereinafter.

The contactors 513 of the other feeler levers 502 to 506 extend circuits to the upper and lower windings respectively of storing relays 525 to 529 which are energized in accordance with the operation of the feelers. The upper and lower contacts of armatures 531 to 535 are multipled and connected respectively to the positive and negative sides of battery and circuits therefrom extend over conductors 537 to 541 respectively to the first to fifth code combination contacts on the distribution ring 543. It will be noted that the same conductors are multipled to each succeeding group of five segments on the ring 543.

Ring 543 comprises first a stop segment which is permanently connected to the positive side of battery and second a start segment which is permanently connected to negative side of battery. The ring 543 is bridged with a solid ring 545 by brushes 546 and 547 carried on the distributor arm 548. The arm 548 in addition carries brushes 551 and 552 which bridge the solid ring 553 and the segmented ring 554. The solid ring 553 it will be noted is connected to the negative side of battery and the first segment on the distributor ring 554 is connected over conductor 520 to the upper contact of armature 517 of the relay 516.

The second contact on the segmented ring 554 is multipled with the second contact of each group thereafter and extends over conductor 561 to the feeler levers 501 to 504. The third segment is multipled with the third segment of each group of segments and extends over the conductor 562 to feeler levers 505 and 506. It will also be noted that the first segments of each of the groups of segments starting with the second group are multipled to each other and extend over conductor 521 to the lower contact of the armature 517.

The arm 548 is connected through a friction clutch 561 to the shaft 562 of a motor 563 as in the case of the first embodiment described. A speed governor 564 is also connected on the motor shaft for controlling the speed of the machine and a spring 565 engaging a shoulder 566 on the shaft 562 forces the friction clutch 561 into engagement with the distributor arm 548.

The distributor arm 548 is normally held from rotation by an armature 571 carried on the frame work 572 of a start magnet 573. There is now held closed a stop-current for the distant receiver, from positive battery over the first segment of distributor ring 543, brush 546, brush 547, solid ring 545 and line wire 549 to the receiving magnet of the distant receiving apparatus. There is also held closed at this time a circuit to energize the magnet 519 over wire 518, armature 517, wire 520, brushes 552 and 551, and ring 553 to negative. The magnet 573, as in the case of the previously described embodiments, is controlled by the tape control arm 574 which in turn is operated by the slack in the tape. Latch 574 performs a function similar to latch 243 of Fig. 3. Normally when the tape is not in engagement with the arm 574, the negative side of battery extends to the magnet 573 through the closed contact of the arm 574 and the armature 571 is moved from the path of the distributor arm 548.

Assuming this to be the condition, the magnet 573 is energized and armature 571 is operated to move out of the path of the distributor arm 548. The brush 546 being at this time in engagement with the first segment on the distributor 543, a stop impulse of positive polarity is impressed upon the signalling line 549 as traced above.

In Fig. 3, the negative impulse is the normal stop condition but here positive impulse on the line is the normal stop condition. When now the brush 546 moves into engagement with the second segment, a negative or start impulse is impressed upon the conductor 549 over the circuit traced above and a receiving distributor at the remote end of conductor 549 to be described more fully hereinafter is started into operation.

The last code combination on the tape, having had a sixth perforation, feeler 512 moved to its upper position and the upper winding of relay 516 was energized. Simultaneously with the brush 546 on the first segment, the brush 552 is also on the first segment of the first group of segments on the segmented ring 554 and a circuit is completed for the magnet 519 from positive side of battery through the magnet 519 over the armature 517 in engagement with its upper contact and through the first contact of the segmented ring 554, brushes 552 and 551 over ring 553 to the negative side of battery. As a result of the energization of the magnet 519, the pin 509 is pulled downwardly moving the feeler levers 501 to 506 from the perforated tape and at the same time moving the feeding lever 580 to feed the tape one step. As the brushes 546, 547, 551 and 552 move to the second segment, the brush 552 breaks from the first segment of the first group of segments on ring 554 and the magnet 519 is deenergized and the feeler levers 501 to 506 move into the code combination perforations with which they are at that time in operative relation. At the same time, the brush 552 being on the second segment, current of negative polarity is impressed from the ring 553 through the second segment 554, conductor 561, feelers 501 to 504, and, depending upon whether the contactors of these feelers are in their upper or lower position, the polar relays 516 and 525 to 527 will be energized to in turn operate their armatures 517 and 531 to 533 to either their upper or lower contacts, respectively. The sixth feeler 501 will not find a hole at this time, and the armature 517 will move to its lower contact.

While the brush 546 is on the first segment of ring 543, the brush 552 is on the first segment of the first group of segments of ring 554. The brush 546 is transmitting the stop signal from positive to the line 549 and the brush 552 is charging the magnet 519.

While the brush 546 is moving over the second segment of ring 543, the brush 552 is on the second segment of the first group of segments of the ring 554. The brush 546 is transmitting the start signal from negative battery to the line 549 and the brush 552 is transferring the 1st, 2nd, 3rd and 6th tape-hole signals from the tape to the storing relays 525, 526, 527 and 516 respectively, the feelers having risen into the tape by release of the magnet 519 in time to effect this function. This prepares the third, fourth and fifth segments of the ring 543 in readiness for the brush 546.

While the brush 546 is moving over the third segment of ring 543, the brush 552 is on the third segment of the first group of segments of the ring 554. The brush 546 is transmitting the code signal from armature 531 over wire 537 to the line 549 and the brush 552 is transferring the 4th and 5th tape-hole signals from the tape to the storing relays 528 and 529 respectively. This prepares the sixth and seventh segments of ring 543 in readiness for the brush 546.

While the brush 546 is moving over the fourth and fifth segments of ring 543, transmitting the code signals from armatures 532 and 533 over wires 538 and 539 to the line 549, the brush 552 is not used.

While the brush 546 is moving over the sixth segment of ring 543, the brush 552 is on the first segment of the second group of segments of the ring 554. The brush 546 is transmitting the code signal from the armature 534 over the wire 540 to the line 549 and the brush 552 is charging the magnet 519 to draw the feelers 512 out of the tape and to step the tape to render effective the second code of perforations in the cycle. The magnet 519 is being charged over the circuit of the wire 518, armature 517, lower point and then wire 521 to the first segment of the second group on the ring 554.

While the brush 546 is moving over the seventh segment of ring 543, the brush 552 is on the second segment of the second group of segments of the ring 554. The brush 546 is transmitting the code signal from the armature 535 over the wire 541, to the line 549 and the brush 552 is transferring the first, second, third and sixth tape-hole signals from the tape to the storing relays 525, 526, 527 and 516 respectively, the feelers 512 having risen into the tape by release of the magnet 519. This prepares the eighth, ninth and tenth segments of the ring 543 in readiness for the brush 546.

While the brush 546 is moving over the eighth segment of the ring 543, the brush 552 is on the third segment of the second group of segments of the ring 554. The brush 546 is transmitting the code signal from the armature 531 over the wire 537, to the line 549 and the brush 552 is transferring the fourth and fifth tape-hole signals from the tape to the storing relays 528 and 529 respectively. This prepares the eleventh and twelfth segments of ring 543 in readiness for the brush 546.

The sequence will repeat and the brush 552 always will transfer the tape record to the storing relay and prepare any segment of the ring 543 before the brush 546 reaches the segment.

It will be recalled that in perforating the tape, a sixth perforation is made during the perforation of the fraction or last code combination to be transmitted. Accordingly when the brush 552 moves over the first segment of the last group and the magnet 519 energizes, feeding the tape to the next position, upon deenergization of the magnet 519 and movement of the feeler 501 into the sixth perforation of the tape, a circuit is prepared for relay 516. As the brush 552 moves to the second contact of the last group, current of negative polarity is impressed on conductor 561 which flows through the feeler 501 to the upper winding of the relay 516 and the armature 517 will be moved to engage its upper contact as shown.

As will now be clear, the tape is moved one step as the brushes move from one to the succeeding group of contacts. To insure synchronism between the tape and the distributor brush, energization of magnet 519, upon which stepping of the tape and therefore operation depends, is made to respond to an impulse of different polarity once for each group of code combinations from that to which it responds at the remaining stepping positions in the group.

In this arrangement it will be noted that if the tape becomes taut enough to move lever 574 and open the contact of the circuit for magnet 573, the code combinations will continue to be transmitted until the brush arm 548 reaches the first position shown whereat it will be engaged by the armature 571. Furthermore in the event that the tape is placed in the transmitter in the wrong position and the distributor is operated, it will step along until it comes to a position having the sixth perforation whereupon it will fail to step until the distributor reaches the position shown and will be automatically brought to the correct position with reference to the distributor regardless of how it may have originally been placed in the transmitter. It also will be noted that the signals are stored in two groups, the transfer taking place at different times for the two groups so that an overlap is provided which allows time for the stepping of the tape although the successive segments corresponding to the last pulse of one single code combination and to the first pulse of the succeeding single code combination have no extra segments between them; that is, the tape may be operated to the next position during the period while the preceding stored code combination is still being transmitted.

*Sequence switch mechanism*

In Fig. 7, a modified form of mechanism is shown for operating the sequence switch of Fig. 4 in which electrical control from the distributor and a friction drive are employed. Motor 581 operating through a pinion 582 meshing with a gear 583 drives a shaft 584 through friction clutch 585, spring pressed by action of the spring 586 bearing against the shoulder 587. Carried on the shaft 584 is a seventh tooth escape wheel 588, the teeth of which are in operative relation with a pallet 589, pivoted at 591 and normally held in the position shown by the spring 592. The extension 593 of the pallet acts as an armature of the magnet 594 which is electrically connected over the conductor 595 with the segment 596 on a distributor 597.

The distributor 597 is bridged with the solid ring 598 by brushes 599 and 601. The transmitting segment ring 602 (279 in Fig. 4) is bridged with the solid ring 603 (277 in Fig. 4) by brushes 604 and 605 (281, 282 in Fig. 4). All of the brushes are carried on an arm 606 (283 in Fig. 4) which is operated in the usual manner. The motor normally tends to rotate the shaft 584 (corresponding to 296 in Fig. 4) through the friction clutch 585 or any other convenient means so that the shaft 584 normally tends to rotate, but is withheld by the escapement mechanism 589. As the brush 599 wipes over the contact 596 an obvious energizing circuit is completed for the magnet 594 and the armature 593 is operated removing the tooth of the escapement 589 from engagement with one of the teeth of the ratchet 588 and the ratchet is permitted to rotate to the next stop position. The brush 599 then moves off of the segment 596 and the magnet 594 is deenergized so that the action of the spring 592 again causes the upper tooth of the escapement or pallet 589 to engage the next tooth of the ratchet preventing further rotation at this time. Accordingly for each revolution of the distributor arm 606, the sequence switch is rotated one step, or one-seventh revolution.

*Perforator mechanism—Modification*

In Fig. 8, a modification of the perforator of Fig. 1 is shown, in which the escapement magnet 594 is energized by operation of the contact 611 fixed upon the perforator table 28 of Fig. 1.

In applying this modification to the punch of Fig. 1, the gears 63, 64, are removed and the shaft 65 is driven by friction and restrained by an escapement, as the shaft 584 is driven by motor 581 with clutch 585 and restrained by ratchet 588 with escapement 589 in Fig. 7. The operation is as follows: When the solenoid 45 (Figs. 1 and 8) operates to push upward the perforator table 28, the contactor 611 closes the obvious circuit for the escapement magnet 594 which operates the escapement 608 to permit the sequence-switch shaft 65 to make a fractional step, the step of the sequence-switch shaft being completed when the retiring table 28 breaks the contact at 611, discharging the magnet 594 and permitting the escapement 609 to return to normal by its spring as 592 in Fig. 7. The effect of the gears 63, 64 is attained and the work of the solenoid 45 is reduced.

Figure 9 shows a small section of the tape with perforations for a complete group of code combinations. The center row of perforations 617 are the feed perforations and perforations 618 are the designation perforations.

The present invention provides for selecting operations in accordance with received code combinations of conditions and in addition provides means for other selecting operations which are not controlled by code combinations of conditions and controlled entirely by local means, such as start stop impulses in a start stop system to control the phase position of a transmitter with respect to a receiver and to determine whether a character is shift or unshift.

*Distribution systems*

Referring now to Figure 10, a number of systems are disclosed, each of which operates on a different principle but which is nevertheless controlled by the same tape 37 perforated in a manner described and disclosed in connection with Fig. 1.

Although in Figure 10, tape 37 is disclosed as passing through each of four successive senders 626 to 629, it will be understood that this is not necessarily the operation but rather that it may pass through the particular type of sender to produce the type of translation best suited to the line service. The sender 626, the details of which will be described hereinafter, is connected over the conductors 631 to 635 to contacts of a multiplex distributor 636. The other channels of the multiplex distributor are connected over conductors 637, 638 and 639 to the regular standard telegraph transmitters 641, 642, and 643, respectively.

The tape 37 operating the sender 626 controls the transmission of stock quotation code combinations of impulse conditions over one of the channels of the multiplex distributor 636 and over the other three channels regular telegraph code combinations are transmitted. The distributor 636 is in turn connected over conductor 637' to a receiving distributor 638' at a remote station. Three channels of this distributor are connected over conductors 639', 640' and 641' to the respective telegraph receiving devices 642', 643' and 644. The fourth channel, which is the channel with which the sender 626 is connected, is in turn connected over conductors 644' to 648 to the translating distributor 651 which in turn redistributes the impulses through the sequence switch 652 as will be described. The sequence switch 652 in turn controls the operation of register magnets in accordance with the successive code combinations of impulses as described above.

The distributor 651 also distributes impulses over conductors 653 to 657 to the reperforator 658 which will perforate a tape 661 similar to the tape 37 and which, when passing through a transmitter 662, will operate to transmit code combinations of impulse conditions over line 663 as in the case of the sender at the first station.

For purpose of convenience, the above described system has been named the monomux system. It is especially adapted for transmitting the stock quotation messages over long trunk lines which are regularly in use with the commercial synchronous multiplex system. One channel of a multiplex line, as described, is used without modifying or in any way interfering with the remaining commercial channels of such a line.

It will be noted that provision has been made for reperforating the tape, thereby reproducing the original tape with its sixth synchronizing perforation and when the original tape has been so reproduced, it may control the retransmission of code combinations over an extension system similar to any one of the other three systems.

Tape 37 also controls transmitter 627 connected over conductors 664 to 669 to the sending distributor 671. The sending distributor 671 is connected over a conductor 672 to a remote receiving distributor 673. As will be described in detail hereinafter in connection with detailed figures, the distributor 671 constitutes a standard multiplex system in which seven channels are employed for the stock quotation system, the code combinations controlled by the sender 627 being translated for transmission over the line 672 in a manner to be described.

Impulses received by the receiving distributor 673 are translated and repeated to a start stop printer 674 provided with a line relay 675 and the impulses operating the line relay 675 also extend over conductor 676 to any other normal or start stop printers which it may be desired to connect in the line. The distributor 673 also repeats impulses over the conductors 677 to individual stock quotation magnets as described in connection with Fig. 4 and over the conductors 678 to a reperforator 679, which perforates a tape 680, simulating the tape 37 at the transmitting station and which controls a sender 681 for retransmission of the code over conductor 682.

It will be noted that the receiving distributor 673 is connected in series in the line 672 which extends as conductor 683 to a similar distributor 684 at a remote station operating in a manner similar to the distributor 673 for operating stock quotation magnets over conductors 685.

For purpose of convenience, I have designated this system the multimux system. This system is useful for fast service, the thirty five signal impulses being placed upon seven channels of a synchronous multiplex system.

The third sender 628 is connected over a conductor 686 to a receiving distributor 687, shown in detail in Fig. 15, which in turn repeats the impulses to the stock quotation magnets over conductors 688. The receiving distributor 687 is connected in series over conductor 686 with the line 689 connected to a translator 691 for translating the code combinations comprising thirty five impulses of the stock quotation system to a five unit code for printer operation, and, when operating, controls over the conductor 692, a start stop printer 693 of the standard type which requires for synchronous operation a start and stop impulse preceding each code of five impulses as disclosed in Patent No. 1,745,633. The translator 691 is connected in series over conductor 694 with a second translator 695 which translates the code combinations in a similar manner, and through the conductors 696, controls a reperforator 697 which perforates a tape 698 similar to the tape 37, the tape 698 in turn controlling a transmitter 699 sending codes over the conductor 701 extending to a remote station.

This system I have named the monostop system and it functions to economize the time of the start stop impulses by providing a single start pulse followed by the thirty five signals of the stock quotation code and a stop impulse.

The transmitter 629 is connected over a conductor 702 to a start-stop printer 703 controlled by the line magnet 704 which in turn is connected in series over a conductor 705 to a start-stop printer 706 controlled by line magnet 707, both printers being of the type disclosed in the above mentioned application. The printer 706 in turn is connected in series over the conductor 708, to a sequence switch 709, such as shown in Fig. 4, controlled by the impulses over conductor 708 operating the line relay 710. Impulses from the sequence switch 709 are repeated over the conductors 711 to stock quotation register magnets as in Fig. 4.

The receiving line relay 710 is in turn connected over the conductor 712 to a distributor 713 controlled by line relay 714 and which in turn controls a reperforator 715, shown in detail in Fig. 14, which perforates a tape 716 similar to the tape 37. The tape 716 in turn controls a sending distributor 717, such as shown in Fig. 3, for transmitting code combinations of impulse conditions over the conductor 718 and a transmitter 719 for operating a distributor 720, shown in detail in Fig. 21, to transmit different code combinations over the conductor 721. The line relay 714 is connected over the conductor 725 to the start-stop printer 726 controlled by the line relay 727 which in turn is connected in series over conductor 728 to the line relay 733 of the sequence switch 731 similar to the sequence switch 709. Impulses from the sequence switch 731 are repeated over conductors 732 to stock quotation register magnets. The line relay 733 is connected in series over the conductor 734 to the start-stop distributor 735 controlled by the line relay 736 and in turn controlling a reperforator 737 similar to the reperforator 715 perforating a tape 738 similar to the tape 716 and the tape 37.

For purpose of expression, I have named this the Multistop System. In this system, as will appear hereinafter, the standard distributor of seven contact segments in the transmitter and six in the receiver is used, each message comprising three letter codes, three numeral codes and a fraction code, with a resignation code accompanying one of the numeral or fraction codes. These require a total of seven revolutions of the standard distributor which therefore starts and stops seven times for each message or complete stock quotation.

As will be clear from the above general description, in each system mechanism may be provided for reperforation thereby reproducing the original tape with its sixth synchronizing perforation and the original tape which has been reproduced in any one of the four systems may control the retransmission of codes over an extension line using the same system or one of the other three systems. In this manner, I have provided a complete interrelation of all of the systems so that any one can be used with any other and without affecting the telegraph operation.

The mechanism employed in the multistop system will first be described followed by a description of the mechanism in the monostop, multistop and monomux systems, respectively.

*Multistop system*

This system of transmission differs from normal commercial transmission in two respects: first, case shift signals are not sent as is usual in standard telegraph systems and secondly, the stop and start signals preceding the first code of a cycle of seven are reversed in polarity from those which are associated with each of the other codes in the cycle of operation. It will be obvious therefore that the system must be modified somewhat in order to permit the operation of any standard printer by such a system.

In the printer disclosed in Fig. 11, the circuits are modified so as to adapt the printer diagrammatically shown to operate in connection with such a system.

The signalling line 705 is connected to the line relay 707 as described above, the armature 751 of which is connected over conductor 752 to the solid ring 753 of the distributor 754. The distributor 754 comprises in addition to the solid ring 753, an elongated stop segment 755 and five code segments 756 to 760 bridged with the solid ring 753 by brushes 761 on brush carrier 762.

The brush carrier 762 is carried on a shaft 763 by mechanism not disclosed which in turn is driven by motor mechanism not shown and is held from rotation by the extension 766 on the bell crank 767 pivoted at 768 and carrying at its opposite end an armature 769 of the start magnet 771. The start magnet 771 is connected over conductor 772 to the elongated start segment 755 and its opposite terminal is connected over the conductor 773 to the cam follower 774 operating between upper and lower contacts 775 and 776 connected to negative and positive sides of battery respectively.

The cam follower 774 is operated by a cam 777 carried on the shaft 778 to which is secured a gear 779 meshing with the pinion 780 carried on and rotatable with the motor shaft 763. With the cam 777 in the position shown negative battery is impressed on the conductor 773 so that the start magnet 771 will be energized only when the positive battery is connected to the opposite terminal. When, however, the cam 777 moves from the position shown and the follower 774 moves to its lower contact, positive battery is connected to the conductor 773 and the magnet 771 will then be energized only by a start impulse of negative polarity. The cam 777 has a second follower 783 controlling the impression of positive polarity from the contact 784 to the conductor 785.

Carried on the shaft 778 and rotatable therewith is the second cam 786 in operative relation with a cam follower 787, controlling the impression of positive polarity from contact 788 to the conductor 789. The conductors 785 and 789 are connected to printer magnets 791 and 792 respectively of a standard telegraph printer 793. The magnet 791 functions in a special manner which will be described in detail hereinafter. The magnet 792 when charged will attract its armature 782 which will operate the forked lever 781 to lift the platen 813 into its upper position as shown dotted to effect the printing of the shift character 812 instead of the normal or lower-case character 811.

The printer 793 comprises, in addition to the magnets 791 and 792, the standard five selector magnets 794 which through their respective armatures 795 operate pawls 796 pivoted at 797 and normally held in retracted position by springs, not shown. The pawls 796 are in operative relation by means of the teeth 798 with notches 799 in individual permutation bars 801.

When the magnets 794 are energized, they operate their armatures to lift the pawls 796 and release their individual permutation bars 801 for operation to the right, the restoration of these bars being effected in a manner well known in the art. The notches 802 are so cut that upon a predetermined combined setting of the bars, a selector bar 803, Fig. 12, which is positioned transversely across the permutation bars, is permitted to drop into the notches in alignment for performing a selecting operation.

The selector bars 803 are normally held from movement into the aligned notches of the permutation bars by a universal bar 804, although by action of the spring 805, the bars 803 normally tend to move to this position. At the lower end of each selector bar 803, a set of teeth 806 mesh with the teeth 807 formed on the lower end of a character bar 808 pivoted at 809 and carrying at its upper end 810 two characters, one in the lower case shift 811 and the other in the upper case shift 812.

When the permutation bars 801 have been operated in accordance with the predetermined setting, the universal bar 804 is operated, permitting the bar 803 to drop into the aligned notches of the permutation bars 801, and as the universal bar 804 moves upwardly, it will engage the notch extension 815 of the particular bar which has dropped into the permutation bars, lifting this bar against the action of the spring 805 and causing an upward movement of the selector bar 803. The selector bar 803 moving upwardly rotates the individual character bar 808 producing the printing operation. The case shift operation is determined by the position of the platen which is shifted one way or another depending upon the operation of the magnet 792.

It will be noted that the selector magnets 794 are connected over the conductors 816 to individual segments 756 to 760 on the distributor 754.

In order to properly time the operations of the printer, there is carried on the motor shaft 763, in addition to the pinion 780, a cam 821 in operative relation with a cam follower 822 which controls the application of impulses of positive polarity from the contact 823 to the conductor 824 connected to the start magnet 825, the opposite terminal of which is connected to negative battery. The armature 826 of the start magnet 825 is connected to the pawl member 827 pivoted at 828 and has a lug portion 829 adapted to engage with the notch 830 of the disk 831 of the printing mechanism. The disk 831 is carried on the friction driven shaft for operating the printing mechanism. Following the setting of the printing magnets 794, the magnet 825 is energized and permits the disk 831 to be released for rotation.

With the apparatus of Fig. 11 in the position shown, negative polarity is impressed on the conductor 773 at the contact 775 and negative polarity is impressed on the opposite terminal of the start magnet 771 at the armature 751. Accordingly the start magnet 771 is not energized and the distributor 754 is locked against rotation. When now a positive start impulse is received over the conductor 705, the line relay 707 is energized to operate its armature 751 into engagement with its lower contact and an energizing circuit is completed for the start magnet 771 from the positive side of battery over the lower contact and armature 751, ring 753, brushes 761, start segment 755, conductor 772, start magnet 771, conductor 773 and cam follower 774 and upper contact 775 to the negative side of battery.

Start magnet 771 upon energization attracts the armature 769 and rocks the bell crank 767 about its pivot 768, removing the lug 766 from engagement with the brush carrier 762 and the brushes are now released for rotation in a clockwise direction. As the distributor brush 761 rotates, it moves off the segment 755 deenergizing magnet 771 and onto the first code segment 756 at which instant the first of the code impulses is received over the line 705 to operate the first of the selector magnets 794.

In a similar manner, the code impulses being transmitted in synchronism with the rotation of the distributor 754, the brush 761 engages each of the successive code segments 757 to 760 as the code impulses are received to in turn either energize or fail to energize the individual magnets 794, the circuit in each instance extending from the armature 751 over conductor 752, ring 753, brushes 761, segments 756 to 760, a conductor 816 and a magnet 794 to negative battery. Inasmuch as the magnets 794 are connected to the negative side of battery, energizing circuits therefore are completed only when a positive impulse is received over the line 705 to operate the armature 751 to engage its lower contact, connected to the positive side of battery.

The distributor 754 in rotation operates the gear 780 through the shaft 763 to in turn rotate the cam 777 and the follower 774 moves from the raised portion of the cam to the lower portion and disengages the contact 775 and engages the contact 776 so that the start magnet 771 is now connected to positive battery over the conductor 773. Accordingly, magnet 771 can now only be reenergized by a start impulse of the opposite polarity from that of the first described start impulse. At this time, of course, the brush carrier 762 has moved beyond the lug 766 of the bell crank 767 so that the disengagement between follower 774 and contact 775 has no effect until the brush has been restored to its starting position.

Near the end of the first revolution of distributor 754, the cam disk 821 engages its follower 822 and causes the follower to engage the contact 823 completing an obvious energizing circuit for the start magnet 825. The magnet 825 upon energization rocks the lever 827 about its pivot 828 to remove the lug 829 from the notch 830 in the disk 831 of the printing mechanism and this disk is released for rotation to operate the universal bar 804, in a manner described, permitting the selector bar 803 to move into the alined notches in the permutation bars 801 thereupon operating the selector bar 803 upwardly and rocking its individual type bar 808 about its pivot 809 to print the selected character.

At the end of the first revolution, the brushes 761 are restored to the elongated start segment 755 in the position shown. At this instant a start impulse of the opposite polarity from that of the first described start impulse is received over the line 705, in a manner described in connection with Fig. 4, and the armature 751 moves to engage its upper contact shown connected to negative battery and a circuit, as described above, is completed through the start magnet 771 from negative battery at the armature 751 to positive battery at the cam follower 774 and the brushes 761 are then released for a second revolution. During this revolution, a code is received as described in connection with the first cycle and near the end of the revolution, the printing mechanism start magnet 825 is energized to release the printing mechanism for operation in accordance with the new code received. Prior to the receipt of the second code the bars 801 have been restored to the positions shown for reoperation in accordance with the new code. The gear 779 is designed to rotate one seventh of a revolution for each complete revolution of the gear 780 which in turn determines the respective rotations of the two with respect to the distributor 754. The distributor 754 in other words makes one complete revolution for each seventh of a revolution of the cams 777 and 786.

During the first three revolutions of the distributor 754, the selector magnets 794 are operated in accordance with code combinations of five impulses each to operate their individual permutation bars 801 and letters will be printed as described.

During the fourth, fifth, sixth and seventh revolutions of the distributor 754, as described above, the numerals comprising the quotation of the selected item are received and during this period the raised portion of cam 786 will operate to maintain the follower 787 in engagement with the contact 788. As a result an obvious energizing circuit is completed for the magnet 792 which through its individual armature and pivoted pawl member controls the shift position of the platen 813. The codes received during these revolutions therefore will operate the selector magnets 794 so that the characters in the case shift position will now be printed. It will be understood that when the apparatus is in the case shift position numerals and fractions will be printed.

During the transmission of the last code of the group, the cam 777 will cause the follower 783 to engage its contact 784 energizing magnet 791 which controls a permutation bar 817. The bar 817 is arranged to control a selector bar 803 which selects a fraction quotation to be printed at this time.

At the end of this last or seventh code of the cycle, the cam 777 is restored to the position shown and the distributor 754 is also restored to normal in the position shown and the above cycle may now be again repeated by a start impulse of positive polarity to move the armature 751 to engage its lower contact.

It will be recalled that each numeral code combination generated at the transmitting station comprises four impulses, the fifth perforating position following each code being utilized for transmission of the designation code.

Similarly each fraction code combination generated comprises three impulses, the fifth code position being utilized for the designation code.

Inasmuch as the designation code forms part of the code combination interval of one of the numeral or fraction code combinations, it is obvious that the selection made when the designation code is received is different than the selection which otherwise would have been made due to the fact that the fifth magnet 794 is energized by this designation code to operate its associated permutation bar 801. With the fifth bar 801 operated, the selection made will be different than when the fifth bar is not operated, and as a result for any one numeral or fraction code two different selections may be made, depending upon whether it is or is not accompanied by a designation code.

To take care of this condition, two sets of numerals and two sets of fractions are provided on the type bars as will be apparent from Fig. 13. The second set of numerals differ from the first set in that each numeral in the second set has a dot beneath it. Likewise the second set of fractions differ from the first set in that each fraction in the second set has a dot beneath it.

Referring to Fig. 13, it will be seen that the numeral 1 is located on the bar that carries the letter E and that the numeral $\dot{1}$ is located on the bar that carries the letter Z. Likewise the numeral 3 is on the bar that carries the letter A and the numeral $\dot{3}$ is on the bar which carries the letter W.

When the designation of a quotation is received with a numeral, the type bar carrying that numeral accompanied by a dot is operated. Similarly when the designation of a quotation is received with a fraction, a type bar carrying that fraction accompanied by a dot is operated.

To determine the kind of designation received, it is necessary to observe where the dot appears. Assume that $148\dot{3}/4$ is the quotation received. The dot appears beneath the second digit. This indicates that the quotation is High. If the dot appears beneath the first digit the quotation is Open, if it appears beneath the third digit, the quotation is Low and if it appears beneath the fraction the quotation is Last.

Ordinarily the total number of numerals and fractions employed amount to seventeen in all so that there are sufficient code combinations for operating bars carrying these numerals and fractions in the upper case position. Inasmuch, however, as under the present conditions, this number has been multiplied by two in order to provide for the designation operation, there are thirty-four numeral and fraction selections which is more than the available code combinations.

In order to overcome this difficulty, an extra bar 817 is provided operated by the magnet 791 which is arranged to be energized when the switch 783 is operated by the elevatd portion on the cam 777. Inasmuch as the fraction designation invariably must follow the third numeral code combination received, this switch lever 783 can be predetermined in position so as to close its contact 784 to energize the magnet 791 just preceding the receipt of the fraction code. The operation of the bar 817 accordingly invariably occurs with the fraction designation and thus provides for further code combinations to permit the selection of a fraction, as indicated upon the line 0 in Fig. 13, the signals indicated upon the line 0 being generated locally by the cam follower 783.

*Reperforator*

As described in connection with Fig. 10, codes transmitted by the sender 629 not only operate a printer 703, but also operate a reperforator 715 for perforating a tape similar to the tape at the transmitting station. The reperforator 715, shown in detail in Fig. 14, will now be described. The signalling line 712 which extends from the transmitting station as disclosed in Fig. 10 is connected to the line relay 714 which through its armature 840 operating between the upper and lower contacts connected respectively to the negative and positive side of battery, extends potential from this battery over conductor 841 to the ring 842 of a distributor 843. The distributor 843 in addition to the solid ring 842 comprises an elongated start segment 844 and five code segments 845 to 849, bridged by the brushes 850 on the holder 851. The holder 851 is mechanically connected in a manner not shown to the motor shaft 852 rotated by the motor, not shown, but is normally held from rotation by the latch 853 on the bell crank 854 pivoted at 855 arranged to be attracted by the stop magnet 857. The stop magnet 857 has one of its terminals connected over the conductor 858 to the elongated start segment 844, and its other terminal is connected over conductor 859 to the cam follower 860 operating between the upper and lower contacts respectively connected to negative and positive side of a source of energy and controlled by a cam 861 on shaft 862. The shaft 862 carries a gear 863 meshing with the pinion 864 on the shaft 852 and adapted to rotate in the manner shown. The shaft 852 in addition carries a disk cam 865 operating a cam follower 866. The code segments 845 to 849 are connected over conductors 867 to the polar relays 868 of the reperforator 715 and which through their amatures 869 control over conductors 870, the perforating magnets 871. A sixth perforating magnet 872 is connected over the conductor 873 to cam follower 874 operated by the disk cam 861 for connecting ground to the conductor 873 for a purpose to be described in detail hereinafter.

Each perforating selector magnet 871 controls an individual operating member 875 pivoted at 876 and connected by a spring 877 to a rocker member 878 individual thereto and pivoted at 879. Rocker 878 may occupy either one of two positions as shown by the full and dotted lines and are normally urged to the full line position by their individual springs 880, one end of each spring being secured to the rocker member 878 and the other end to the framework in a well known manner. At their lower ends, the rocker members 878 are each in operative relation with the lug extension 881 of the lever member 882 carrying the armature 883 of magnet 884. The lever 882 is provided with a lug 885 cooperating with a stop arm 886 carried on the shaft 887 driven by a motor and friction means not shown, but normally latched against rotation when the stop arm 886 is engaged with the lug 885. Carried on the shaft 887 is a cam 888.

The cam follower 889 controls pivoted rocking members 890 each of which is pivoted at 891 to a rocker member 878 and each in operative relation with an individual punch member 892 for perforating the tape 893, which passes between the punch members 892 and the upper member 894 provided with a row of holes 895 for permitting the members 892 to pass through the tape. The members 890 are operated by the universal member 889 which is in operative relation with the cam 888 and periodically rocks up and down to in turn operate the members 890 to push the punches 892 depending upon whether these members are moved to the right or left as shown in the full or dotted position in turn depending upon the position of the associated lever members 878 which have been operated in turn by their individual armature lever members 875.

As in the case of Fig. 11, with the apparatus in the position shown and in response to a positive or start impulse, the line relay 714 is energized and the armature 840 moves to engage its lower contact completing an energizing circuit for the start magnet 857 from the positive side of battery over the lower contact and armature 840, conductor 841, ring 842, brushes 850, segment 844, conductor 858 and magnet 857, line 859 to the follower 860 and to the negative side of battery. The start magnet 857 upon energization attracts the armature 856 releasing the stop lug 853 from engagement with the brush holder 851 which is thereupon released for rotation. The distributor brushes 850 and shaft 852 are now free to rotate through one cycle of operation during which the first code is received for operating the relays 868. These relays upon operation in turn control their armatures 869. If an impulse of positive polarity is received the direction of current flow to a relay 868 from the repeating armature 840 is such as to operate its armature 869 to engage its front contact and complete the energizing circuit for the individual perforating magnet 871 over the conductor 870, armature 869 and its front contact and ground.

Near the end of the first revolution, the cam 865 has reached the position where the raised portion engages the follower 866 closing a circuit for the magnet 884 which, upon energization operates its armature 882 to release the arm 886 and permit rotation of the shaft 887 and the cam 888 in the direction of the arrow.

The magnets 871 which are energized have attracted their individual armatures 875 and now in turn while the lug 881 is retracted the springs 877 rock the members 878 about their pivots 879 in a clockwise direction to the position shown in dotted lines during the period while the magnet 884 is energized and the projection 881 disengages the ends of the members 878. Immediately thereafter the magnet 884 is deenergized as the raised portion of the cam 865 passes beyond the follower 866 and the members 878 are locked in their operated position. As the cam 888 continues to rotate, the large portion thereof moves the universal member 889 upwardly, pushing those of the punches 892 which are in operative relation with the members 890 through the tape thereby perforating the tape in accordance with the code received over the line 712.

It will be noted that the time interval during which the cam 888 is rotated to perform the perforating operation in accordance with the received code occurs while the brushes 850 of the distributor 843 are rotating to receive the succeeding code combinations for operating the magnets 871. Although the relays 868 operate the magnets 871 in accordance with the new code they have no effect at this time due to the fact that the members 878 are locked in position previously set and will not be unlocked until the end of the cycle when the magnet 884 is again energized.

The speed of rotation of the cam 888 is adjusted so that the perforating operation is completed and the arm 886 restored to engage the lug 885 before the new code has been completely received and before the raised portion of the cam 865 operates the follower 866. A complete overlap is provided in this manner.

As in the case of Fig. 11, the cam 861 is arranged to rotate one seventh of a revolution for each complete revolution of the brushes 850. During the seventh revolution of the distributor 843 the cam follower 874 is operated by the raised portion of the cam 861 and completes an energizing circuit for magnet 872 over conductor 873. The magnet 872 controls a sixth perforator for making the sixth perforation which reverses the polarity of the start and stop signal in a manner already described in connection with Fig. 1. The newly perforated tape is accordingly an exact reproduction of the tape at the transmitting station, including the provision of the necessary change in the character of the start and stop impulse for each cycle of operation.

As will now be clear from the description in connection with Figs. 11 to 14, in the system controlled by the transmitter 629 which is similar to that disclosed in Fig. 3, a start-stop printer 703, stock quotation mechanism, shown in Fig. 4, and perforating mechanism 715, shown in Fig. 14, all may be operated over the same system.

The sender 717 operates from the tape 716 to transmit impulses over the line 718 in the same manner as the sender 629. The transmitter 719, which may be similar to the transmitter 626, to be described in detail hereinafter, controls one channel of a multiplex distributor 720 for repeating impulses over the line 721.

*Monostop system*

Referring now to Fig. 15, one form of receiver for the monostop system is disclosed. In this system, it is assumed that a code of thirty-five signals is transmitted by the transmitter, shown in Fig. 6, to thirty-four stock quotation board magnets and is received by the receiving distributor 687, Fig. 15. The signalling line 686 is connected to the receiving relay 901 which controls armature 902. The armature 902, operating between its upper and lower contacts, impresses positive or negative polarity upon solid ring 904 of the distributor 905. The distributor 905 comprises in addition to the solid ring 904, the segmented ring 906 bridged with the ring 904 by brushes 907 carried on the brush carrier 908. The brush carrier 908 is carried on the motor shaft 912 being connected thereto by means of a friction clutch 909. A spring 913 surrounds the shaft 912 and has one of its ends pressed against the shoulder 914 and the other end against the face of the clutch 909 pressing the disk into operative relation with the brush carrier 908 for rotation with the motor shaft. Carried on the shaft 912 is a synchronizing device 915 of any well known construction for assuring that the distributor is rotating at a proper speed. The motor 916 operates continuously and supplies the power for driving the brush carrier 908.

The brush carrier 908 normally tends to rotate with the shaft 912 but may be prevented from rotation by the stop member 917 which carries the armature 918 of the start magnet 919. When so prevented from rotating the brush carrier 908 slips with respect to the shaft 912 by reason of the friction clutch connection. However, when the magnet 919 is energized the stop member 917 is withdrawn from the path of the brush carrier 908 and the latter is then rotated by the motor through the frictional connection.

The magnet 919 it will be noted is connected to the first segment of the ring 906 and the remaining segments on the ring 906 are connected to stock quotation magnets 921, the opposite terminals of which are connected to the negative side of battery. In response to a start impulse which is of negative polarity, the relay 901 is energized to operate its armature 902 to engage the lower contact and complete an energizing circuit from the negative side of battery over the lower contact and armature 902, the conductor 903, solid ring 904, brushes 907, first or stop segment of the segmented ring 906, through the winding of the start magnet 919 to positive side of battery. Magnet 919 is energized and operates its armature 918 which removes the stop member 917 from engagement with the brush carrier 908.

The speed of rotation of the brush carrier 908 is such that the brushes 907 move over the successive segments of the segmented ring 906 as the code combinations of impulses are received and operate line relay 901. The first fifteen of these code combination impulses, as described above, will operate the magnets 921 which select the letters representing the item to be quoted, then 16th—19th, 21st—24th, 26th—29th, and 31st—33rd will operate magnets 921 to select the numerals and fraction comprising the quotation of the selected item and the 20th, 25th, 30th and 35th impulses operate magnets to select the index or designation of the quotation. Carried on arm 908 is a disk 922 which periodically completes an energizing circuit for operating magnet 923 which completes the operation in accordance with the selection made by magnets 921. In this manner the monostop system may operate a giant distributor for operating the stock quotation board.

In this system it will be noted that no shift operation is necessary inasmuch as the first fifteen code combination impulses invariably select the letters of the item and the remaining code combination impulses invariably select the quotation and designation, each of the above groups of code combination impulses operating different mechanisms.

It will also be noted that in this system, only one start signal is transmitted for each complete cycle as distinguished from successive start stop signals sent between each of the codes comprising a complete cycle of codes. However, the present system may be modified to function in the manner of the first described system, providing a start stop signal for each code combination as will now be described.

*Receiving distributor—Modification*

Connected in the same system over conductor 689 is the line receiving relay 930 which controls the giant receiving distributor or translator 691 shown in detail in Fig. 17. The distributor 691 comprises a solid ring 932 and a segmented ring 933 bridged by brushes 934 carried on the arm 935, which is connected to the motor shaft 936 through a friction clutch mechanism 937, similar to that described in connection with Fig. 15, and which is spring pressed by the spring 938 secured by the shoulder 939. A speed regulating mechanism 941 carried on the shaft 936 governs the speed of rotation of the motor 942 which is connected to and drives the shaft 936. The brush carrier 935 is driven by the motor through the shaft 936 and the carrier friction clutch mechanism 937, but may be held from rotation by the stop arm 943 carrying the armature 944 of the stop magnet 945. The stop magnet 945 is connected over the conductor 946 to the first segment of the segmented ring 933. As in the construction described in connection with Fig. 15, when a start impulse of negative polarity is received over the line 689, the relay 930 is energized and operates its armature 931 to engage its lower contact, completing an energizing circuit from the negative side of battery to the lower contact and armature 931 over the solid ring 932, brushes 934 and over the conductor 946 to the stop magnet 945. Stop magnet 945 upon energization attracts the armature 944 and removes the stop member 943 from the path of the brush carrier 935.

The segments 933 are connected to individual polar receiving relays 961 to 964. The relays 961, it will be noted, are connected over individual conductors 965 to the segments 966 to 968. These relays operate in response to the fifteen code combination impulses to make a selection of the item to be quoted controlling, however, start stop printers of the standard type. The relays 962 are connected over conductors 969 to the sets of segments 971, 972 and 973 and operate in response to code impulses for making a selection of the numbers comprising the quotation. The relays 963 are connected over conductors 974 to the segments 975 and operate to make the fraction quotation selection.

Thirty-five code impulses are received over the conductor 689 and repeated through the distributor brushes 934 to the receiving relays 961 to 964, the first fifteen of these impulses being item selecting impulses, index codes being interspersed between the codes for the numerals making up the quotation. It may be desirable, however, to translate the codes thus received over the conductor 689 into code combinations which may operate the standard type of telegraph printer.

The standard telegraph printer, such as shown in Patent 1,783,382 referred to merely as illustrating the usual type of printer, requires for operation a stop, start and five code combinations of impulses. Accordingly, in order to operate a printer, it will be necessary to interpolate between the various codes, a stop and start impulse and also to separate the various code combinations for selecting the item and for indicating the quotation and for the index.

To this end, the distributor brushes 951, solid ring 952 and distributor 953 are provided. As stated before, the armatures of the first five relays 961 are connected to five successive segments 966 on the segmented ring 953. Preceding these five segments 966 are two segments, the first of which is connected to the positive side of battery.

As the brushes 951 rotate over these seven segments, a positive impulse will be impressed upon the conductor 692 through the first of these segments and brush 951 and as the brush moves over the succeeding segment, a negative impulse will be impressed upon the conductor 692. The conductor 692 extends, as described above, to a telegraph printer of the type illustrated in the patent referred to above. The positive impulse transmitted over the conductor 692 constitutes a stop impulse and holds the printer from rotation. When the brush, however, rotates over the next segment a negative start impulse is impressed upon the conductor 692, releasing the printer for rotation and conditioning it for operation in accordance with the five code combinations transmitted while the brushes 951 rotate over the next five segments 966, the code combination being determined in accordance with the operation of the first five relays 961.

It will be noted that the succeeding seven segments following those just described comprise a segment connected to positive side of battery, a segment connected to negative side of battery, and five segments connected to the armatures of the next five relays 961 and the same applies to the seven segments marked 968. Accordingly as the brush 951 rotates over the segments, a stop, start and five code combinations of impulses will be transmitted for operating the printer in accordance with the second and third groups of five relays 961.

The printer will now have printed three letters designating the item which is being quoted in accordance with the code received over the conductor 689. The printer must now print the numerals comprising the quotation of the selected item.

Referring to Fig. 16, it will be noted that two shift codes are provided, one for shifting from the letters to the numerals and one for shifting back to the letters. The numeral shift it will be noted comprises two marking impulses, a spacing impulse and two more marking impulses. In order to shift the printer, the next succeeding group of segments 982 is provided comprising the usual positive and negative segments for start and stop of the printer followed by two positive, a negative and again two positive segments which will automatically thus transmit this particular code over the conductor 692 for operating the shift mechanism to shift the printer in position for receiving numerals thereafter.

Following the segments 982 for transmission of the shift code are the segments 971 for transmission of the first numeral. The segments 971, it will be noted, are connected to the armatures of the first four relays 962 which operate in response to the first numeral code and as the brush 951 rotates over the segments code combinations will be transmitted over the conductor 692 to operate the printer in accordance with the numeral code received. Inasmuch, however, as this code comprises only four impulse periods and the printer is arranged to operate in accordance with the code combinations of five impulses or five impulse periods, provision must be made to take care of the fifth period in the present case.

To this end, following the fourth segment on each numeral selecting portion 971, 972 and 973, the fifth segment is connected to the negative side of battery and the printer is so arranged that the four code combinations of impulses received for the numeral plus a negative impulse on the fifth segment operate the printer in such a manner as to select the numeral in accordance with the four impulse code.

Following the segments 973, are the segments 975 comprising the usual positive and negative stop and start segments and three segments which are connected to the armatures of the three relays 963 which operate in accordance with the fraction quotation code combination. It will be recalled that only three code combinations of impulses are necessary for selecting a fraction quotation item. This leaves two segments which are blank and to correct for this condition, the last two segments are connected to negative and positive battery respectively, the printer being so arranged that when the fraction code combination is received and is followed by a negative and positive impulse, the five code impulses make the fraction selection. In other words, as in the case of the other numerals, the codes are so arranged that the fourth and fifth impulses are locally interpolated to make a complete selection, the actual selection, however, being determined by the first three impulse conditions.

It will be recalled that the codes transmitted over the conductor 689 were so arranged that the designation codes indicating the type of quotation, that is, whether High, Low, Open or Last, comprise impulses transmitted over the fifth position following the codes for any one of the numerals or fractions. Accordingly, such relays as 964 interspersed between the numeral and fraction code receiving relays are operated in accordance with the designation impulses. With the designation code interspersed between the numeral and fraction code, it could obviously not operate a printer as the printer requires a code combination of five successive impulse conditions. It is accordingly necessary to separate the effect of the designation impulses from the numeral and fraction codes and to place them together. To this end, the conductors 976 extending from the armatures of the relays 964 are connected to four successive segments 977 on the distributor 953 and as in the previous cases are preceded by the positive and negative start and stop segments. As in the previous cases, inasmuch as only four code positions are provided, a fifth position must have no effect on the selection and accordingly is connected to the negative side of battery. In accordance with the designation code received, as the brushes 951 rotate over the segments 977, the code segments over conductor 692 will select a particular character which designates the type of quotation indicated by that particular code.

The printer is now in the shift position, and the complete cycle of codes has been received to operate the printer, the next codes again being the letter codes of a new quotation. It is therefore necessary to shift the printer back to the lower case. It will be noted from reference to Fig. 16 that the shift code of the other case comprises five positive impulses. To this end, following the segments 977, there are provided the usual segments for the positive and negative stop and start impulses followed by five segments which are connected to the positive side of battery. Thus five positive impulses are transmitted over the conductor 692 as the brush 951 rotates over these five segments and the printer would operate in response to this code to shift the printer back to its lower case position.

Although the printer is now in condition to receive the next code, it is desirable to separate successive quotations by a space. To this end, instead of connecting the armature of relays 961 directly across to the segments 978 on the distributor ring 953, these armatures, it will be noted, are connected to the segments 966 which are considerably further down on the ring 953 and the segments 978 are connected to negative and positive battery according to the code for "space" in Fig. 16. To provide time for the contacts of the polar relays to settle, the designation code combinations received by the relays 954 are arranged to be repeated over the first group of segments 977 on the next succeeding revolution of the brush 951 following the receipt of the code thereof.

The brushes 951 thereafter wipe over the stop segment preceding the first letter segments 966 and the cycle as described above is then repeated.

Referring back to Fig. 10 it will be noted that the signals received over the line 694 may be arranged to operate a reperforator mechanism 697 controlled by the translator 695.

The line 694 is connected to a receiving polar relay 1001 which controls armature 1002 to operate between its upper and lower contacts. The armature 1002 is connected over conductor 1003 to ring 1004 which is bridged with the segmented ring 1005 by the brushes 1006 carried on the brush carrier 1007. The brush carrier 1007 is normally driven through clutch mechanism 1008 on the motor shaft 1009 driven by the motor 1010, the construction being similar to that shown and described in connection with Fig. 15.

The first or start segment of the segmented ring 1005 is connected over the conductor 1015 to the start magnet 1016 which through its armature 1017 carried on the stop arm 1018 controls the release of the brush carrying arm 1007 for rotation as driven by the motor 1010.

As in the case of Fig. 17, the segments of the ring 1005 are connected to polar receiving relays 1021 of which only the first three are shown inasmuch as the remainder are similarly connected to the individual segments. The first fifteen segments are responsive to the first fifteen impulses for selecting the item to be quoted, the remainder being responsive to the succeeding impulses for making the quotation and for the index operation. The armatures 1022 of the relays 1021 are connected over conductors 1023 to segments on the segmented ring 1024. It will be noted that the connections here are arranged in groups, the first fifteen being connected in groups of five segments each to the segmented ring 1024. The ring 1024 is bridged with the segmented ring 1025 by a pair of brushes 1026 also carried on the brush carrier 1007.

It will be noted that the second and tenth segments on the segmented ring 1025 are multipled together and connected over the conductor 1027 to the polar receiving relay 1028.

This relay controls a circuit which corresponds to line 873, Fig. 14, and functions to effect the addition of magnet 872 for the guide perforation (on top row of rolls in Fig. 9) to such other magnets as have been set. It will be further noted that the segments 1031 are multipled and connected over the conductor 1032 to the receiving relay 1033. The segments 1034 are multipled and connected over conductor 1036 to the polar relay 1037, the segments 1038 are multipled and connected over conductor 1039 to the polar relay 1040, the segments 1041 are multipled and connected over conductor 1042 to the relay 1043 and the segments 1044 are multipled and connected over conductor 1045 to the relay 1046. The segments 1047 are connected in multiple over the conductor 1048. The relays 1033, 1037, 1040, 1043 and 1046 correspond to the relays 938 shown in Fig. 14 and function in the same manner to operate a perforating mechanism. Relay 1028, it will be noted, is operated by an impulse of positive polarity when the brushes 1026 move over the second segment and by an impulse of negative polarity when the brushes move over the tenth segment to restore and control the sixth perforation in the seventh position or synchronizing position on the tape. When the brushes 1026 move over the third to the seventh segments, the relays 1033 to 1046 are invariably operated in accordance with the seventh code received perforating a tape in accordance therewith. The brushes 1026 will then move over the eighth segment which is connected to positive side of battery and an impulse of positive polarity is impressed on the conductor 1048 which extends to a magnet similar to the magnet 884 shown in Fig. 14 for controlling the perforation operation in accordance with the operation of the perforating magnets during the preceding cycle. Conductors 1050 are similar to the conductors 870 extending from the armatures 869 of the relays 868 to the selector magnets 871.

The brushes then rotate over the next set of five segments and the relays are operated in accordance with the next five code impulses received and control the perforator in accordance therewith, the same operations occurring during the movement over the third group of segments. Immediately following the operation of the relays for the perforating magnets an impulse of positive polarity is transmitted over the conductor 1048 for operating the magnet which controls the perforating operation in accordance with the code setting. It will be noted in this connection that the last three groups of ring 1025 just as the first three groups, are arranged in combinations of five each, the first four contacts being arranged for the indication of the item and the fifth being the index quotation code position. The last group of this set is arranged at the top of the distributor in order to provide the same sort of overlap as shown in Fig. 17.

In operation, in response to the receipt of a start impulse as described above over the conductor 694, relay 1001 operates its armature 1002 to engage its lower contact and an impulse of negative polarity is sent over the line 1003, ring 1004, brushes 1006, the first segment of the segmented ring 1005, conductor 1015 and magnet 1016. Magnet 1016 upon energization operates the stop arm 1018 from engagement with the brush carrier 1007 which is thereupon released for rotation.

As the brushes 1006 now rotate over the successive segments, code combinations of impulses received by the relay 1001 operate the armature 1002 to repeat the impulses to the relays 1021. Relays 1021 are thus set in accordance with the received code. The brushes 1026 now reach and rotate over the group of segments 11th to 17th of ring 1025 and operate in accordance with the previously received code. As the brushes 1026, move over the segments with which conductors 1023 of relays 1021 are connected the settings of the relays 1021 are repeated through the segments 1024 and 1025 to the relays 1033, 1037, 1040, 1043 and 1046, and these relays upon being set in turn operate the perforating selector magnets, following the operation of these relays the brushes move over a segment connected to positive polarity and an impulse of positive polarity is sent over conductor 1048 to operate the magnet for starting the perforator into operation. The magnets are thereupon reoperated in accordance to the next code as the brush 1026 moves over the next set of segments. When the brush 1026 has returned to normal and has been stopped and has been re-started for its subsequent revolution, and moves over the first set of segments which are connected to the last set of segments on the segmented ring 1005, the last received code is transferred to the relays and to the perforator magnets.

The tape is perforated in accordance with the tape at the transmitter comprising three sets of perforations for code combinations of the item to be quoted and the next four sets of perforations comprising four positions each for code combinations of the quotation and an extra position for the index quotation.

The Monostop system, although arranged to transmit in code combinations of thirty-five impulses each, may operate a thirty-four magnet stock quotation system 687; a five unit code Baudot printer by means of the translating mechanism 691 and a reperforator for perforating a tape 693 by means of the mechanism 695 and the reperforator 697.

*Multimux system*

Referring to Fig. 19, there are five feelers 1051 for engaging perforations in the tape in accordance with code combinations of impulses to be transmitted, plus a sixth feeler 1051′ which is operated only once during the transmission of the seventh code for synchronizing purposes. The showing here, of the feeler, is diagrammatic as the manner in which they engage the tape to connect either positive or negative battery to the conductors 1052 connected thereto has been described in connection with earlier figures.

The conductors 1052 connected to the first five feelers 1051 extend in multiple to contacts 1053 to 1059. These contacts 1053 to 1059 are in operative relation with the switches 1061 to 1067, respectively, which in turn are connected over conductors 1068 to the polar receiving relays 1071. The switches 1061 to 1067 are arranged about the circumferential edge of a sequence cam disk 1060 mounted on a motor shaft 1069 and driven by a motor 1070 of any well known construction and provided with a speed regulating device 1072. The motor 1070 it will be noted is connected to the positive and negative side of a source of energy for rotating the motor.

The cam disk 1060 is provided with a sequence cam 1073 comprising a raised portion which as the disk 1060 rotates successively engages and raises the followers 1061 to 1067 and as these followers are raised they close their respective contacts 1053 to 1059. Carried on the shaft 1069 in addition to the disk 1060 is a second cam disk 1074 and a third cam disk 1075. The switches operate thus:

Follower 1077 lifts
Follower 1061 lifts
Follower 1062 lifts and falls
Follower 1061 falls
Follower 1077 falls This is indicated by the comparative lengths of the cams on the leading side and following side of the radial broken line from the shaft 1069. The tape-control cam disk 1074 is provided with a series of raised portions 1076 which periodically operate a switch lever 1077 operating a make before break contact 1078 connected to wire 1120. The switch 1077, it will be noted, is connected over a conductor 1079 to a stepping magnet 1080 which controls the movement of the feelers 1051 into the perforations of the tape 37 and steps the tape in a manner described in connection with earlier figures. As will be noted, the switch 1077 is periodically operated by the portions 1076 on the cam disk 1074 as the latter is rotated to periodically ground the conductor 1079 and provide an energizing circuit for the magnet 1080 during normal operations. It will be noted that the switch 1077 engages the elevated portion 1076 of the disk 1074 invariably an instant before the cam portion 1073 on the disk 1060 engages one of the switches 1061 to 1067 for the purpose to be described in more detail hereinafter.

The phase-testing cam disk 1075 is provided with a series of cams 1081 which periodically operate a switch 1082 to engage a contact 1083. The switch 1082 is connected over a conductor 1084 and resistance 1085 to the sixth feeler 1051'. As has been described in connection with previous figures, the tape 37 is provided with a sixth perforation opposite the seventh code only of any group of codes so that the feeler 1051' at other times impresses the negative side of battery on conductor 1084. The follower 1082 periodically engages the contact 1083 which is connected over the conductor 1086 to one side of the relay 1087 and to the arm 1088 controlled by the perforated tape 37 to engage or disengage the contact 1089 connected to the negative side of battery through the resistance 1090 and to the opposite side of the relay 1087. As the switch 1082 periodically closes negative potential is impressed on one side of the relay 1087 over the conductor 1086 but inasmuch as the other side of the relay is also connected to the negative side of battery through resistance 1090 this relay is not affected. When, however, due to the sixth perforation, positive polarity is impressed on the conductor 1084 on closure of the contact 1083 by switch 1082, positive polarity is impressed on one side of the relay 1087 and if at this time, the tape follower arm 1088 has been disengaged from its contact 1089 by reason of the fact that the tape is taut, relay 1087 will be energized to operate its armature 1121 and to stop the transmission.

It will be noted from the above description that the shaft 1069 is continually driven by the motor 1070 so that the brush 1091 moves continuously and switches 1061 to 1067 are continually being closed in sequence during operating periods.

The relay 1100 comprises a locking armature 1101, a synchronizing impulse control armature 1102 and an armature 1103 which when the relay 1100 is energized engages its front contact connected over conductor 1104 to a relay 1105. The relay 1105 is provided with a locking armature 1106, an armature 1107 for extending the winding of relay 1100 to conductor 1103 and an armature 1109 which controls an energizing circuit to the tape stepping magnet 1080 in a manner to be described. A third relay 1111 is connected over a conductor 1112 to a sixth switch contact 1113. It will be noted in this connection that the switches 1061 to 1067 each control five contacts whereas the switch 1067 controls in addition to the five contacts, the sixth contact 1113 which as stated above controls an energizing circuit for the relay 1111. The relay 1111 in this manner functions to detect closing of the seventh switch 1067 and therefore the end of the previous cycle. As will be described this relay upon detecting this condition, prepares the apparatus for starting transmission at the beginning of the next cycle when the brushes 1091 reach the first segment on the segmented ring 1094.

The relay 1111 comprises an armature 1114 which controls the locking circuit of relay 1100 and an armature 1115 which controls connection from the winding of relay 1100 and the conductor 1108 to the resistance 1116 and to the point 1083.

The shaft 1069 carries also the brush-arm 1092 and the double brush 1091 which at all times connects the line wire 1132 to some one of the thirty-five segments of the segmented ring 1094. Thirty-three of these segments are connected by wires 1095 to armatures 1096 of thirty-three polar relays 1071, the 34th segment is connected to negative by wire 1124 and the 35th segment is connected to the armature 1118 of the relay 1119.

The locking manual tape-stop key 1097 and its tongue 1098 places earth on wire 1099 to hold charged the relay 1100 whose armature 1103 holds charged the relay 1105 whose armature 1109 holds charged the tape-stepping magnet 1080 which holds the tape from stepping and holds all feelers 1051 and 1051' against negative.

The reversing relay 1110 when in unoperated position will reverse the 35th segment from negative to positive. The 35th segment is connected to the armature 1118 of relay 1119, whose upper point is connected to positive and whose lower point is connected by wire 1117 to armature 1122 of relay 1110 whose front point is connected to negative and whose back point is connected to positive.

The apparatus being at rest, the operator at the sender 627 starts the motor 1070 and closes the locking key or tape stop switch 1097. The motor attains its regulated speed and rotates the disks 1060, 1074, 1075, and the brush carrier 1092. The key 1097 energizes the relay 1100 which energizes the relay 1105 which energizes continuously the stepping magnet 1080. The sender 627 does not step. All feelers 1051 are held to negative, all relays 1071 are charged negative and all armatures 1096 are held to negative but armature 1118 is connected to positive at the armature 1102 of charged relay 1110. This is the normal condition of running idle, or running without transmission. In this period the receiving station starts and attains synchronism, being guided in synchronizing by the sole positive impulse from the relay 1110 in each revolution. The key 1097 is kept closed when not transmitting thus maintaining the synchronism by reason of the one reversed impulse in each revolution.

As a result of the operation of switch 1097 an obvious energizing circuit is completed for the relay 1100 over conductor 1099 to ground over the switch 1098. Relay 1100 upon energization closes the clocking circuit for itself over armature 1101 and its front contact and the back contact and armature 1114 and breaks the circuit of relay 1110.

A further result of the energization of relay 1100 is to operate the armature 1103 to engage the front contact completing an obvious energizing circuit for the relay 1105 over the conductor 1104. Relay 1105 upon energization prepares a locking circuit for itself at armature 1106 and over conductor 1120 to the make before break contact 1078. This make before break contact is periodically closed an instant before the closing of any one of the switches 1061 to 1067 by movement of the switch 1077 over the cam 1076 on disk 1074, but is again broken an instant thereafter when the switch 1077 moves off of the cam portion 1076, immediately after any one of the switches 1061 to 1067 moves off of the cam 1073. However, this has no effect on relay 1105 inasmuch as the original energizing circuit for the relay 1105 remains completed over the front contact and armature 1103 while the relay 1100 remains locked.

A further result of the energization of the relay 1105 is to complete a closing circuit for the tape stepping magnet 1080 over the front contact and armature 1109 and the magnet 1080 is held energized preventing operation of the tape and accordingly preventing any operations of the apparatus at this time. The operation of armature 1107 has no effect at this time, its operating having effect as will be described hereinafter in connection with other operations.

The attendant at the sender 627 inserts a tape such as 37, with the first code holes of the cycle above the retracted feelers 1051, and then opens the tape-stop switch 1097 to permit the transmission to start.

With this condition existing, the motor 1070 continues to rotate the three disks 1060, 1074 and 1075 and the brush carrier 1092 until the switch 1067 is the next to be operated by the cam 1073. The switch 1077 now is operated by one of the cams 1076 connecting ground to the contact 1078 and locking the relay 1111. When now the cam 1073 closes the switch 1067 the sixth contact 1113 is closed and an obvious energizing circuit is completed for the relay 1111 over the conductor 1112. The energization of the relay 1111 operates the armature 1114 to disengage its back contact opening the locking circuit for the relay 1100 and the relay 1100 is deenergized dropping its armatures into the position shown in Fig. 19. Disengagement of armature 1103 from its front contact opens the original energizing circuit for the relay 1105, but this relay is now locked up over the contact 1078 as described above and the movement of armature 1103 therefore has no effect at this time. The stepping magnet 1080 therefore continues to receive an energizing current through the front contact and armature 1109. The operation of the armature 1102 from its front to its back contact charges the relay 1110 over the conductor 1123 and the relay 1110 operates quickly and connects negative battery over the armature 1122 and conductor 1117 and the lower contact and armature 1118 to the last segment on the segmented ring 1094. At this time cam 1081 will operate switch 1082 to close contact 1083, but this will have no effect at this time.

On continued rotation of the three disks, the cam portion 1073 moves past the last switch 1067 and the switch 1067 is opened breaking the circuit at 1113. Relay 1111 is deenergized again preparing a locking circuit for the relay 1100 which, however, is at this time deenergized and is not affected thereby. Immediately thereafter, the cam portion 1076 is beyond the switch 1077 and the switch 1077 is again moved to the position shown, opening contact 1078 and closing the contact shown. As a result of the opening of contact 1078, the locking circuit for the relay 1105 is opened and inasmuch as the original energizing circuit for this relay is also opened at armature 1103, relay 1105 now deenergizes. The only effect of the deenergization of the relay 1105 is to open one of the energizing circuits for the tape stepping magnet 1080 at armature 1109, although this circuit continues to receive energizing current over the conductor 1079 and switch 1077 with the adjacent contact shown connected to ground.

On continuous rotation of the three disks, switch 1077 is again operated by the cam portion 1076 on the disk 1074 opening the only energizing circuit left for the stepping magnet 1080 and this magnet is deenergized. At the same time the contact 1078 is connected to ground to prepare a locking circuit for the relay 1105 but this relay is now deenergized and the locking circuit prepared therefor has no effect.

As the disks now continue to rotate, the first switch 1061 is operated closing its five contacts 1053 and connecting the relays 1071 associated therewith to the first five feelers 1051 over the conductors 1052.

The deenergization of the stepping magnet 1080 has released the feelers permitting them to move into the perforations in the first tape portion of the cycle with which they are at that time in operative relation and the relays 1071 are accordingly operated over the conductors 1052 in accordance with the perforations of the tape, setting their armatures 1096 for repeating impulses over the conductor 1132 as the brush 1091 moves over the first five segments the phase-test cam switch 1082 now operates briefly without effect.

Soon thereafter disk 1060 has rotated to move the cam 1073 beyond the switch 1061 which again drops to its lower position opening the contacts 1053 and an instant thereafter the switch 1077 moves off the cam 1076 again closing an energizing circuit for the stepping magnet 1080 and opening the locking circuit of the relay 1105 which has however no effect as will be clear. The energization of stepping magnet 1080 moves the feelers from the tape and steps the tape to the succeeding position in a manner which has already been described in detail in connection with other figures. As in previous figures, it will be clear that brushes 1091 may be arranged to rotate over the five segments associated with the relays 1071 of switch 1061 sufficiently long after the energization of these relays to provide the necessary overlap permitting these relays to properly energize and be in operative position before the impulses are to be repeated.

During the operation of the switch 1061 by cam 1073 and of switch 1077 by cam 1076, the phase-testing cam 1081 operates the switch 1082 engaging contact 1083 briefly, as mentioned above, and potential from the negative side of battery is extended over conductor 1084 through the contact 1083 to one side of the relay 1087. This potential is of negative polarity inasmuch as the sixth feeler 1051′ does not engage any perforation of the tape during the first six code periods. Relay 1087 is not affected inasmuch as its opposite terminal is also connected to negative battery through the resistance 1090.

During the continued rotation of the three disks successive switches 1062 and 1067 are operated in a manner described in detail in connection with 1061. In each case the energizing circuit for the relay 1080 is opened an instant before the operation of the switches 1061 to 1067 permitting the feelers to move into the perforations in the tape and in this manner the relays 1071 are operated in accordance with the perforations in the tape 37.

As described in other figures, the first three switches 1061, 1062 and 1063 energize their associated relays 1071 in accordance with the letter code combinations of conditions and the next four will energize their associated relays in accordance with numerals, fractions and designation codes.

Operations will now continue as described during the continued proper phase condition of the apparatus until the tape 37 becomes taut and opens the contact 1089 by moving the tape follower 1088 from engagement therewith. During this continued operation it will be noted that positive or negative polarity is periodically impressed over the armature 1118 to the last segment of the segmented ring 1094, positive if the quotation be "Last" and negative if otherwise, the relay 1119 being the recording relay for the 35th pulse of each cycle.

It will now be assumed that the tape 37 becomes taut due to the more rapid rate of transmission of codes than rate of perforations of the tape. As a result thereof, the bypass circuit of relay 1087 is opened. As stated above, the cam 1081 periodically moves the follower 1082 into engagement with the contacts 1083 so as to impress negative polarity over the conductor 1086 from conductor 1084 during the transmission of the first six code combinations as the tape feeler 1051' fails to engage any perforation in the tape. Accordingly, during the transmission of the first six code combinations no effect occurs, even though the tape becomes taut. When, however, the seventh code position is reached, the sixth feeler 1051' enters the sixth perforation impressing positive polarity on the conductor 1084 and when now the follower 1082 engages the contact 1083 an energizing circuit is completed for the relay 1087 through the resistance 1090 to negative side of battery. The energization of relay 1087 operates its armature 1121 to engage its front contact and thereby close a locking circuit for relay 1087 over armature 1121, resistance 1116, winding of relay 1087, and resistance 1090. Cam followers 1067 and 1077 are up at this time, switch 1067 is in operated position, points 1113 are closed and relay 1111 is in operated position. Cam 1073 now releases switch 1067 which in turn releases relay 1111 and completes an energizing circuit for the relay 1100 through the front contact and armature 1121, back contact and armature 1115, back contact and armature 1107, and to the winding of the relay 1100 to negative side of battery. Relay 1100 now energizes and the cycle of operations described above in connection with the operation of the key 1097 occurs; that is, the relay 1100 is locked over its armature 1101, moves its armature 1102 to open the circuit of relay 1110 (to cause positive impulses over the last segment of ring 1094), and closes an obvious energizing circuit for the relay 1105 at armature 1103. Relay 1105 as long as it remains energized maintains the relay 1080 energized preventing operating of the tape feelers, and the apparatus accordingly is rendered non-operative.

The brush 1091 lags behind the cam 1073 in phase relation in the cycle of transmission so that armatures 1096 of relays 1071 may have time to settle after being set by cam 1073 and before being traversed by brush 1091. In the case of stopping transmission by the tape-follower as just described, the armature 1118 will have been set by control of the tape 37 and the relay 1100 will have opened the circuit of relay 1110 at an instant before the brush 1091 has traversed the armature 1118. To preserve the signal of the relay 1119 until the brush 1091 shall have traversed the armature 1118, the slow-release relay 1110 retains negative potential upon the wire 1117 for a period of time sufficient to permit the brush 1091 to traverse the armature 1118, after which the relay 1110 will connect positive potential to the wire 1117 and the negative potential from the stopped feelers will operate relay 1119 to move the armature 1118 to connect the wire 1117 to the last segment of the ring 1094, thus supplying a synchronizing impulse upon the line 1132 as before beginning transmission and as with the key 1097 closed.

As the motor 1070 rotates, thirty-four negative and one positive impulses are transmitted in each revolution inasmuch as the magnet 1080 and the relay 1100 remain energized as above described. When, however, the relay 1087 is released due to the by-pass circuit completed therefor through contact 1088—1089 and the relay 1087 deenergizes. When relay 1087 deenergizes its armature 1121 moves away from its contact, opening the energizing circuit for the relay 1100 and if as stated above when the seventh code is transmitted this condition exists and relay 1111 is energized, the locking circuit for relay 1100 is open and this relay deenergizes conditioning the apparatus for operation in a manner described above.

The tape 37 may be out of phase with relation to the switches 1061 to 1067 and with the sequence cam 1073. The proper phase relation will be restored by stopping the tape in its first position of a series and then by re-starting transmission from the tape to the polar relays 1071 when the cam disk 1060 is in the position shown in Figure 19.

Should the feeler 1051' enter a guide hole when sequence cam 1073 is not in proper phase relation, then the switch 1067 is unoperated, points 1113 remain open, relay 1111 is unoperated and the phase-testing cam 1075 will operate the relay 1100, over the circuit from negative through relay 1100, armature 1107, wire 1108, armature 1115, resistance 1116, wire 1086, point 1083, follower 1082, wire 1084, resistance 1085, and feeler 1051' to positive.

The relay 1100 locks through armatures 1101 and 1114 to earth. The armature 1103 operates the relay 1105. The armature 1109 connects earth to wire 1079 which charges magnet 1080 and holds it charged, thus stepping the tape into its first position of the cycle and holding it there. Meanwhile, the sequence cam 1073 progresses and sends only negative pulses to the line 1132 until cam 1073 reaches the switch 1067 when transmission is resumed as described initially herein.

From the above description it will now be clear that the apparatus is so arranged that it may be conditioned for operation at any time and will automatically start into transmission in proper phase relation with respect to the remote receiver and with respect to the perforations in the tape and if for any reason transmission is suspended during operation it will start transmission again at the beginning of a cycle automatically.

*Multiplex receiving distributor*

The multimux receiving distributor will now be described in connection with Fig. 20.

The code signals received over the conductor 1132 flow in series through the line relay 1151 and the corrector relay 1152.

Th distributor 673 comprises a brush carrier 1153 carrying brushes 1154 to 1157. The brushes 1155 bridge the segmented ring 1161 and the solid ring 1158 the latter being connected over conductor 1162 to the armature 1163 of the relay 1151. Each segment of ring 1161 is connected to an individual polar receiving relay 1164 of which there are thirty-five and which are energized in accordance with the operation of armature 1163 in response to the impulses received over the line 1132 in a manner described in connection with Fig. 19. Each relay 1164 controls an individual armature 1166 operating between contacts of positive and negative polarity and connected over an individual conductor 1167 to an individual register magnet 1168. In this manner, the magnets 1168 are selectively energized in accordance with the operation of the polar line relays 1164 and in turn in accordance with the code impulses received over the line 1132.

The brushes 1154 bridge the grounded ring 1171 and the two segments 1172 and 1173 which are respectively connected over conductors 1174 and 1175 over which periodic impulses are transmitted for operating the devices prepared by magnets 1168.

The conductors 1167 in addition to being connected to the windings of the magnets 1168 are connected to individual segments on the segmented ring 1177 bridged by brushes 1156. The order of connection to the segments on the ring 1177, it will be noted, is not altered from the consecutive arrangement of the relays 1164. The first five connections extend to the last set of segments on the segmented ring 1177 to provide the necessary overlap to permit relays 1164 to energize before impulses therefrom are repeated over the ring 1177 and so on. Thus the armatures of five successive relays 1164 are connected to five successive segments selected on the ring 1177 and thereafter the same order is followed throughout. It will be noted that interpolated between groups of five segments, from the first group 1179 through to the seventh group 1189, two segments are provided connected to positive and negative polarities respectively, and preceding the segments 1179 for the first code combination, first negative and then positive segments are provided.

The impulses transmitted over the conductors 1167 to the magnets 1168 and to the ring 1177 are extended through the solid ring 1178 and over conductor 1181 to a line receiving relay such as relay 707, Fig. 11, for operating a printing mechanism similar to that shown in said figure.

The impulses transmitted over the conductor 1181 it will be noted comprise code combinations similar to those codes transmitted over the line 705 with the positive and negative interpolated impulses for starting and stopping the distributor and printing operations just as in that case.

It will be noted from an inspection of Fig. 11, that the start impulse is always one of negative polarity, as the opposite terminal of the start magnet 771 is connected to the positive side of battery over switch 774, except for the first code combinations when the cam follower 774 is on the raised portion of the cam 777. As shown in Fig. 20, preceding each code combination there is a segment connected to positive polarity followed by a segment connected to negative polarity. When the brush 1156 is in engagement with the positive segment a positive or stop impulse will be transmitted over the line 1181. When, however, the brush 1156 moves to the succeeding segment which is negative in polarity, a start impulse is transmitted over the line 1181 which will start the apparatus into operation.

This is the condition obtained preceding all of the code combinations except the first. As shown in Fig. 20, the armatures 1166 of the first five relays are connected to segments near the lower end of the segment ring 1177. These segments accoordingly transmit the first received code over conductor 1181 and accordingly in view of the construction shown in Fig. 11, the stop and start impulses are negative and positive respectively.

In addition to flowing over the conductor 1181 to operate a printer such as shown in Fig. 11, the code impulses generated by the polar relays 1164 and flowing over the conductors 1167, are also transmitted by the brushes 1156, conductors 1182 and the conductor 1183. The conductors 1182 are connected to relays of a perforating mechanism such as the relays 868 of Fig. 14. The conductor 1183 controls a circuit to a perforating magnet such as magnet 884.

To provide for perforating the sixth perforation at the end of the cycle the brushes 1157 bridge the segments 1184 and 1185. The segment 1184 is connected with positive side of battery and segment 1185 is connected over conductor 1186 with a relay similar to relay 1028 of Fig. 18 causing an impulse of positive polarity to flow over conductor 1186 and to operate the relay to in turn operate a perforating magnet such as magnet 872 (Fig. 14) to perforate the sixth perforation on the tape. After the transmission of the seventh code, the brushes 1157 bridge the segments 1188 and 1189 causing a negative impulse to flow over conductor 1186 to restore the relay and the punch magnet.

From the above description it will now be clear that the impulses received over the line 1132 may be employed to perform a thirty-four magnet stock quotation operation or they may be translated into five unit code impulses for operating a start-stop printer or they may be transmitted to operate a perforator as described in connection with Fig. 18.

*Monomux system*

The monomux system of transmission also controlled by the perforated tape 37 is arranged to transmit over one channel of a multiplex system. The common practice in printing telegraphy is to operate multiplex or multichannel, five significant pulses being transmitted in succession over each channel.

A problem arises in adapting the system of this invention to transmission by the existing terminal equipment of the present telegraph system. It is required to transmit the thirty five impulse condition by a system of existing terminal apparatus which will receive seven groups of five and then unite them into a dependent group of thirty five.

*Multiplex transmitter*

Referring to Fig. 21, the reference character 1201 designates a standard four channel multiplex sending distributor commonly used in the telegraph art and modified for the purposes of this invention. The distributor 1201 comprises a segmented ring 1202 and a solid ring 1203 bridged by the brushes 1203'. There are four groups of segments on the segmented ring 1202, each group consisting of five segments. Associated with the last three groups of segments on the ring 1202 are three standard telegraph transmitters, 1204, 1205 and 1206 which have not been modified from the standard practice now in use and which, as shown, are provided with contactors 1207 operating between upper and lower contacts and connected over individual conductors 1208 to individual segments on the segmented ring 1202.

Each of these transmitters is provided with a magnet 1211 connected over a conductor 1213 to an individual segment 1214 on a segmented ring 1215 and bridged by a brush 1216 with the solid ring 1217 which is connected to positive side of battery. Following the code transmission by movement of the brushes 1203' over the segments on ring 1202 of a particular transmitter 1204 the associated magnet 1211 is energized over a circuit including the associated segment 1214 on ring 1215. The associated segment 1214 is placed just below the last segment of the group of five segments associated with that particular transmitter so that the contacts are prepared to be operated in accordance with the new code setting in preparation for a new code to be sent immediately after transmission of the preceding code combination.

The first five segments on the ring 1202 are connected over the conductors 1221 to the sender contacts 1222 of the sender 1223 which is a tape sender of standard construction but modified for the purpose of this invention by the addition of a pole changing relay 1234, a starting relay 1233 and a cam 1271 with its accompanying equipment as will now be described more fully.

The feelers of the transmitter 1223 are operated into engagement with their upper positive plate or lower negative plate in accordance with the perforations in the tape 37 upon release of the bell crank 1235 pivoted at 1236 and carrying these feelers. The bell crank 1235 at its opposite end 1237 is in operative relation with the lever 1238 carrying the armature 1239 of magnet 1241. The magnet 1241 is connected over conductor 1242 to the break switch 1243 for operation. The transmitter 1223 comprises in addition to the five feelers 1222 shown a further set of contactors 1251 and 1252 which are operated by the feeler 1253 operated in accordance with the sixth perforation as described above and connected over conductor 1254 to the armature 1255 of relay 1234 for controlling the synchronizing pulse.

The relay 1234 comprises an armature 1255 which at its back contact controls the polarity over the conductor 1256. The relay 1234 also comprises two armatures 1257 and 1258 which at their front and back contacts control the polarities over the upper and lower contacts, respectively, of the sender 1223, over conductors 1259 and 1261, respectively. For controlling the operation of the transmitter in accordance with the condition of the tape the tape follower arm 1262 controls a shunt circuit around the relay 1264, the shunt circuit comprising conductors 1265 and 1263. The energizing circuit for relay 1264 extends from negative side of battery through resistance 1266, winding of relay 1264, over conductor 1267 to the contact 1268 adjacent cam 1271. The cam 1271 is secured to the shaft 1272 which also has secured thereto a ratchet wheel 1273 in operative relation with a pawl 1274 pivoted at 1275 to a lever 1276 carrying the armature 1277 of a stepping magnet 1278. The stepping magnet 1278 is connected over conductors 1279 and 1280 to the segment 1281. The follower 1283 connects positive polarity over the conductor 1284 to the relay 1234. The cam portion 1282 also operates the cam follower 1286 to break the contact 1287 and make the contact 1268 connected to the conductor 1267 for the purpose to be described.

Connected to the conductor 1256 is a start key 1291 which controls the application of positive polarity to conductor 1256 for a purpose now to be described in connection with the operation of the apparatus thus far described.

To start operation, the driving motor is started, and the start key 1291 is operated to close its contact with the positive side of battery. An obvious energizing circuit is completed for the relay 1233. Relay 1233 upon energization completes a locking circuit for itself over armature 1292, cam follower 1286 and its contactor 1287 to positive and operates armature 1293 to disconnect the contactor 1243 from the conductor 1280 and to extend positive polarity over armature 1293, contactor 1243 and conductor 1242 to energize the magnet 1241. Magnet 1241 upon energization operates its armature 1239, and the universal member 1238 in engagement with the bell crank 1235 at 1237 holds all of the feelers of transmitter 1223 in engagement with their lower contact and out of the perforations of the tape. It will be understood in this connection that a similar bell crank lever is provided for each of the feelers 1222 and 1253 and that all are in operative engagement with the universal member 1238.

The brushes 1203' and 1216 now revolve continuously and at regulated speed. As the brushes 1203' move over the first five segments five impulses from the negative side of battery at armature 1257 in engagement with its negative contact are transmitted over the brushes 1203' ring 1203 and to the line 1295 connected to the polar transmitting relay 1296 which controlling its armature 1297 controls the transmission of impulses of positive and negative polarity over the line 1298 extending to the remote station.

Immediately after the transmission over conductors 1221 and the first five segments of the segmented ring 1202, the brush 1216 wiping over the segment 1281 completes an energizing cricuit for the magnet 1278 to ground through the winding of the relay 1278 conductor 1279, conductor 1280, segment 1281, brush 1216, and solid ring 1217 to the positive side of battery. Stepping magnet 1278 upon energization operates its armature 1277, and the lever arm 1276 moves the pawl 1274 to rotate the cam disk 1271 through one seventh of a revolution. The impulse transmitted over conductor 1280 has no effect on the magnet 1241 at this time inasmuch as the conductor 1242 is disconnected therefrom at the break switch 1243 in a manner described above.

As the brushes 1203' move over the succeeding sets of segments on ring 1202 telegraph codes from the transmitters 1204 to 1206 are transmitted and following each code transmission from one of the transmitters, its individual magnet 1211 is energized and deenergized as the brush 1216 moves over and off of the segment 1214 conditioning the individual transmitter for the succeeding code to be transmitted.

The above cycle of operations is repeated as magnet 1278 is energized once during each revolution of the brushes of the distributor 1201 when the brushes 1216 engage the segment 1281 until the cam 1282 of the cam disk 1271 operates the follower 1283. During the succeeding or seventh revolution, positive polarity is connected over conductor 1284, energizing relay 1234 which reverses the polarity impressed by armature 1257 over conductor 1259 and the feelers 1222.

For the first channel, the brushes 1203′ send to the relay 1296 five negative pulses in each revolution except in the re-current seventh revolution, in which five positive pulses are sent. For the six revolutions, the circuit of the relay 1296 is from earth through relay 1296, wire 1295, ring 1203, brushes 1203′ first five segments of ring 1202, five wires 1221, five feelers 1222 down, wire 1259, armature 1257 and back point to negative potential. For the seventh revolution, the cam 1282 stops under the follower 1283 and energizes the pole-changer relay 1234 over an obvious circuit, charging the circuit of the relay 1296 to the front point on armature 1257 and to positive potential. By this sequence of thirty pulses negative and five pulses positive, indefinitely repeated, the receiving equipment, to be described, is synchronized and made ready for operation in reception.

To start transmission, synchronism having been attained, the tape 37 is inserted in the transmitter with the first cycle of holes over the retracted feelers 1222. The key 1291 then is opened. At the instant of opening the key 1291 the brushes 1216 may be in any position and the cam disk 1271 may be in any position. Brush 1216 and contact plate 1281 operate magnet 1278 to step the cam disk 1271.

By the operation of the stepping magnet 1278, the cam 1282 of the cam disk 1271 is operated to move its cam follower 1286 causing a make before break operative making engagement between the contact 1287 and the contact 1268 and breaking engagement between the contact 1287 and the follower 1286. Engagement between contacts 1287 and 1268 closes a circuit over conductor 1289 to the relay 1264. If, however, the tape is not taut at this time, this relay will be shunted by the tape arm 1262 and conductor 1263 and this operation will have no effect at this time.

Locking circuit for the relay 1233 is also opened at the cam follower 1286 and relay 1233 will therefore deenergize at this time. This controls the starting of the transmission.

Upon deenergization of relay 1233 armature 1293 permits the make before break switch 1243 to close contact connecting the stepping magnet 1241 to the wire 1280. Meanwhile the brush 1216 has passed from the contact plate 1281, and the magnet 1241 now is deenergized, permitting the feelers 1222 to move into the perforations of the tape and to impress positive or negative polarity on the various conductors 1221.

When now the brushes 1203′ rotate over the first five segments, code combinations of five impulses will be transmitted in accordance with the perforations encountered by the feelers 1222. Immediately thereafter the brush 1216 rotating over the segment 181 energizes the stepping magnet 1278 over conductor 1280 and completes a multiple circuit for the magnet 1278 and for the tape controlling magnet 1241 through the make before break switch 1243. Energization of the stepping magnet 1278 will step the cam disk 1271 to its next position by which the locking circuit for the relay 1233 is again prepared at the cam follower 1286. Energization of the tape control magnet 1241 will operate its lever arm 1238 and through the bell crank 1235 move all of the feelers 1222 out of engagement with the tape and will at the same time cause stepping of the tape to present a new set of perforations in a manner which has been described in detail above. Now after the brush 1216 moves off of the segment 1281 stepping magnets 1278 and 1241 are deenergized. Magnet 1278 upon deenergization allows the pawl 1274 to move to engage the succeeding tooth of the ratchet wheel 1273 and magnet 1241 upon deenergization releases the bell crank 1235 to permit the tape feelers 1222 to enter the succeeding set of perforations and to prepare for the stepping of the tape to the next position. The movement of the feelers 1222 into the perforations has no effect at this time inasmuch as the brush 1203′ is now moving over the segments associated with the standard telegraph transmitters and transmitting standard uniform telegraph codes over the line 1298. When, however, the brush 1203′ returns to the position shown, the next succeeding stock quotation code of five impulses is transmitted.

This cycle of operation is now repeated, a code of five impulses being transmitted over one channel of the distributor with three other of the telegraph codes. The cam disk 1271 is stepped from position to position until finally the enlarged portion 1282 thereof again operates the cam follower 1283. An energizing circuit is thereupon completed for the relay 1234 which operates its armatures 1257 and 1258 to engage their front contacts which thereupon reverses the polarity impressed on conductors 1259 and 1261. The seventh code transmitted accordingly comprises marking and spacing impulses which are negative and positive respectively instead of positive and negative respectively as in the preceding code combinations. During the transmission of the seventh code of the cycle, the armature 1255 of the relay 1234 opens the wire 1254 and prevents the contact 1251 and feeler 1253 from operating the relay 1233.

If during transmission the tape becomes too taut for operation, the transmitter having operated faster than the perforator, the tape follower 1262 will disengage its contact and open the bypass circuit for the relay 1264. This may have no immediate effect, but when the cam 1282 operates the follower 1286, the make before break switch 1287 is closed completing an energizing circuit for the relay 1264. Relay 1264 upon energization causes its armature 1299 to engage with its front contact. As a result of the armature 1299 engaging its front contact an energizing circuit is completed for the relay 1233 from positive battery over armature 1299 and conductor 1256, through the winding of the relay 1233 to negative battery. Relay 1233 upon energization prepares a locking circuit for itself at armature 1292 and its front contact which, however, is not completed due to the fact that the follower 1286 at this time is disengaged from its contact. By action of armature 1293, the relay 1241 is disconnected from the line 1280 and an energizing circuit therefor is completed over the make before break switch 1243 and the front contact and armatures 1293 to positive battery. Magnet 1241 upon energization operates the armature and lever arm 1238 to prevent further operation of the feelers.

The stepping magnet 1278, however, is periodically energized as the brushes 1216 move over segment 1281 and continues to step the disk 1271 step by step. On the first movement thereof the locking circuit for relay 1233 is completed and the circuit of relay 1264 is opened at the follower 1266. The relay 1233 continues energized and prevents further stepping of the tape until the cam 1271 has stepped to the position at which the follower 1286 is again operated, when, should the tape follower 1262 be still lifted, the locking circuit of relay 1233 will be opened and the energizing circuit of relay 1264 will be closed and relay 1264 will continue the energization of relay 1233. The receiver is then in condition to receive the first of the letter code combinations at the beginning of operations and by the automatic phase corrections described above, the transmitter will condition itself to transmit the first or letter code combination at the beginning of a cycle.

If now the tape becomes sufficiently loose the arm 1262 reengages its contact, and the by-pass for the relay 1264 is again completed. When now the cam 1271 is in position where the follower 1286 is again operated the locking circuit for relay 1233 is opened, the relay 1264 is not operated and the transmitter is again in condition for reoperation.

It will be obvious from the above also that in the event the tape for some reason is out of proper phase relation with the cam disk 1271 and distributor 1201, the tape will be prevented from operation. Thus, for example, assume that the tape is out of such phase relation and that the feeler 1253 moves to its contact 1251 at an instant when the cam 1282 has not rotated into the position which indicates a sixth pulse or last code of the cycle. In that event no energizing circuit will be completed for the relay 1234 by the follower 1283 as the cam 1282 will not be in engagement therewith. As a result a circuit will be completed from positive battery over the contact 1251 and tape feeler 1253 to the armature 1255 and its back contact, conductor 1256 and to the relay 1233. Relay 1233 upon energization closes a locking circuit for itself through follower 1286 and front contact and armature 1292 and at armature 1293 it completes an energizing circuit for relay 1241. The tape is thus brought to a stop with the perforations of the first code of the subsequent cycle under the retracted feelers 1222 and is held from further operation until the cam 1282 has moved to operate the follower 1286 at which position the locking circuit for relay 1233 is opened. The original energizing circuit therefor being also open at the tape feeler 1253, relay 1233 is deenergized. The tape is now in proper phase relation with the cam 1271 and distributor 1201 and transmission is resumed.

The impulses repeated over the line 1298 flow through a line receiving relay 1301 (Figure 22) and through a corrector relay 1302 which operates to control the synchronism, in any well known manner, of a distributor 1303. The distributor 1303 comprises a brush carrier 1304 mounted on a motor drive shaft 1305 and carrying brushes 1306 which bridge the solid ring 1307, connected by conductor 1308 to the armature 1309 of the relay 1301 with the segmented ring 1311. The twenty segments of the segmented ring 1311 comprise the channels of the transmitter disclosed in Fig. 21 and are connected to the terminal blocks 1313. Five of these blocks, it will be noted, are connected over the conductors 1315 to the receiving relays 1316 of the stock quotation board system.

The receiving relays 1316 are connected by their armatures 1317 to conductors 1318 which are connected to the segments on the segmented ring 1319 and to the pole changing relays 1320 in multiple, the armatures 1321 of which are connected over conductors 1322 to a group of five segments near the end of the segmented ring 1319. Segmented ring 1319 is bridged with the solid ring 1325 and also with the segmented ring 1326 by the brushes 1327. The segments on the segmented ring 1326 are connected in groups of five to the conductors 1331 and interposed between each group is a segment which is multipled and connected over conductor 1332 for the purpose to be described hereinafter. The solid ring 1325 is connected over a conductor 1334 to a printer such as shown in Fig. 11.

For controlling the operation of the perforator by the impulses over the conductors 1331, ring segments 1337 and 1338 are bridged by brushes 1341. The brushes 1327 and 1341 are connected on a brush carrier 1342 carried on a shaft 1343 driven by a gear 1344 and meshing with a pinion 1345 on shaft 1346. Carried on and rotatable with the shaft 1346 is a gear 1347 meshing with a pinion 1348 on the motor shaft 1305. By this gear arrangement, the brush carrier 1342 is rotated at one seventh the speed of the brush carrier 1304 so that for each complete revolution of the brush carrier 1304, the brushes 1341 will only rotate over the first group of seven segments which constitutes one seventh of the distributor.

It will be assumed that the apparatus of Fig. 21 is operating idly; that is, not transmitting impulses in response to perforations in the tape. During the first revolution of any one group of code combinations, as the brush 1203′ moves over the first five segments of ring 1202, five negative impulses will be transmitted from negative side of battery over armature 1257, conductor 1259, feelers 1222, conductors 1221, first five segments of ring 1202 and over the line 1298 as previously described. Similarly, five negative impulses will be transmitted during the second, third, fourth, fifth and sixth revolutions of the cycle.

Preceding the seventh revolution the cam portion 1282 will move follower 1283 into engagement with its contact, extending positive side of battery over conductor 1284 and winding of relay 1234, energizing this relay and moving armature 1257 into engagement with its front contact. Then when the seventh revolution takes place five positive impulses will be transmitted over armature 1257, conductor 1259, feelers 1222, conductors 1221, first five segments of ring 1202 and over the line 1298. Thus, during each cycle comprising seven revolutions of brushes 1203′, thirty negative and five positive impulses are transmitted over the line 1298. These impulses as described above are received by relay 1301 and repeated over line 1308, ring 1307, brushes 1306, ring 1311, terminals 1313, conductors 1315, and relays 1316.

The speed of rotation of brushes 1327 is such that these brushes will make one revolution while brushes 1203′ of the transmitter make seven revolutions. Let it be assumed that the brushes 1306 are in proper phase relation with the brushes 1203' and that the brushes 1327 are in proper phase relation with the cam 1282. With this condition, and with key 1291 remaining closed, as the first five negative impulses are received, the relays 1316 will be energized to connect their armatures with the negative side of battery and the brush 1327 will move over the first five segments of ring 1319, negative impulses will be transmitted over these segments and over line 1334, the phase relation of brush 1327 to brush 1306 being such that the brush 1327 completes the transmission of the fifth negative impulse from the fifth segment of ring 1319 just before the fifth relay armature 1317 is set or reset by the brush 1306 in its subsequent revolution. Similarly as the next five groups of negative impulses are received the brush 1327 will be moving over the next five groups of segments of ring 1319. When the five positive impulses which follow the thirty negative impulses are received the brush 1327 will be moving over the last group of segments on the ring 1319. These five positive impulses will energize relays 1320 since the windings of these relays are each connected to negative side of battery. Energization of these relays will move their armatures into engagement with their respective negative contacts, impressing negative potential upon the first five of the last group of segments on ring 1319. Accordingly as the brush 1327 moves over the last group of segments on ring 1319 five negative impulses will be transmitted over the line 1334. From the above description it will be evident that if the receiving distributor is in synchronism with the transmitting distributor thirty-five negative impulses will be impressed upon the segments of the ring 1319 to be transmitted over the line 1334.

Now let it be assumed that the distributors are not in synchronism. Under this condition the brush 1327 will be moving over the last group of segments on ring 1319 not while the five positive impulses are coming in over line 1298 but while five negative impulses are coming in. These negative impulses will energize relays 1316 to move their armatures to engage their respective negative contacts and negative potential will be impressed on the pole changing relays 1320. These relays will then have negative potential impressed on both terminals of their windings, and will remain deenergized. Their armatures will therefore remain in engagement with the positive contacts and positive potential will be impressed upon the last group of segments. Thus if the distributors are not in synchronism some of the thirty-five impulses transmitted over the segmented ring 1319 will be positive. The ring 1319 shall have some known form of orientation device for attaining synchronism initially.

It will be understood that connected to the conductor 1334 is a printer similar to that shown in Fig. 11 and connected to the conductors 1331 is a perforator similar to that shown in Fig. 14. The conductor 1342 connected to the segments 1338 and 1337 is connected to a relay as 1028, Fig. 18, which controls the reperforator magnet 872 as shown in Fig. 14.

It will be noted that the conductors 1318 which are connected to the relays 1320 are also multipled to a set of segments 1351, Fig. 23. Segmented ring 1351 is bridged with the segmented ring 1352 by the brushes 1354 carried on the brush holder 1355 and driven through the shaft 1356 and the meshing gears 1357 and 1358 by the motor shaft 1305 shown in Fig. 22. By this means, the two distributors are maintained in synchronism. The segments on the segmented ring 1352 are connected to thirty-four stock quotation magnets 1353, with starting magnets 1359 and 1360 interposed, the first for operating the letter selection and the second for operating the numeral and fraction selection. It will be noted in this connection that the last four magnets comprising the last group are connected to positive polarity instead of negative polarity, as the codes therefor, as noted in connection with the transmitting operation, are reversed in polarity.

Fig. 24, the manner of connecting two sources of energy 1361 and 1362 for supplying positive and negative energy is shown.

The perforator and reperforator disclosed herein form the subject matter of U. S. Patent No. 2,024,012 issued December 10, 1935.

Although I have disclosed my invention in connection with a specific application thereof, it will be obvious that many modifications and adjustments thereof are possible and all come within the scope of my invention nor do I intend to limit myself in the specific application thereof, but intend to cover rather broadly the alterations of the system in connection with one type of code translation to any other type of code translation. Accordingly my invention is as set forth in the appended claims.

What is claimed is:

1. In a telegraph system, a sending distributor having a plurality of impulse transmitting elements, a corresponding plurality of primary control elements, a transmitter having a number of secondary control elements fewer than the number of said impulse transmitting elements, and means including said transmitter to invariably and singly associate each impulse transmitting element with a definite primary control element.

2. In a telegraph system, a transmitting distributor having successive groups of transmitting segments and having the same spacing between consecutive segments in a group as between the last segment of one group and the first segment of a succeeding group, a transmitter having a group of transmitting contacts corresponding in number to the segments in said groups, and means to associate said contacts successively with successive groups of segments.

3. In a signalling system, a transmitting distributor operative in unit multiple cycles, a receiving distributor operative in corresponding unit multiple cycles, means for operating said distributors in their respective cycles, an electrical circuit connecting said distributors over which intelligence signals and cylic phasing signals are transmitted, and means operated over said circuit to associate a certain cyclic phasing signal of said transmitting distributor with a selected cycle only of said receiving distributor.

4. In a signalling system, a telegraph circuit, means to transmit code combinations of signalling conditions and start-stop signals over said circuit, and means for perforating a tape in accordance with both the code combination signals and the start-stop signals.

5. In a telegraph system, a telegraph circuit, means to transmit code combinations of impulses over said circuit, means to send a spacing condition for a start impulse and a marking condition for a stop impulse for certain of said code combinations of impulses, and means to send a marking condition for a start impulse and a spacing condition for a stop impulse for other of said code combinations of impulses.

6. In a telegraph system, a single channel of communication, means to transmit groups of signals over said channel, each of said groups being representative of a digit or part of a complete stock quotation or price, and means to transmit concurrently with the transmission of each of said groups of signals an additional signal, such additional signals constituting a group of signals for indicating the range of a quotation represented by the particular groups of signals representing the quotation.

7. In a telegraph system, means to transmit code combination signals, a permutation device comprising a set of code combination elements, signal controlled means for conditioning certain of said elements in accordance with the permutation of a code signal, and cyclically operative means for conditioning certain other of said elements specially for thereby increasing the number of permutation possibilities of said device.

8. In a telegraph system, a transmitting distributor, two groups of signal controlling elements, means to set said controlling elements in varying permutations according to the signals to be transmitted, a second series of impulse controlling elements corresponding to the first set of elements, means timed by said distributor to transfer the setting of said first mentioned elements to said second series at different times for the two groups.

9. In a telegraph transmission system, a distributor having allocated signal channels over which are adapted to be transmitted character selection signals, and means to superpose designation impulses over said channels concurrently with the transmission of said character selection signals.

10. In a transmitter, a distributor, transmitter contacts in operative relation with said distributor for transmitting code combinations of impulses thereover, and means for transmitting variable start and stop impulses over said distributor.

11. In a transmitter, a distributor, transmitter contacts associated with said distributor for transmitting code combinations of impulses thereover, and other transmitter contacts for controlling the transmission of synchronizing impulses over said distributor.

12. In a transmitter, a distributor, transmitter contacts associated with said distributor for transmitting code combinations of impulses thereover, other transmitter contacts for controlling the transmission of synchronizing impulses over said distributor, and means to sense a perforated tape for controlling said transmitter contacts.

13. In a telegraph system, a start-stop distributor, transmitter contacts in operative relation with the segments of said distributor, a sensing mechanism responsive to a perforated tape controlling the operation of said contacts, means carried by said distributor for controlling the feeding of said tape in synchronism with said distributor, and means whereby said transmitter contacts invariably transmit groups of code combinations of impulses comprising completed messages.

14. In a telegraph system, a transmitting distributor, a receiving distributor, means for checking the synchronism of each cycle of said distributors, and separate means for checking the synchronism of a group of cycles of said distributors.

15. In a telegraph system, a transmitting distributor, a receiving distributor, a start and a stop segment on said transmitting distributor, a start segment on said receiving distributor, means responsive to an impulse of predetermined character during predetermined cycles of said receiving distributor for controlling the synchronism thereof, and means responsive to an impulse of a different character over said transmitter start and stop segments for controlling the synchronism of said receiving distributor at other cycles thereof.

16. In a telegraph system, a single channel simplex receiving distributor including a set of contact elements, a plurality of printers, and means for successively associating the same elements of said distributor with each of said printers.

17. In a telegraph system, a distributor having a start segment, a distributor brush, electromagnetic means for controlling the rotation of said distributor brush, and means whereby said electromagnetic means is responsive to an impulse of a predetermined polarity for starting said distributor into rotation during certain cycles thereof and is responsive to impulses of different polarity for starting said distributor during other cycles thereof.

18. In a telegraph transmitter, a distributor, transmitting contacts less in number than the number of segments on said distributor, means for using said transmitting contacts a plurality of times during a single rotation of said distributor, and means for synchronizing said plurality of times with each complete cycle of rotation of said distributor.

19. In a telegraph transmitter, a distributor, transmitting contacts less in number than the number of segments on said distributor, means for operating said transmitting contacts a plurality of times during a single rotation of said distributor, means for synchronizing said plurality of operations with each complete cycle of rotation of said distributor, and an overlap means whereby said contacts may be operated in accordance with a succeeding code to be transmitted while said distributor is transmitting the preceding code.

20. In a telegraph transmitter, a distributor, transmitting contacts less in number than the number of segments on said distributor, means for operating said transmitting contacts a plurality of times during a single rotation of said distributor, means for synchronizing said plurality of times with each complete cycle of rotion of said distributor, and a partial overlap means whereby said transmitter is transmitting the last portion of a code while some of said transmitter contacts are being set in accordance with a succeeding code.

21. The method of signaling which comprises the steps of transmitting the character impulses only of a plurality of start-stop permutation code signals in a consecutive series without their associated supervisory impulses, receiving said character impulses at an intermediate station, retransmitting each signal in its original order, and regenerating supervisory impulses corresponding to the original supervisory impulses of said signals.

22. In a telegraph system, a start-stop transmitter having a series of impulse elements, a plurality of devices selectively controlling said transmitter, and means to associate said impulse elements of said transmitter with different ones of said devices in a transposed sequence.

23. In a multiple channel telegraph system, means to control a single recording device on each of certain of said channels, and means to control a plurality of recording devices over a single other channel during the same cycle of operation.

24. In combination, a multiplex telegraph system, a plurality of display devices each capable of variable operation, and rotary switching means controllable over said system for operatively associating each of said devices with a channel of said system in accordance with a predetermined arrangement.

25. In a multiplex telegraph system, a series of groups of control elements adapted to control the transmission of the different elements of the same message, and means to associate said control elements with respective channels of said multiplex system.

26. In a synchronous multiplex telegraph system, means for transmitting successive groups of impulses over the respective channels of said system, and means to change the normal polarity of a group of impulses in selected cycles of operation of the multiplex system on each of its channels.

27. In a telegraph system, a first circuit, means to transmit code combinations of signal conditions over said first circuit, a second circuit, means to transmit code combinations of signal conditions over said second circuit in accordance with said first mentioned code combinations, and means independent of said code combinations on the first circuit to transmit additional signals on the second circuit for modifying said first mentioned code combinations of signals.

28. In a telegraph system, a telegraph circuit, means to transmit code combinations of impulse conditions and synchronizing impulses over said circuit, and a controlled device responsive to a perforated tape for conditioning said transmitting means to issue said impulses, certain perforations in said tape controlling the code impulses, and certain other perforations controlling the synchronizing impulses.

29. In a telegraph system, a telegraph circuit, means to transmit over said circuit a series of groups of code combinations of impulse conditions, means to receive said code combinations of impulse conditions, means to bring into correct phase relationship the groups of code combinations and the receiving means, and means responsive to certain of said impulse conditions to bring into correct phase relationship said series of groups of code combinations in accordance with a predetermined arrangement and said receiving means.

30. In a telegraph system, means to transmit a series of code combinations of impulses comprising marking and spacing signals of predetermined characteristics, and means for changing the character of the signals at regular periodic intervals.

31. In a translator, a start-stop receiver adapted to receive a series of code combinations of impulse conditions in a certain sequence, and a start-stop transmitter adapted to retransmit a second series of corresponding code combinations in a transposed sequence.

32. In a telegraph system, a transmitting distributor, a transmitter associated with said distributor and controlled by a prepared form, means controlled by the distributor to operate the transmitter, means to stop the transmitter, and automatic means to restart the transmitter only when the form is in a predetermined phase relation with the distributor.

33. In a translating device, a series of elements settable in accordance with a series of code combinations, a plurality of recording devices operable in accordance with the setting of said elements, a series of members corresponding to each of said recording devices and adapted to be operated by the combination individual to the associated recording device, and means to control each of said members by said recording devices in accordance with the setting of said elements.

34. In a synchronous multiplex telegraph system, receiving apparatus and transmitting apparatus operated over a single channel of said system, and means operated over said channel in response to certain impulse changes to establish a predetermined phase relation between said transmitting and receiving apparatus.

35. In a telegraph system, a distributor, type-selecting mechanism, electrical connections between the distributor and the type-selecting mechanism, case-shift control mechanism, and means for operating the case shift control mechanism at established and regularly recurrent intervals.

36. In a telegraph system, a distributor, type-selecting mechanism, electrical connections between said distributor and said type selecting mechanism, a sequence switch, and means controlled by said sequence switch for performing a printing operation in accordance with the selection made by the type-selecting mechanism.

37. In a telegraph system, a type-selecting mechanism, means to operate said mechanism in accordance with a predetermined code of impulses, case-shift control mechanism, and means independent of the code impulses for operating the case-shift control mechanism.

38. In a telegraph system, a tape-operated transmitter comprising feelers for cooperating with a tape, a plurality of switches, circuit connections between said feelers and said switches, a sequence mechanism for operating said switches in a predetermined sequence, and means controlled by said sequence mechanism for preventing transmission of electrical impulses when the sequence mechanism is out of proper phase relation with the perforations in the tape.

39. In a telegraph system, a telegraph circuit, transmitting apparatus at one end of said circuit, receiving apparatus at the other end of said circuit, means controlled by the transmitting apparatus to transmit over said circuit a series of code signals, means controlled by other signals representing messages to also maintain synchronism between the transmitting and receiving apparatus, and automatic means to send a special signal to maintain synchronism when message signals are discontinued.

40. In a telegraph system, means to transmit a series of start-stop telegraph signals representing letters and figures in a definite set sequence, and means to distinguish between letters and figures by the characteristic of the start impulse.

41. In a telegraph system, a telegraph circuit, means to transmit over said circuit a series of start-stop signals, said signals being divided into groups of a definite set sequence, and means to identify the beginnings of groups by the characteristic of the start impulse.

42. In a telegraph system, means to transmit a series of start-stop signals, a receiving device comprising a part operating in a cycle corresponding to a single signal and a part operating in a cycle corresponding to a group of signals, and means controlled by the start signal to bring both of said parts into the correct phase position with respect to said group of signals.

43. In a telegraph system, a telegraph circuit, means to transmit over said circuit a series of start-stop signals having start impulses of different characteristics, and means controlled by a perforated tape to control said transmitting means, said tape having perforations to control the characteristic of the start impulse.

44. In a telegraph system, a telegraph circuit, means to transmit over said circuit a series of signals having start impulses of a predetermined characteristic and stop impulses of a different characteristic, and sensing mechanism responsive to coded perforations in a tape to control said transmitting means, said tape having perforations to alter the character of the stop pulse.

45. In a telegraph system, a sending distributor having a plurality of groups of impulse transmitting elements, a transmitter having control elements less in number than the number of transmitting elements, and means to associate said control elements with succeeding groups of the transmitting elements.

46. In a signalling system, a transmitting distributor having a plurality of cycles, a receiving distributor having a corresponding number of cycles, an electrical circuit connecting said distributors, and means operated over said circuit to release said receiving distributor in response to a certain cycle only of said transmitting distributor.

47. In a telegraph system, a plurality of groups of circuits, means to impress on the respective groups of circuits code combinations of impulses representing successive characters of a message, a telegraph circuit, and means to transmit successively over said telegraph circuit the impulses impressed on the groups of circuits.

48. In a telegraph system, a plurality of groups of circuits, means to sense the perforations in a tape perforated in accordance with the characters of a message and to impress impulses on said groups of circuits in the order of the occurrence of the characters of the message, a telegraph circuit, and means for transmitting over said telegraph circuit the impulses representative of the character of the message in the order in which they are impressed on said groups of circuits.

49. In a telegraph system, a distributor, a plurality of groups of circuits associated with the distributor, relay means connected to a segment of the distributor for each group of circuits thereof, and means for impressing impulses on said circuits at a frequency higher than the frequency of operation of said relay means.

50. In a telegraph system, a distributor divided into sections with a plurality of segments in each section, a group of circuits individual to each section, means for impressing signal impulses at a predetermined frequency on said circuits, and relay means connected to the same segment in each of said sections responsive to said signal impulses and operative at a frequency lower than the frequency at which impulses are impressed on said circuits.

51. In a telegraph system, a channel of communication, means to transmit over said channel successively and in a definite order a plurality of groups of principal signals, and means to transmit concurrently with the transmission of said groups of signals a further signal to qualify said principal signals.

52. In a telegraph system, a channel of communication, means to transmit groups of code combinations of impulses over said channel representative of character selections, and means to transmit concurrently with said first mentioned means an impulse to qualify said character selections.

53. In a telegraph system, a channel of communication, means to transmit over said channel groups of signals representative of a complete stock quotation, and means to transmit concurrently with the transmission of each of said groups of signals an additional signal impulse for indicating the range of a quotation represented by the particular group.

54. In a permutation signalling device, individual means for relaying component elements of a signal, storage controlled means for initiating certain elements, and locally controlled means for initiating other elements.

55. In a permutation signalling apparatus for issuing messages comprised of a fixed number of character signals having surplus signalling possibilities, means for utilizing said surplus signalling possibilities for superadditional communication where the primary utility of such signals does not exhaust its signalling possibilities.

56. In a permutation signalling apparatus for issuing messages comprised of a fixed number of character signals having surplus signalling possibilities, means for transmitting principal communication signals, and means for utilzing said surplus signalling possibilities for superadditional communication where the primary utility of such signals does not exhaust its signalling possibilities.

57. In a permutation signalling apparatus for issuing messages comprised of a fixed number of groups of permutation signals having surplus signalling possibilities and representing a corresponding number of characters, means for issuing additional information without increasing the number of groups of signals of a message including means for utilizing the surplus signalling possibilities of each signal and denoting further information in accordance with the position of the particular signal thus utilized.

58. In a permutation signalling apparatus for issuing messages comprised of a fixed number of groups of permutation signals having surplus signalling possibilities, and representing a corresponding number of characters, means for issuing additional information without increasing the number of signals, including means for utilizing the surplus signalling possibilities of several signals and creating a new permutation signal thereby.

59. In a telegraph system, a recorder, a case shift mechanism associated with said recorder, means responsive to telegraph signals for controlling the operation of said recorder, and automatic means independent of shift signals for operating said case shift mechanism during reception of a predetermined number of character signals.

60. In a telegraph system, means to transmit code signals, a permutation device comprising a set of code elements, signal controlled means for conditioning certain of said elements, and cyclically operative means for conditioning certain other of said elements for thereby increasing the number of permutation possibilities of said device.

61. In a telegraph system, a permutation device comprising a number of signal responsive code elements, an additional code element operative independent of signals, and means for presenting said additional code element in certain selecting positions during corresponding portions of each operative cycle.

62. In a telegraph system, means to transmit code signals, a permutation device comprising a plurality of movable elements, signal controlled means to move certain of said elements, locally controlled means to move other of said elements for thereby increasing the permutation possibilities of said device, and a recording mechanism responsive to said permutation device including a case shift mechanism and locally controlled means for the operation thereof.

63. In combination, a multiplex telegraph system, a set of independent receiving devices associated with individual channels of said system, a single transmitter, circuit connections for establishing signalling conditions between said transmitter and each of said channels, and rotary means to control all of said devices over said circuit connections successively from said single transmitter.

64. In a telegraph system, a set of impulse transmitting elements corresponding in number to the total number of elementary and synchronizing impulses of a character signal to be transmitted, means to set said elements successively in accordance with successive signals, and distributing means for issuing over a line impulses of successive elementary signals and for deleting said synchronizing impulses.

65. In a telegraph system, a distributor having a multiplicity of impulse segments, a record reader having a set of feeler levers for sensing the perforations of a tape some of which are elementary in nature and permutatively enter into the composition of character signals and others of which are collateral in nature and serve to regulate the communication of said elementary signals, and means for introducing the elementary impulses of successive signals to the segments of said distributor consecutively and thereby obviating said collateral impulses as would otherwise intervene.

66. The method of transmission of start-stop permutation code signals consisting of synchronizing impulses and permutation impulses which comprises the steps of sensing the several impulses of each signal simultaneously, channelling the permutation impulses of each signal over a signalling line, and eliminating said synchronizing impulses of each signal.

67. In a multiplex communication system, a transmitting distributor, a tape transmitter, and means for associating said transmitter successively with the multiplex channels of said distributor for the purpose of transmitting successively signals over consecutive ones of said channels.

68. In a telegraph system, a record reader responsive to the storage signals of a control form, a set of elements in said record reader corresponding in number to the number of impulses of each signal in said form, means to transmit line signals in accordance with the settings of said elements, means to advance said form in said record reader during the time in which a portion of a stored signal is being transmitted, and means to change the setting of each element in accordance with a new signal while an impulse relating to a previous signal is being transmitted.

69. In a multiplex system of transmission, the method of synchronizing the cycles of a channel between a transmitting and a receiving station which comprises the steps of assigning predetermined current conditions to the impulses of certain ones of a unit number of signals, assigning predetermined other current conditions to the impulses of the remaining signals, and identifying the phase relationship by the effect of the predetermined sequence upon the receiving channel.

70. The method of establishing the phase relationship between the proper cycles of a multiplex channel where messages of a constant number of signals are to be transmitted, which comprises the steps of assigning predetermined current conditions to the impulses of certain signals, assigning distinguishable current conditions to the other signals, and phasing the receiving station apparatus with the predetermined signal current conditions.

71. In a multiplex transmission system, a multiplex distributor, a plurality of transmitting devices in communication with certain channels of said distributor, a start-stop transmitter in communication with one of the channels of said distributor, and means for phasing the cycles of said start-stop transmitter independently of the other of said transmitters.

72. In a synchronous multiplex system, a transmitter, and rotary means to associate said transmitter with divers channels of the multiplex system successively.

73. In a multiplex communication system, a transmitter controlled by the consecutive perforations of a control form, and means to associate said transmitter with successive channels of the system so as to transmit consecutive signals over successive channels of the system.

74. In a transmitter including a record reader responsive to a control strip carrying groups of perforations arranged in varying permutations and in a plurality of positions, means controlled by said perforations to transmit corresponding signals, and means controlled by a certain perforation in one position and independent of the occurrence thereof in other positions of a group to start the operation of the transmitter.

75. In an automatic control transmitter, means to transmit signalling conditions according to successive groups of perforations, means to set up a control condition while an intermediate perforation is being sensed, and means operative when a subsequent perforation is being sensed to render said control condition effective for altering a signalling condition.

76. In an automatic transmitter for issuing permutation code signals responsive to the perforations of a control form, a set of circuit connecting means each associative with a pair of signalling potentials having opposite electrical characteristics, and means responsive to a physical condition of a control form for changing the electrical characteristics of one of said sources.

77. In a distributor, a primary series of signal impulse segments, a secondary series of signal impulse segments, a set of storage elements intermediate corresponding segments of said two series, means for inserting additional signal impulses in accompaniment with said secondary series, and a common brush carrier for bridging said series.

78. In a record reader mechanism, a plurality of elements responsive to perforated conditions in a tape, means for advancing the tape in said record reader in accordance with the operation of said elements, and means under the control of one of said elements to suspend the operation of said advancing means.

79. In a recording system, recording means controlled by a form having groups of code impressions representing characters and occasional impressions accompanying said character impressions, a plurality of registers for receiving settings from said recording means, and means controlled by said occasional impressions to select the particular registers to be operated by said code impressions.

80. In a telegraph system, means to transmit successively groups of code signals, receiving apparatus, means to control single operations of said receiving apparatus by code signals, and means to control a plurality of operations comprising a predetermined cycle of said receiving apparatus occasionally by means of an occasional and regularly occurring one of said code signals.

81. In a telegraph system, a transmitting distributor having a plurality of impulse transmitting elements, a corresponding plurality of primary control elements, a transmitter having a number of secondary control elements fewer than the number of said impulse transmitting elements, and means to associate invariably and singly each impulse transmitting element with a certain one of said primary control elements.

82. In a telegraph system, a signal impulse distributor, impulse controlled recording mechanism, electrical connections between said distributor and said recording mechanism, case-shift control apparatus associated with said recording mechanism, and means for operating said case-shift control apparatus at predetermined intervals during the operation of said recording mechanism.

83. In a multiplex communication system, a transmitting distributor having a plurality of multiplex channels of communication, a tape transmitter, and means for associating said transmitter periodically and cyclically with a multiplex channel of said distributor for the purpose of transmitting signals from said tape transmitter over said channel.

84. In a multiplex communicating system, a transmitting distributor having a plurality of multiplex channels of communication, a tape transmitter, and means other than said distributor for associating said transmitter periodically and cyclically with a multiplex channel of said distributor for the purpose of transmitting signals thereover.

85. In a multiplex communication system, a multiplex transmitting distributor having a plurality of channels, a tape transmitter, and a sequence switch for associating said tape transmitter periodically and cyclically with one of the channels of said distributor for the purpose of transmitting signals thereover.

86. In a multiplex communication system, a transmitting distributor having a plurality of multiplex channels of communication, a tape transmitter, and means for associating said distributor periodically and cyclically with a channel of said distributor for the purpose of transmitting corresponding signals of a periodic sequence over the same channel.

87. In a receiving distributor, a plurality of segmented paths, individual wipers for traversing said paths, a common carrier member for said wipers, means for bridging segments of certain of said paths with those of other of said paths, and means for inserting additional impulses to said other of said paths originating independently of said certain of said paths.

88. In a telegraph transmitter, a plurality of elements responsive to code perforations in a tape, a further element responsive to another condition of the tape, means for advancing the tape, and means under the control of said further element responsive to said other condition in the tape to suspend the operation of said tape advancing means.

89. In a telegraph transmitter, a plurality of elements including elements responsive to code perforations in a tape, a further element responsive to a special perforation in the tape, means for advancing the tape in timed relation to the operation of said plurality of elements, and means under the control of said further element when said special perforation is presented thereto to suspend the operation of said advancing means.

LOUIS M. POTTS.